(12) United States Patent
Bansal et al.

(10) Patent No.: US 11,171,920 B2
(45) Date of Patent: Nov. 9, 2021

(54) PUBLICATION OF FIREWALL CONFIGURATION

(71) Applicant: Nicira, Inc., Palo Alto, CA (US)

(72) Inventors: Kaushal Bansal, Sunnyvale, CA (US); Uday Masurekar, Sunnyvale, CA (US); Subrahmanyam Manuguri, San Jose, CA (US); Jingmin Zhou, Los Gatos, CA (US); Shadab Shah, Sunnyvale, CA (US); Igor Ganichev, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 550 days.

(21) Appl. No.: 15/421,285

(22) Filed: Jan. 31, 2017

(65) Prior Publication Data

US 2017/0317979 A1 Nov. 2, 2017

Related U.S. Application Data

(60) Provisional application No. 62/330,153, filed on May 1, 2016.

(51) Int. Cl.
 *H04L 29/06* (2006.01)
(52) U.S. Cl.
 CPC ...... *H04L 63/0263* (2013.01); *H04L 63/0236* (2013.01)
(58) Field of Classification Search
 CPC ... H04L 63/0263; H04L 63/029; G06F 8/314; G06F 9/06
 See application file for complete search history.

(56) References Cited

U.S. PATENT DOCUMENTS

| 5,581,722 | A | 12/1996 | Welland |
| 5,968,176 | A | 10/1999 | Nessett et al. |
| 6,154,775 | A | 11/2000 | Coss et al. |
| 6,219,786 | B1 | 4/2001 | Cunningham et al. |
| 6,496,935 | B1 | 12/2002 | Fink et al. |
| 6,600,744 | B1 | 7/2003 | Carr et al. |

(Continued)

FOREIGN PATENT DOCUMENTS

| EP | 2748750 A1 | 7/2014 |
| JP | 2003188906 A | 7/2003 |

(Continued)

OTHER PUBLICATIONS

Joseph, Herndon, *FairWarning IP, LLC v Iatric Systems, Inc.* (Fed. Cir. 2016), Oct. 13, 2016, Patent Doc, pp. 1-3.*

(Continued)

*Primary Examiner* — Ellen Tran
(74) *Attorney, Agent, or Firm* — Adeli LLP

(57) ABSTRACT

A novel method for distributing firewall configuration of a software defined data center is provided. The network manager of the data center receives update requests from tenants of the data center and correspondingly generates update fragments and delivers the generated update fragment to local control planes controlling the enforcing devices. Each local control plane in turn integrates the update fragments it receives into its firewall rules table. For each rule and/or section thusly integrated, the local control plane uses the rule or the section's assigned priority number to establish ordering in the firewall rules table of the local control plane.

17 Claims, 29 Drawing Sheets

(56) References Cited

U.S. PATENT DOCUMENTS

| | | |
|---|---|---|
| 6,708,187 B1 | 3/2004 | Shanumgam et al. |
| 6,880,089 B1 | 4/2005 | Bommareddy et al. |
| 7,032,022 B1 | 4/2006 | Shanumgam et al. |
| 7,055,173 B1 | 5/2006 | Chaganty et al. |
| 7,106,756 B1 | 9/2006 | Donovan et al. |
| 7,227,842 B1 | 6/2007 | Ji et al. |
| 7,349,382 B2 | 3/2008 | Marimuthu et al. |
| 7,657,887 B2 | 2/2010 | Kothandaraman et al. |
| 7,676,836 B2 | 3/2010 | Prigent et al. |
| 7,724,740 B1 | 5/2010 | Wang et al. |
| 7,818,452 B2 | 10/2010 | Matthews et al. |
| 7,831,826 B2 | 11/2010 | Koti et al. |
| 7,894,480 B1 | 2/2011 | Wang et al. |
| 7,948,986 B1 | 5/2011 | Ghosh et al. |
| 7,954,143 B2 | 5/2011 | Aaron |
| 8,032,933 B2 | 10/2011 | Turley et al. |
| 8,065,725 B2 | 11/2011 | Zheng et al. |
| 8,190,767 B1 | 5/2012 | Maufer et al. |
| 8,365,294 B2 | 1/2013 | Ross |
| 8,578,500 B2 * | 11/2013 | Long .................. G06F 21/55 726/22 |
| 8,621,552 B1 | 12/2013 | Lotem et al. |
| 8,660,129 B1 | 2/2014 | Brendel et al. |
| 8,813,209 B2 | 8/2014 | Bhattacharya et al. |
| 8,904,511 B1 | 12/2014 | O'neill et al. |
| 9,015,823 B2 | 4/2015 | Koponen et al. |
| 9,047,109 B1 | 6/2015 | Wang et al. |
| 9,130,901 B2 | 9/2015 | Lee |
| 9,154,462 B2 | 10/2015 | Grimes et al. |
| 9,215,210 B2 | 12/2015 | Raman et al. |
| 9,215,213 B2 | 12/2015 | Bansal et al. |
| 9,215,214 B2 | 12/2015 | Bansal et al. |
| 9,276,904 B2 | 3/2016 | Bansal et al. |
| 9,367,257 B2 | 6/2016 | Hamilton et al. |
| 9,369,431 B1 | 6/2016 | Kirby et al. |
| 9,479,464 B1 | 10/2016 | Wang et al. |
| 9,553,806 B2 | 1/2017 | Anand |
| 9,680,706 B2 | 6/2017 | Masurekar et al. |
| 9,755,903 B2 | 9/2017 | Masurekar et al. |
| 9,774,707 B2 | 9/2017 | Parthasarathy et al. |
| 9,806,948 B2 | 10/2017 | Masurekar et al. |
| 9,860,279 B2 | 1/2018 | Jain et al. |
| 9,894,103 B2 | 2/2018 | Kwok et al. |
| 9,906,560 B2 | 2/2018 | Jain et al. |
| 9,906,561 B2 | 2/2018 | Jain et al. |
| 9,906,562 B2 | 2/2018 | Jain et al. |
| 2002/0078370 A1 | 6/2002 | Tahan |
| 2003/0041266 A1 | 2/2003 | Ke et al. |
| 2003/0093481 A1 | 5/2003 | Mitchell et al. |
| 2003/0120955 A1 | 6/2003 | Bartal et al. |
| 2003/0126468 A1 | 7/2003 | Markham |
| 2003/0226027 A1 | 12/2003 | Marquet et al. |
| 2004/0049701 A1 | 3/2004 | Le Pennec et al. |
| 2004/0177276 A1 | 9/2004 | Mackinnon et al. |
| 2004/0223495 A1 | 11/2004 | Pachl |
| 2004/0243835 A1 | 12/2004 | Terzis et al. |
| 2005/0190909 A1 | 9/2005 | Yoneyama et al. |
| 2005/0198125 A1 | 9/2005 | Macleod Beck et al. |
| 2005/0210291 A1 | 9/2005 | Miyawaki et al. |
| 2005/0276262 A1 | 12/2005 | Schuba et al. |
| 2005/0278431 A1 | 12/2005 | Goldschmidt et al. |
| 2006/0013136 A1 | 1/2006 | Goldschmidt et al. |
| 2006/0129808 A1 | 6/2006 | Koti et al. |
| 2006/0168213 A1 | 7/2006 | Richardson et al. |
| 2006/0195896 A1 | 8/2006 | Fulp et al. |
| 2007/0028291 A1 | 2/2007 | Brennan et al. |
| 2007/0061492 A1 | 3/2007 | Van Riel |
| 2007/0118893 A1 | 5/2007 | Crawford |
| 2007/0136813 A1 | 6/2007 | Wong |
| 2008/0072305 A1 | 3/2008 | Casado et al. |
| 2008/0082977 A1 | 4/2008 | Araujo et al. |
| 2008/0115190 A1 | 5/2008 | Aaron |
| 2008/0148382 A1 | 6/2008 | Bartholomy et al. |
| 2008/0189769 A1 | 8/2008 | Casado et al. |
| 2008/0215518 A1 | 9/2008 | Matsuda |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2009/0007219 A1 | 1/2009 | Abzarian et al. |
| 2009/0007251 A1 | 1/2009 | Abzarian et al. |
| 2009/0083727 A1 | 3/2009 | Fu et al. |
| 2009/0129271 A1 | 5/2009 | Ramankutty et al. |
| 2009/0150521 A1 | 6/2009 | Tripathi |
| 2009/0228972 A1 | 9/2009 | Bandi et al. |
| 2009/0235325 A1 | 9/2009 | Dimitrakos et al. |
| 2009/0249436 A1 | 10/2009 | Coles et al. |
| 2009/0249438 A1 | 10/2009 | Litvin et al. |
| 2009/0249470 A1 | 10/2009 | Litvin et al. |
| 2009/0249472 A1 * | 10/2009 | Litvin ............. H04L 63/0263 726/14 |
| 2009/0276771 A1 | 11/2009 | Nickolov et al. |
| 2009/0327198 A1 | 12/2009 | Farah |
| 2009/0327781 A1 | 12/2009 | Tripathi |
| 2010/0037310 A1 | 2/2010 | Turley et al. |
| 2010/0037311 A1 | 2/2010 | He et al. |
| 2010/0037331 A1 | 2/2010 | Blake et al. |
| 2010/0043067 A1 | 2/2010 | Varadhan et al. |
| 2010/0100616 A1 | 4/2010 | Bryson et al. |
| 2010/0100949 A1 | 4/2010 | Sonwane et al. |
| 2010/0125667 A1 | 5/2010 | Soundararajan |
| 2010/0180331 A1 | 7/2010 | Murakami et al. |
| 2010/0192215 A1 | 7/2010 | Yaxuan et al. |
| 2011/0016467 A1 | 1/2011 | Kane |
| 2011/0022695 A1 | 1/2011 | Dalal et al. |
| 2011/0055916 A1 | 3/2011 | Ahn |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0154470 A1 | 6/2011 | Grimes et al. |
| 2011/0213875 A1 | 9/2011 | Ferris et al. |
| 2011/0246637 A1 | 10/2011 | Murakami |
| 2011/0302647 A1 | 12/2011 | Bhattacharya et al. |
| 2012/0042033 A1 | 2/2012 | Ayala, Jr. et al. |
| 2012/0137199 A1 | 5/2012 | Liu |
| 2012/0180104 A1 | 7/2012 | Gronich et al. |
| 2012/0240182 A1 | 9/2012 | Narayanaswamy et al. |
| 2012/0263049 A1 | 10/2012 | Venkatachalapathy et al. |
| 2012/0291024 A1 | 11/2012 | Barabash et al. |
| 2012/0314617 A1 | 12/2012 | Erichsen et al. |
| 2013/0007740 A1 | 1/2013 | Kikuchi et al. |
| 2013/0019277 A1 | 1/2013 | Chang et al. |
| 2013/0031544 A1 | 1/2013 | Sridharan et al. |
| 2013/0047151 A1 | 2/2013 | Sridharan et al. |
| 2013/0073743 A1 | 3/2013 | Ramasamy et al. |
| 2013/0074066 A1 | 3/2013 | Sanzgiri et al. |
| 2013/0125230 A1 | 5/2013 | Koponen et al. |
| 2013/0163594 A1 | 6/2013 | Sharma et al. |
| 2013/0198355 A1 | 8/2013 | Kalyanaraman et al. |
| 2013/0219384 A1 | 8/2013 | Srinivasan et al. |
| 2013/0227097 A1 | 8/2013 | Yasuda et al. |
| 2013/0227550 A1 | 8/2013 | Weinstein et al. |
| 2013/0311358 A1 | 11/2013 | Sethi et al. |
| 2013/0311612 A1 | 11/2013 | Dickinson |
| 2013/0332983 A1 | 12/2013 | Koorevaar et al. |
| 2014/0068602 A1 | 3/2014 | Gember et al. |
| 2014/0108319 A1 | 4/2014 | Klauser et al. |
| 2014/0115578 A1 | 4/2014 | Cooper et al. |
| 2014/0149794 A1 | 5/2014 | Shetty et al. |
| 2014/0195666 A1 | 7/2014 | Dumitriu et al. |
| 2014/0245423 A1 | 8/2014 | Lee |
| 2014/0281030 A1 | 9/2014 | Cui et al. |
| 2014/0282855 A1 | 9/2014 | Clark et al. |
| 2014/0282889 A1 | 9/2014 | Ishaya et al. |
| 2014/0297780 A1 | 10/2014 | Zhou et al. |
| 2014/0304387 A1 | 10/2014 | Bansal et al. |
| 2014/0325037 A1 | 10/2014 | Elisha |
| 2015/0052521 A1 | 2/2015 | Raghu |
| 2015/0112933 A1 | 4/2015 | Satapathy |
| 2015/0193466 A1 | 7/2015 | Luft |
| 2015/0200816 A1 | 7/2015 | Yung et al. |
| 2015/0229641 A1 | 8/2015 | Sun et al. |
| 2015/0277949 A1 | 10/2015 | Loh et al. |
| 2016/0050117 A1 | 2/2016 | Voellmy et al. |
| 2016/0050141 A1 | 2/2016 | Wu et al. |

(56) References Cited

U.S. PATENT DOCUMENTS

| | | |
|---|---|---|
| 2016/0094456 A1 | 3/2016 | Jain et al. |
| 2016/0094643 A1 | 3/2016 | Jain et al. |
| 2016/0105333 A1 | 4/2016 | Lenglet et al. |
| 2016/0112374 A1 | 4/2016 | Branca |
| 2016/0149863 A1 | 5/2016 | Walker et al. |
| 2016/0156591 A1 | 6/2016 | Zhou et al. |
| 2016/0182454 A1 | 6/2016 | Phonsa et al. |
| 2016/0191466 A1* | 6/2016 | Pernicha ............... H04L 63/20 726/1 |
| 2016/0191570 A1 | 6/2016 | Bansal et al. |
| 2016/0241702 A1 | 8/2016 | Gorajala Chandra et al. |
| 2017/0004192 A1 | 1/2017 | Masurekar et al. |
| 2017/0005867 A1 | 1/2017 | Masurekar et al. |
| 2017/0005987 A1 | 1/2017 | Masurekar et al. |
| 2017/0005988 A1 | 1/2017 | Bansal et al. |
| 2017/0026283 A1 | 1/2017 | Williams et al. |
| 2017/0064749 A1 | 3/2017 | Jain et al. |
| 2017/0104720 A1 | 4/2017 | Bansal et al. |
| 2017/0118173 A1 | 4/2017 | Arramreddy et al. |
| 2017/0134422 A1 | 5/2017 | Shieh et al. |
| 2017/0180319 A1 | 6/2017 | Nimmagadda et al. |
| 2017/0180320 A1 | 6/2017 | Nimmagadda et al. |
| 2017/0180321 A1 | 6/2017 | Nimmagadda et al. |
| 2017/0180423 A1 | 6/2017 | Nimmagadda et al. |
| 2017/0187679 A1 | 6/2017 | Basak et al. |
| 2017/0250869 A1 | 8/2017 | Voellmy |
| 2017/0317928 A1 | 11/2017 | Gude et al. |
| 2017/0317976 A1 | 11/2017 | Chalvadi et al. |
| 2017/0317977 A1 | 11/2017 | Popuri et al. |
| 2017/0318055 A1 | 11/2017 | Popuri et al. |
| 2018/0007000 A1 | 1/2018 | Bansal et al. |
| 2018/0007007 A1 | 1/2018 | Bansal et al. |
| 2018/0007008 A1 | 1/2018 | Bansal et al. |

FOREIGN PATENT DOCUMENTS

| | | | |
|---|---|---|---|
| JP | 2006040274 | A | 2/2006 |
| JP | 2009017269 | A | 1/2009 |
| JP | 2013012865 | A | 1/2013 |
| KR | 20080100620 | A | 11/2008 |
| WO | 2008095010 | A1 | 8/2008 |
| WO | 2013074828 | A1 | 5/2013 |

OTHER PUBLICATIONS

Author Unknown, "Enabling Service Chaining on Cisco Nexus 1000V Series," Month Unknown, 2012, 25 pages, CISCO.
Author Unknown, "Next-Generation Firewalls," Oct. 1, 2013, 1 page, Palo Alto Networks.
Basak, Debashis, et al., "Virtualizing Networking and Security in the Cloud," Month Unknown, 2010, 9 pages, VMware.com.
Casado, Martin, et al., "SANE: A Protection Architecture for Enterprise Networks," Proceedings of the 15th USENIX Security Symposium, Jul. 31, 2006, 15 pages.
Dixon, Colin, et al., "An End to the Middle," Proceedings of the 12th conference on Hot topics in operating systems USENIX Association, May 2009, 5 pages, Berkeley, CA, USA.
Dumitriu, Dan Mihai, et al., U.S. Appl. No. 61/514,990, filed Aug. 4, 2011.
Guichard, J., et al., "Network Service Chaining Problem Statement; draft-quinn-nsc-probiem-statement-00.txt," Jun. 13, 2013, 14 pages, Cisco Systems, Inc.
Ioannidis, Sotiris, et al., "Implementing a Distributed Firewall," CCS'00, Month Unknown, 2000, 10 pages, ACM, Athens, Greece.
Joseph, Dilip Antony, et al., "A Policy-aware Switching Layer for Data Centers," Jun. 24, 2008, 26 pages, Electrical Engineering and Computer Sciences, University of California, Berkeley, CA, USA.
Scarfone, Karen, et al., "Guidelines on Firewalls and Firewall Policy," Sep. 2009, 48 pages, NIST, U.S. Department of Commerce.
Sekar, Vyas, at al., "Design and Implementation of a Consolidated Middlebox Architecture," In Proc. of NSDI, Month Unknown, 2012, 14 pages.
Sherry, Justine, et al., "Making Middleboxes Someone Else's Problem: Network Processing as a Cloud Service," In Proc. of SIGCOMM, Aug. 13-17, 2012, 12 pages, Helsinki, Finland.
Stojanovski, Nenad, et al.., "Analysis of Identity Based Firewall Systems," Jun. 2010, 9 pages.
Stojanovski, Nenad, et al., "Architecture of a Identity Based Firewall System," Jul. 2011, 9 pages.
Mayer, Alain, et al., "Offline Firewall Analysis," Int. L. Inf. Secur. (2006) 5(3), Jun. 16, 2005, 20 pages, Springer-Verlag.
Thames, J. Lane, et al., "A Distributed Firewall and Active Response Architecture Providing Preemptive Protection," ACM-SE'08, Mar. 28-29, 2008, 6 pages, Auburn, AL, USA.

* cited by examiner

PUBLICATION OF FIREWALL CONFIGURATION

BACKGROUND

In computing, a firewall is a network security system that monitors and controls the incoming and outgoing network traffic based on predetermined security rules. A firewall typically establishes a barrier between a trusted, secure internal network and another outside network, such as the Internet, that is assumed to not be secure or trusted.

Firewalls are often categorized as either network firewalls or host-based firewalls. Network firewalls are software appliances running on general-purpose hardware or hardware-based firewall computer appliances that filter traffic between two or more networks. Host-based firewalls provide a layer of software on one host that controls network traffic in and out of that single machine.

Software defined data centers that provide network virtualization platforms to different tenants also provide firewall services to those tenants. As these software defined data centers provide ever more networking and computing capacities to ever more tenants, the software defined data center has to configure and manage an ever greater number of firewall rules in its networking and computing resources in order to serve the ever more complex security requirements of its tenants.

SUMMARY

Some embodiments of the invention provide a method for managing firewall configuration of a software defined data center that provides computing and networking resources to a plurality of tenants. Such a firewall configuration in some embodiments is divided into multiple sections that each contains a set of firewall rules. In some embodiments, each tenant of the software defined data center has a corresponding set of sections in the firewall configuration. The method allows each tenant to independently access and update/manage its own corresponding set of sections. Some embodiments allow multiple tenants or users to make changes to the firewall configuration simultaneously.

In some embodiments, the sections of the firewall configuration are prioritized. Specifically, when applying firewall service to a packet, the method identifies an applicable firewall rule by examining a higher priority section before examining a lower priority section. Some embodiments reserve the highest priority section and the lowest priority section of the firewall configuration for storing firewall rules that are applicable to all tenants. Some or all of the remaining sections are tenant-specific sections, each tenant-specific section storing firewall rules that are applicable to only one tenant in some embodiments.

Some embodiments allow each tenant to access or manage its corresponding set of sections of the firewall configuration by providing an application programming interface (API) to each tenant. Some embodiments allow each tenant to access or manage its corresponding set of sections by providing a user interface (UI) to each tenant. In some embodiments, such UI or API allows a tenant to (i) insert a section or rule to the firewall configuration, (ii) to remove a section or rule from the firewall configuration, or (iii) to edit a section or a rule that is specific to the tenant. In some embodiments, the API is REST (representational state transfer) compliant.

In some embodiments, a firewall configuration maintains a list of sections. This list of sections records the position of each section in the firewall configuration, i.e., the ordering by which the sections are examined for matching rule. In some embodiments, a tenant adds or deletes a section to the firewall configuration by updating the list of sections. Some embodiment receive multiple requests from UI/API to add/update multiple firewall sections. Some or all of these requests require assignment of priority to one or more sections in the firewall configuration, which in turn require making changes to the list of sections.

In some embodiments, the position value/priority numbers of the sections are sparsely allocated. The sparsely allocated priority numbers increase the likelihood that a newly added section can be assigned a unique priority number without affecting the priority numbers already assigned to other sections. This allows the insertion of a new section to be faster with lower latency. This also allows multiple different priority assignment tasks/activities to take place concurrently without interfering with each other, since each activity is free to assign a number from a gap without affecting the assignment of priority numbers by other activities. Some embodiments provide mechanisms such as rebalancing for maintaining the sparseness of the priority number assignment and hence maximize the probability that multiple priority assignment tasks can take place concurrently.

Some embodiments identify the dependencies of each section-reordering firewall manage operation and places in queue only those section-reordering firewall manage operations whose priority assignment is dependent upon a section which has yet to be assigned a priority number. If a scheduled activity for assigning priority to a section does not depend upon priority assignment of another section, or if the depended upon section already has known priority assignment, then the scheduled activity proceeds directly to execution without waiting for any other priority assignment tasks to complete.

In some embodiments, the ordering of sections in the firewall configuration is managed by using a binary search tree. The use of the binary search tree ensures that the addition or deletion of a section or a rule can be accomplished within a time period that is in the order of log(N), N being the number of sections. In some embodiments, the binary search tree is a complete binary search tree such that every possible priority number (both assigned and unassigned) has a unique corresponding node in the tree. In some embodiments, each node includes an indication of whether the priority number is assigned and which section it is assigned to.

Some embodiments, when assigning priority numbers to new incoming sections, use a greedy scheme, which always leaves as much room as possible, e.g., by assigning a priority number that is right in the middle of the available space between the priority number immediately before and the priority number immediately after. Some embodiments record the sequence of section insertions and assign priority numbers based on the recorded sequence, i.e., by detecting the pattern of the section insertions. The assignment priority number for each section is chosen to minimize the possibility of running out of priority numbers to assign due to unbalanced sequence, i.e., to minimize collision of priority numbers between newly inserted sections and sections already in the firewall configuration.

Some embodiments perform periodic rebalancing of the assigned priority numbers, i.e., to re-label at least some of the sections (or rules) with different priority numbers in order to create more room for subsequent section insertions. Such rebalancing also helps to ensure that the assignment of priority numbers to the different sections remain sparsely allocated. A firewall management process in some embodiments performs rebalancing when it is not able to assign a priority number to the newest section being inserted. Some embodiments perform rebalancing of the assigned priority number by re-distributing the keys uniformly (i.e., by reassigning the priority numbers to the sections in a uniformly spaced fashion while maintaining the original ordering). Some embodiments perform rebalancing by assigning more space (i.e., allocating more unassigned priority numbers) around the key assigned to the section whose insertion caused the rebalancing. Some embodiments use the binary search tree to segment the priority number space into ranges and to confine the rebalancing operation into a smallest range necessary in order to maximize the probability that a priority assignment task may proceed without having to wait for the rebalancing operation.

In some embodiments, as the tenants update the desired state of the firewall configuration, the network manager in some embodiments generates and transmits update data to the local control planes in order to update the actual state of the firewall configuration. In some embodiments, for each update to the firewall configuration made by a tenant or user through an API/UI of the network manager, the network manager generates a set of update fragments for one or more local control planes and sends the update fragments to the local control planes, where each local control plane integrates the update fragment it receives into its firewall rules table.

In order to facilitate the assembly of the firewall rules table at a local control plane, some embodiments include priority numbers assigned to the rules or sections in the update fragment. For each rule and/or section included in the update fragment, the network manager attaches its assigned priority number. The local control plane in turn uses the attached priority numbers to reassemble the rules and sections according to their relative ordering at the central firewall configuration.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method or system for managing firewall configuration of a software defined data center that provides computing and networking resources to a plurality of tenants or users. In some embodiments, each tenant of the software defined data center is allowed to independently access and update/manage its own set of firewall rules. The firewall configuration management system or method described in this document is in some embodiments concurrently updatable by multiple users and highly scalable with respect to the number of users/tenants. It also allows each user to manage its own firewall rules in a low latency manner.

Figure 1:
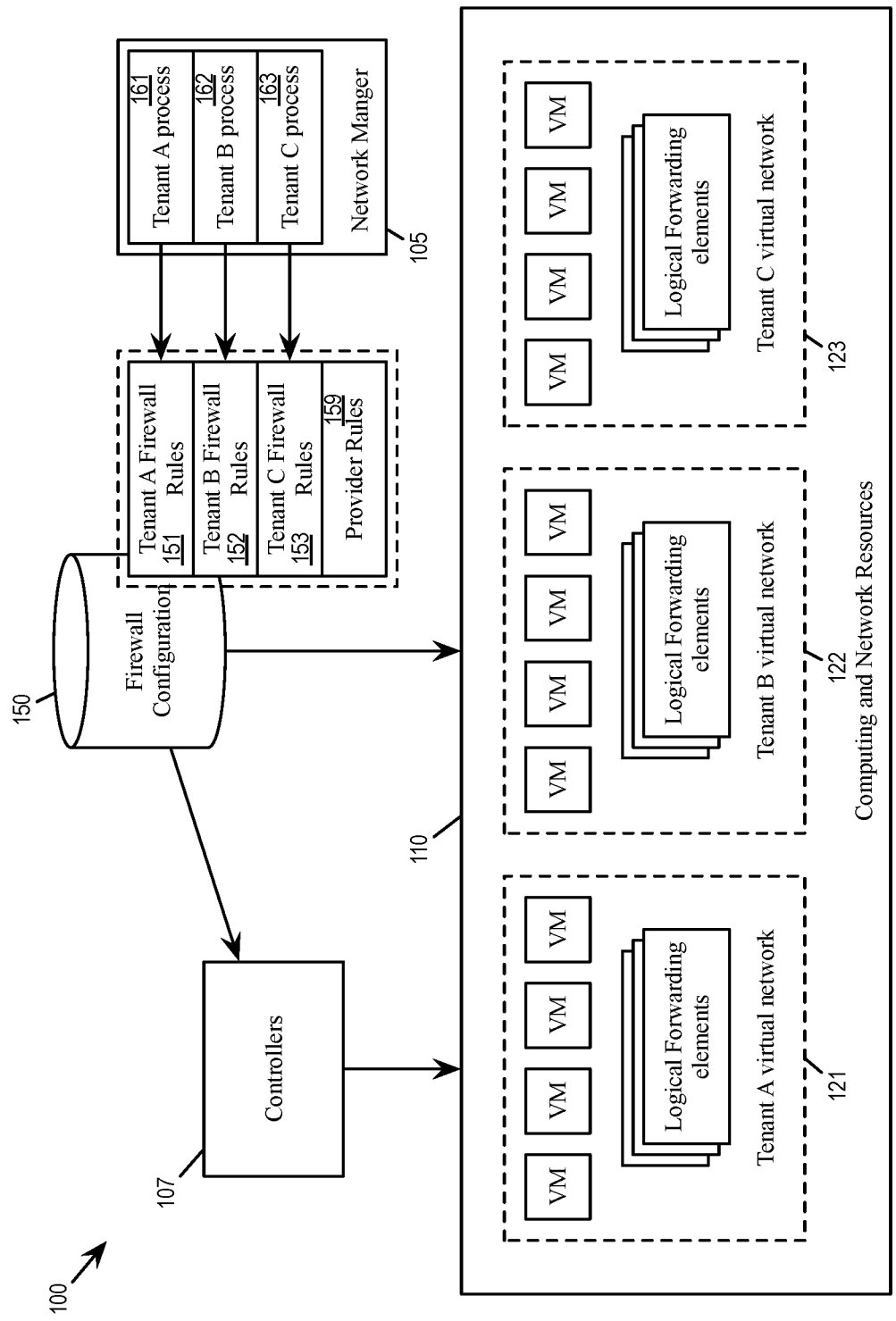
FIG. 1 illustrates the management of firewall configuration for a software defined data center.

FIG. 1 illustrates the management of firewall configuration for a software defined data center 100 according to some embodiments of the invention. As illustrated, the software defined data center 100 provides a pool of computing and network resources 110 to tenants A, B, C. The software defined data center also includes a network manager 105 and a set of controllers 107. The network manager 105 receives specification from users/network administrators/tenants and provides the corresponding configurations for the computing and network resources 110 in the data center as well as the set of controllers 107.

In some embodiments, each tenant uses the computing and network resources of the software defined data center to implement its own set of virtual networks and virtual machines. In this example, the resources of the software defined data center are implementing tenant virtual networks 121, 122, and 123 for the tenants A, B, and C, respectively. Each tenant's virtual network includes virtual machines (VMs) belonging to the tenant. Each tenant's virtual network is also a logical network that includes logical forwarding elements (logical routers and logical switches) for performing L2/L3 packet forwarding operations within the logical network and with other networks (such as the Internet).

The set of controllers 107 is for controlling the real-time operations of the computing and network resources 110. Specifically, the central controller is controlling the virtual network components (i.e., logical forwarding elements, etc.) that are configured to operate in the computing and network resources. In some embodiments, the central controller 107 is a cluster of controllers, where each controller is responsible for some of the virtual network components.

The software defined data center 100 also provides firewall protection for its tenants. These firewalls filter network traffic according to rules that allow or disallow certain types of packets. In some embodiments, that firewall protection is provided by distributed logical firewalls that are implemented across multiple computing or networking resources (e.g., multiple host machines operating hypervisors or virtualization software). The operations of the firewalls in the data center 100 are based on the content of the firewall configuration 150, which defines and provides firewall rules.

The network manager 105 is responsible for maintaining a firewall configuration 150, which is used to configure the computing and network resources 110 of the data center 100 for implementing firewalls. The content of the firewall configuration, i.e., the firewall rules, are published to the computing and network resources of the data center 100 so these resources can filter network traffic accordingly. The firewall configuration is also published to the set of controllers 107 so the controllers can control the real-time operations of the firewall in the computing and network resources.

Some embodiments allow each tenant to specify its own set of rules into the firewall configuration 150. As illustrated, the firewall configuration 150 implements a set of firewall rules 151 for tenant A, a set of firewall rules 152 for tenant B, and a set of firewall rules 153 for tenant C. The firewall configuration 150 also includes a set of provider rules 159 that are applicable to all tenants of the software defined data center. Some embodiments allow each of the tenants to manage its set of firewall rules. Some support multiple concurrent processes for accessing the firewall configuration so each tenant would have its own process for managing its own set of firewall rules, and different tenants can simultaneously access the firewall configuration. As illustrated in FIG. 1, the network manager 105 of the data center 100, in addition to provisioning the various virtual machines and logical forwarding elements in the pool of computing and network resources 110, also operates concurrent processes 161, 162, and 163 that allow tenants A, B, and C to each independently access its corresponding set of firewall rules 151, 152, and 153. The concurrent processes for updating the firewall configuration will be further described below in Sections I, II, and III.

In some embodiments, a software defined data center includes computing devices that can be configured to provide at least some of the computing and network resources for provisioning the VMs and the logical forwarding elements for the tenants of the data center. In some embodiments, each of these computing devices is operating virtualization software that enables the machine to host the various logical forwarding elements and VMs provisioned by the network manager for the various tenants (hence these computing devices are also referred to as host machines). In some embodiments, these host machines are also configured by the data center's firewall configuration to filter packets according to the firewall rules in the firewall configuration. In some embodiments, the virtualization software of a host machine performs the filtering of the packets that are received by the host machine or generated by the host machine.

Figure 2:
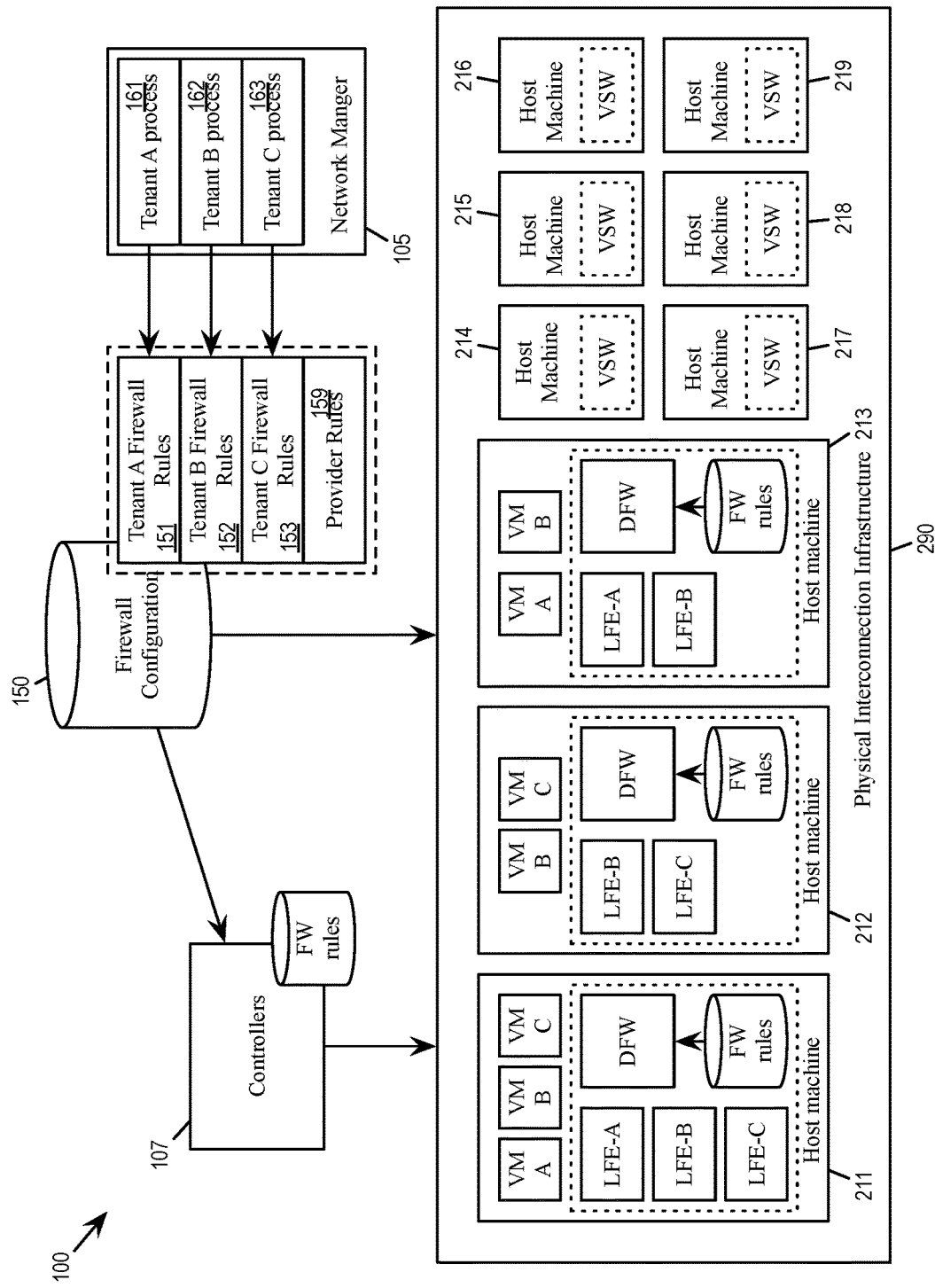
FIG. 2 illustrates host machines of the software defined data center.

For some embodiments, FIG. 2 illustrates host machines of the software defined data center 100 that are configured to implement VMs, logical forwarding elements, and firewalls. As illustrated, the software defined data center 100 includes host machines 211-219 that are interconnected by a physical interconnection infrastructure 290. Each host machine is operating virtualization software in order to host VMs.

Each of the host machines operates a set of VMs and logical forwarding elements (LFEs) for one or more tenants. For example, the host machine 211 operates VMs and LFEs for tenants A, B, and C, while the host machine 212 operates VMs and LFEs for tenants B and C only. LFEs of a tenant operated by a host machine can include L3 logical routers and L2 logical switches for the virtual network of that tenant. In some embodiments, a logical router of a tenant is implemented across multiple host machines in order to perform L3 routing for VMs of that tenant hosted by those multiple host machines, while a logical switch of a particular L2 network segment (e.g., a VNI) of a tenant is implemented across multiple host machines in order to perform L2 switching for VMs of that network segment on those multiple host machines. In some embodiments, a host machine performs the operations of a logical router by operating a local instance of the logical router as a physical router for routing packets to and from the VMs hosted by the host machine. In some embodiments, such a logical router is referred to as a logical routing element (LRE), and a local instance of the LRE operating in a host machine is referred to as a managed physical routing element (MPRE). In some embodiments, each host machine operates a managed physical switching element (MPSE) for performing L2 switching of packets to and from the VMs of the host machine.

As illustrated, each host machine is operating virtualization software in order to host the VMs (Virtualization software is also referred to as virtual machine monitors, hypervisors, or managed forwarding elements). The virtualization software of a host machine implements the LFEs of the host machine. In some embodiments, a host machine also operates a layer of software for filtering traffic in and out of the host machine (and to and from the virtual machines of the host machine). In some embodiments, the layer of traffic filtering software is part of the virtualization software.

The traffic filtering software of a host machine implements a distributed firewall at that host machine. The distributed firewall operates according to the firewall configuration 150, which includes firewall rules for filtering packets. In some embodiments, the traffic filtering software of each host machine receives and/or stores a complete set of rules published by the firewall configuration 150 of the data center 100. In some embodiments, each host machine receives and/or stores only the rules that are relevant to the VMs and the LFEs operated by the host machine. For example, in some embodiments, a host machine receives and/or stores only firewall rules that are relevant to the tenants operating in that host machine. For example, the host machine 212 would store and operate only firewall rules relevant to tenants B and C (e.g., rule sets 152, 153, and 159), the host machine 213 would store and operate only firewall rules relevant to tenants A and B (e.g., rule sets 151, 152, and 159), while the host machine 211 would store and operate firewall rules relevant to all three tenants A, B, and C (151-153 and 159). In some embodiments, the central controller 107 also receives the published firewall rules from the firewall configuration in order to control the operation of the firewall in the host machines.

Several more detailed embodiments of the invention are described below. Section I discusses the concurrent updating of the firewall configuration that is divided into sections. Section II describes efficient updating of firewall rules in the firewall configuration. Section III describes the publication of firewall configuration to firewall enforcing devices. Section IV describes a computing device that operates virtualization software and serves as a host machine. Finally, section V describes an electronic system with which some embodiments of the invention are implemented.

I. Firewall Configuration By Sections

In some embodiments, the firewall configuration of a software defined data center is divided into multiple sections that each contains a set of firewall rules. Some embodiments allow different concurrent processes to manage different sections of the firewall rules. In some embodiments, the updating of a section (e.g., adding/removing/updating rules within the section) would not affect the firewall operations based on other sections. In some embodiments, each tenant of the software defined data center has a corresponding set of sections in the firewall configuration. Each tenant is allowed to independently access and update/manage its own corresponding set of sections.

Figure 3:
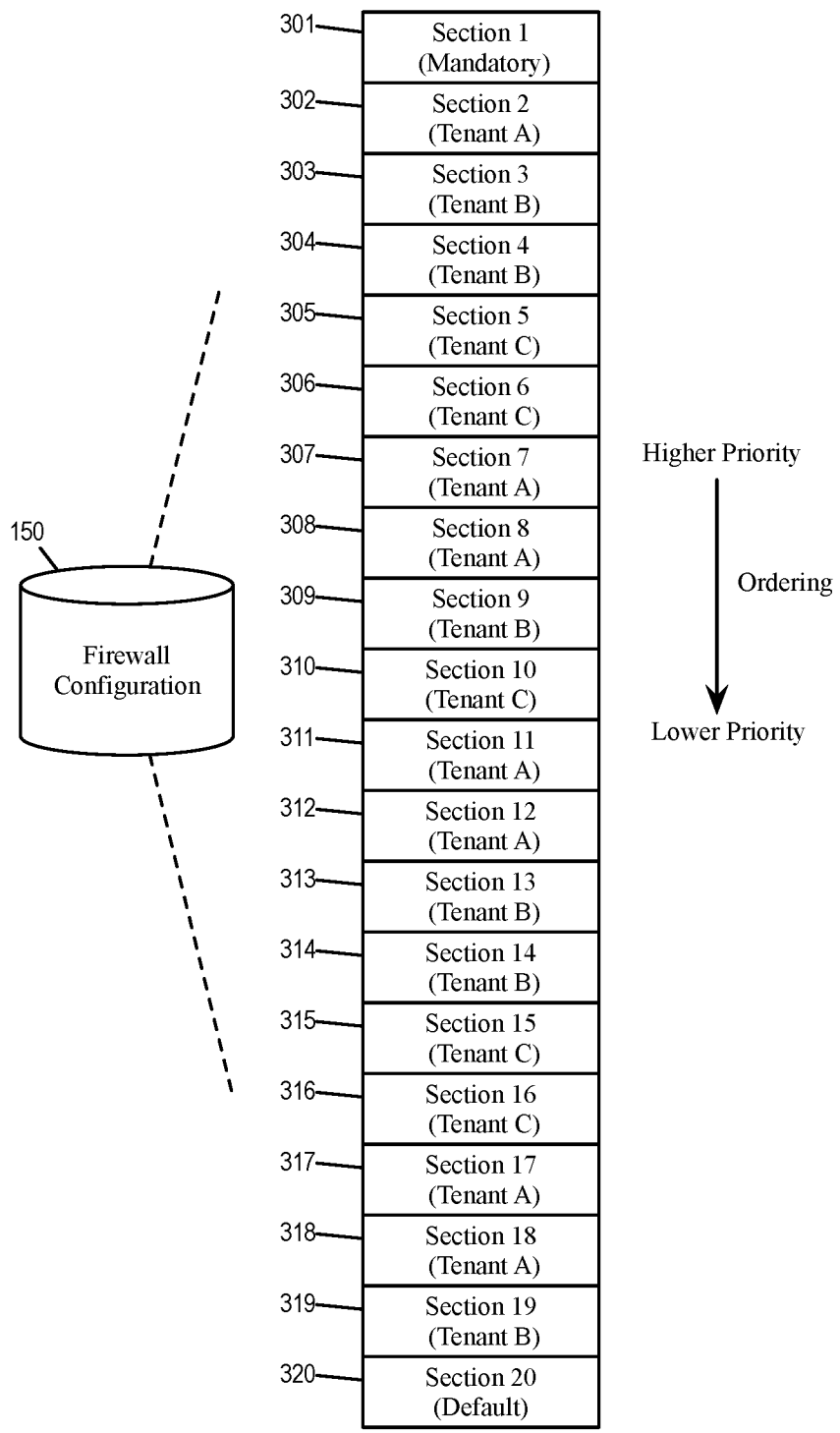
FIG. 3 illustrates a firewall configuration that is divided into sections.

FIG. 3 illustrates a firewall configuration that is divided into sections. The figure describes the firewall configuration 150 in greater detail according to some embodiments of the invention. Specifically, the firewall configuration 150 is divided into sections 301-320. In this example, the sections 302, 307, 308, 311, 312, 317, and 318 are for storing firewall rules of tenant A; the sections 303, 304, 309, 313, 314 319 are for storing firewall rules of tenant B; the sections 305, 306, 310, 315, 316 are for storing firewall rules of tenant C. Sections 301 and 320 are for storing provider firewall rules that are applicable to all tenants of the software defined data center (the software defined data center is also referred to as the service provider).

In some embodiments, the sections of the firewall configuration are ordered or prioritized. Specifically, when applying firewall service to a packet, the method identifies an applicable firewall rule by examining a section with a higher priority before examining a section with a lower priority. Some embodiments reserve the highest priority section and the lowest priority section of the firewall configuration for storing firewall rules that are applicable to all tenants. Some or all of the remaining sections are tenant-specific sections, each tenant-specific section storing firewall rules that are applicable to only one tenant in some embodiments.

In the example of FIG. 3, the section 301 is the highest priority section, and the section 320 is the lowest priority section. In other words, when performing packet filtering operations within a software defined data center according to the firewall configuration 150, rules of the section 301 will be examined first, then section 302, etc., until a rule that definitively allows or a disallows the packet is found, or until the last rule of the section 320 has been reached.

The highest priority section 301, i.e., the section whose rules will be examined before all other sections, is a mandatory rules section. These are rules that are imposed by the software defined data center on all tenants. An applicable rule in the mandatory section supersedes all tenant rules. In some embodiments, a packet that matches one of the rules of the highest priority section will be rejected or allowed based on that matched rule without regard to any rules in other sections.

The lowest priority section 320, i.e., the section whose rules will be examined after all other sections, is a default rules section. These are rules that are provided by the software defined data center to all tenants as the default rules. A packet in a tenant's virtual network would be rejected or allowed based on these default rules if none of the rules specified by the tenant are applicable to the packet. In some embodiments, a packet that matches none of the rules specified by any tenant and none of the mandatory rules would be rejected or allowed based on the rules of the default section.

Since sections are ordered based on priorities and the rules in higher priority sections are examined for matching rules before rules in lower priority sections, any update to higher priority sections or higher priority rules will affect the applicability of the rules in lower priority sections, unless the rules are orthogonal with each other.

In some embodiments, sections belonging to different tenants are regarded as orthogonal to each other, i.e., rules in a section belonging to one tenant can never supersede rules in a section belonging to another tenant, regardless of the relative priority of the two sections. For example, though the tenant A section 308 is of higher priority than the tenant B section 313 and therefore examined first, the rules in the section 308 can never affect the applicability of rules in the section 313, because tenant A firewall rules can never apply to tenant B packets anyway. This allows each tenant to freely manage/edit/update its own firewall rule sections without affecting other tenants. In some embodiments, this also enables more efficient provisioning of distributed firewall, i.e., by configuring each host machine with only the necessary sections of the firewall configuration. In other words, a host machine would only receive and store sections of the firewall configuration that are relevant to its operation, not those sections that are not relevant to its operation.

The firewall configuration illustrated in FIG. 3 shows the sections from different tenants interspersed among each other. In some embodiments, the sections of the different tenants are adjacent to each other in the firewall configuration. In some embodiments, the user interfaces of the network manager of the software defined data center would present the different sections of a tenant together as one cluster, regardless of their actual position in the firewall configuration.

Figure 4:
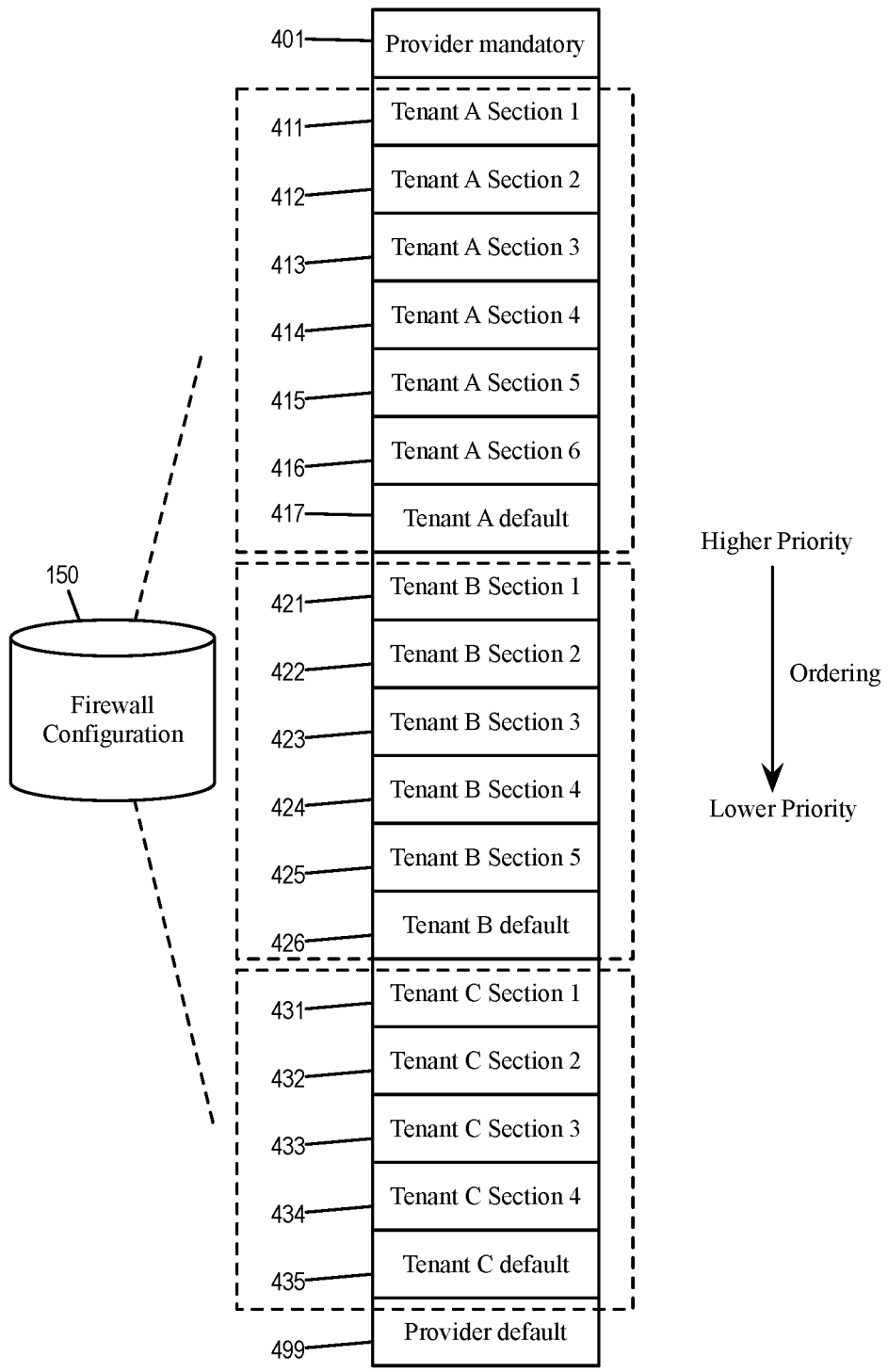
FIG. 4 illustrates a firewall configuration in which sections belonging to one tenant are clustered together.

FIG. 4 illustrates a firewall configuration in which sections belonging to one tenant are clustered together. As illustrated, the clustered sections 411-417 are all sections storing firewall rules of tenant A, the clustered sections 421-426 are all sections storing firewall rules of tenant B, and the clustered sections 431-435 are all sections storing firewall rules of tenant C. Each tenant can therefore easily identify the location of its firewall configuration sections at the user interface. The ordering of sections in the firewall configuration 400 also shows their relative priority, i.e., the rules of section 411 will be examine before the rules of section 412, etc., and the rules in tenant A's sections will be examined for matching rules before the rules in tenant B's sections, and the rules in tenant B's sections will be examined for matching rules before rules in tenant C's sections (the ordering between different tenants is unimportant since rules of different tenants are orthogonal to each other.) All tenant rules are examined after the provider mandatory section 401 and before the provider default section 499.

Since each tenant has its own set of sections in the firewall configuration, the lowest priority section among a tenant's set of sections can be regarded as the tenant's default section since it is the last of the tenant's sections examined for matching rules (the provider default section 499 is still the last section examined for matching rules for all tenants). In some embodiments, the network manager provides each tenant a tenant default section before the tenant adds sections or firewall rules of its own. In the example of FIG. 4, the section 417 is the tenant default section for tenant A, the section 426 is the tenant default section for tenant B, and the section 435 is the tenant default section for tenant C. In the example of FIG. 3, the section 318 is the tenant default section of tenant A, the section 319 is the tenant default section of tenant B, and the section 316 is the default tenant section of tenant C.

Figure 5:
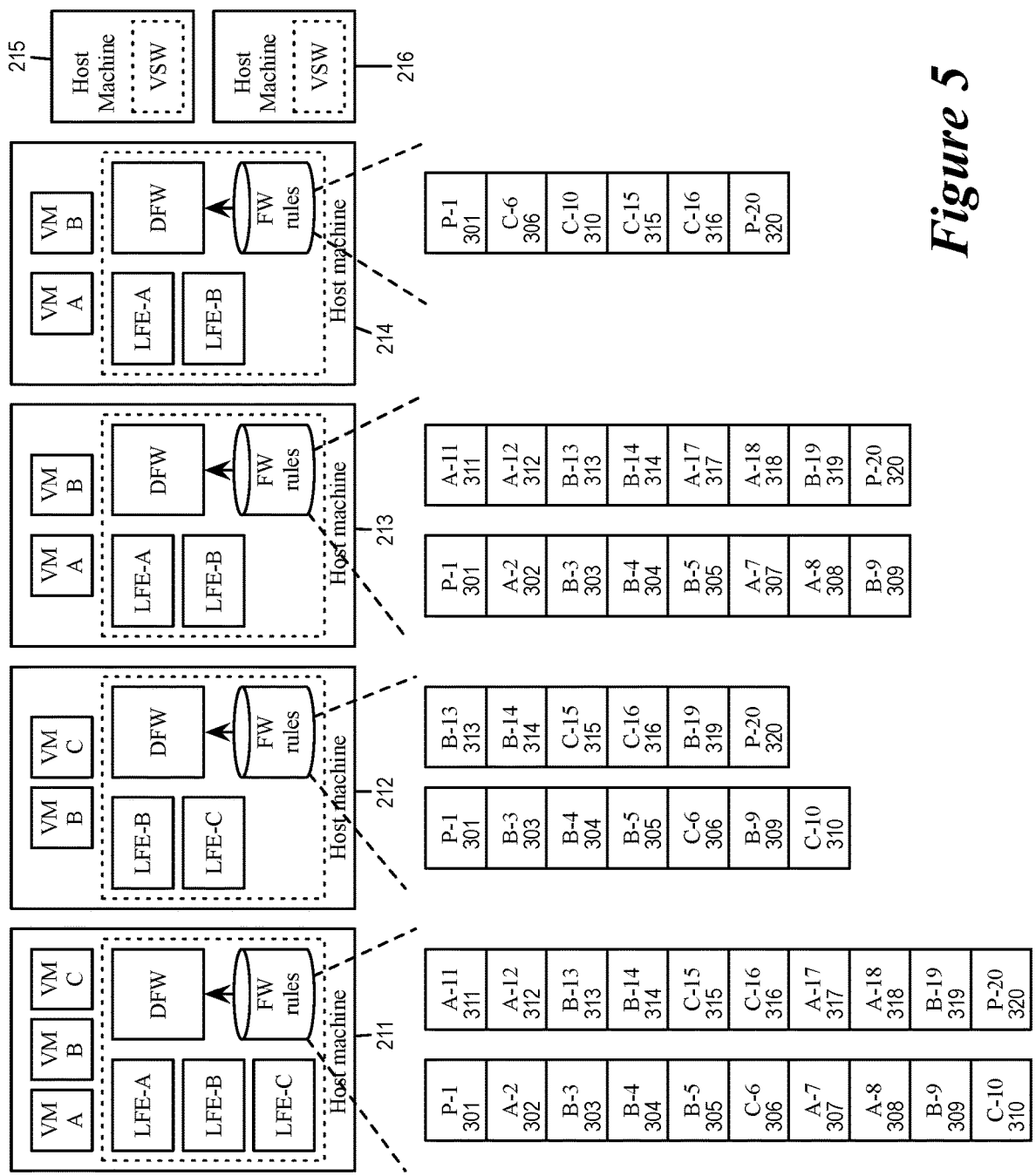
FIG. 5 illustrates provisioning of distributed firewall according to the sections of the firewall configuration.

FIG. 5 illustrates provisioning of the distributed firewall according to the sections of the firewall configuration (based on the example of FIG. 3). The example shows the provisioning of the distributed firewall in host machines 211-214 according to the firewall configuration 150. As illustrated, the host machine 211 operates VMs and LFEs for tenants A, B, and C, so it receives and stores firewall configuration sections 302-319 for tenants A, B, and C, as well as the provider sections 301 and 320. The host machine 212 operates VMs and LFEs for tenants B and C, so it receives and stores firewall configuration sections 303-306, 309-310, 313-316, and 319, as well as the provider sections 301 and 320. The host machine 213 operates VMs and LFEs for tenants A and B, so it receives and stores firewall configuration sections 301-305, 307-309, 311-314, 317-320. The host machine 214 operates VMs and LFEs for only tenant C, so it receives and stores firewall configuration sections 301, 306, 310, 315-316, and 320.

In some embodiments, the firewall rules used by a host machine do not correspond to the tenants that own the VMs and/or the LFEs operating on that host machine. For example, a particular host machine can be configured to operate as an edge of a logical network or of the entire provider network. Such an edge host machine may have to perform firewall operations for all tenants but does not host any VMs or LFEs for those tenants. This particular host machine would therefore receive and store firewall configuration sections for all tenants.

In some embodiments, not only are sections belonging to different tenants orthogonal to each other, some of the different sections belonging to a same tenant are also orthogonal to each other. For example, a tenant's virtual network can have different L2 segments that each has its own corresponding section in the firewall configuration. Rules that are applicable to packets in one L2 segment can never be applicable to packets of another L2 segment. As another example, a tenant can have set of rules that are specific to a host machine and another set of rules that are specific to another host machine. Some embodiments allow these different rules for different host machine to be in different sections of the firewall configuration. This allows each host machine to be configured by only the relevant firewall configuration section. This also allows different orthogonal sections to be managed and updated by different concurrent processes.

Figure 6:
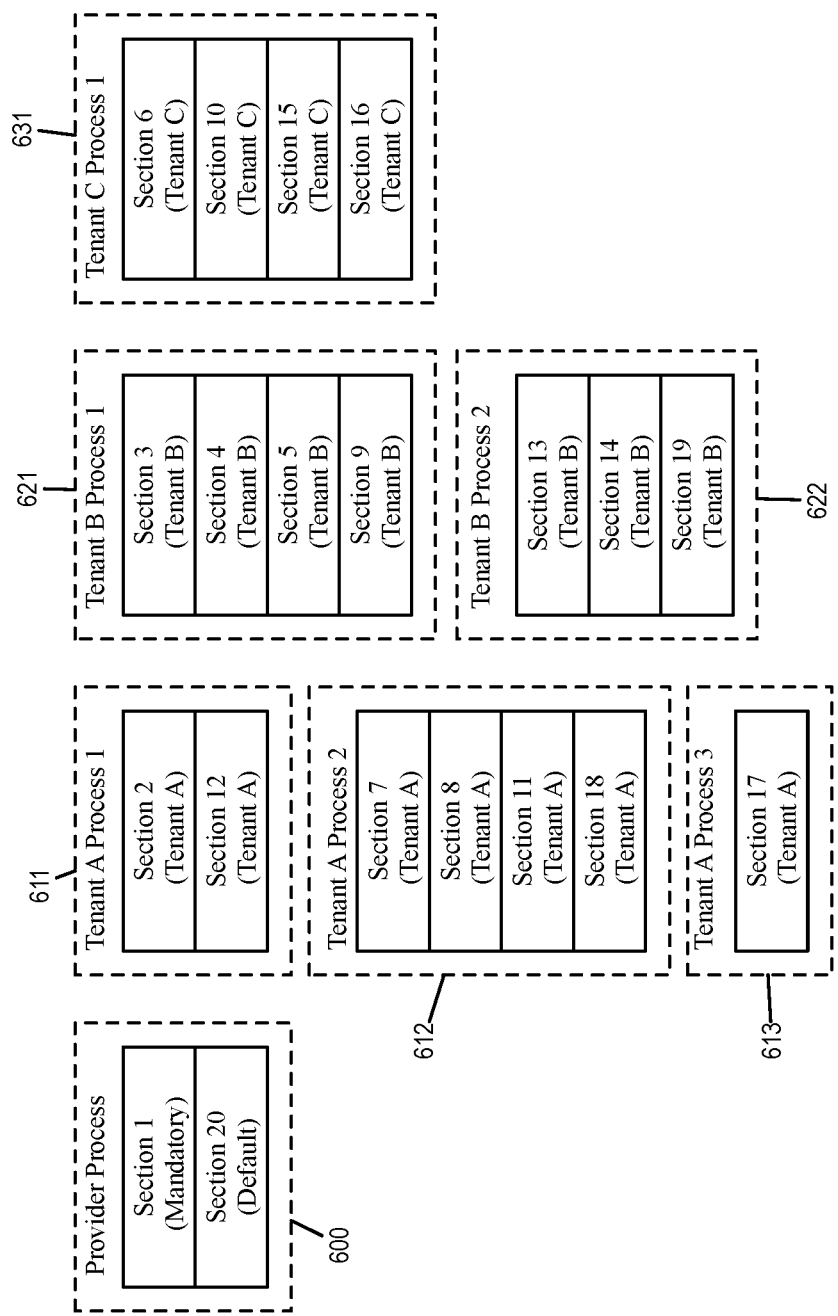
FIG. 6 illustrates different firewall sections being managed by different concurrent processes.

FIG. 6 illustrates different firewall sections being managed by different concurrent processes. Different processes belonging to different tenants manage different sections of the firewall configuration 150. The figure illustrates several such processes: a provider process 600, three tenant A processes 611-613, two tenant B processes 621-622, and one tenant C process 631.

As illustrated, the sections belonging to tenant A (302, 307, 308, 311, 312, 317, 318) are managed by tenant A processes (611-613); the sections belonging to tenant B (303-305, 309, 313-314, 319) are managed by tenant B processes (621-622); the sections belonging to tenant C (306, 310, 315, 316) are managed by tenant C processes (631). Some tenants have multiple firewall management processes. For example, the firewall rules of tenant A have three sets of sections. The first set of sections (302 and 312) is managed by the process 611, the second set of sections (307, 308, 311, 318) is managed by the process 612, and the third set of sections (317) is managed by the process 613.

As mentioned, sections belonging to different tenants are orthogonal to each other. Also, some sections belonging to the same tenant can be orthogonal with each other. In some embodiments, this allows each process to manage its own set of sections without affecting the firewall operations based on other sets of sections.

Figure 7:
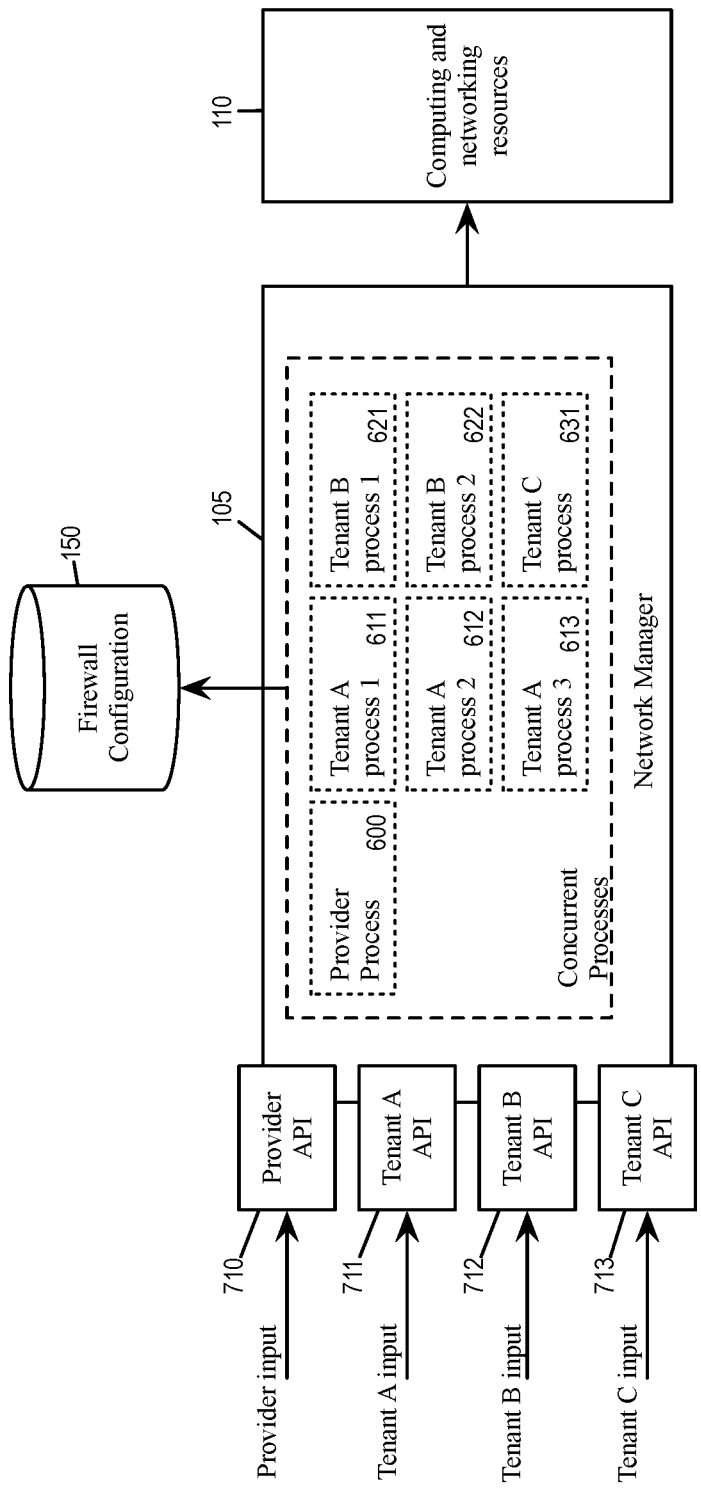
FIG. 7 conceptually illustrates the network manager of the software defined data center receiving inputs from tenants and updating the firewall configuration accordingly.

FIG. 7 conceptually illustrates the network manager 105 of the software defined data center 100 receiving inputs from tenants and updating firewall configuration 150 accordingly. The network manager 105 provides user interface elements 710-713 to tenants so each tenant can specify its firewall rules in the firewall configuration 150. The network manager 150 in turn uses the content of the firewall configuration to provision or configure distributed firewall operations in the computing and networking resources (e.g., host machines) of the data center 110.

The user interface elements provided to tenants convert input from the tenants into concurrent firewall management processes 611-631 operated by the network manager 105 for managing the various sections of the firewall configuration. Each of these processes is assigned to manage a set of sections of the firewall configuration, and can be responsible for inserting, deleting, or modifying rules in its assigned sections. In some embodiments, the user interface element provided to a tenant also allows the tenant to delete or add sections belonging to the tenant.

As illustrated, the network manager 105 provides an API as the user interface element to each of the tenants A, B, or C (tenant APIs 711, 712, and 713, respectively). The network manager 105 also provides an API (provider AP 710) to the administrator of the software defined data center. The tenant A API 711 has launched the firewall management processes 611, 612 and 613 for tenant A. The tenant B API 712 has launched the firewall management processes 621 and 622 for tenant B. The tenant C API 713 has launched the firewall management process 631. In this example, each tenant is allowed to have multiple concurrent firewall management processes for managing different sections that are orthogonal to each other. In some embodiments, each tenant has only one firewall management process for managing all of its sections in the firewall configuration.

In some embodiments, once a tenant has specified an operation (e.g., remove a section, add a rule, etc.), the network manager would launch a corresponding process to access the firewall configuration. This process would remain active in the background until the operation specified by the tenant is complete. In some embodiments, the different tenants can concurrently input firewall specifications regarding the firewall configuration through their respective user interface elements. In some embodiments, the firewall management processes launched by the user interface elements of different tenants are concurrently executed (by the network manager).

Different embodiments provide different types of user interface experience through different types of user interface elements in order to allow administrators or tenants to specify firewall rules and/or firewall configuration sections. In the example illustrated in FIG. 7, the user interface elements provided to the tenants are APIs. In some embodiments, the API is REST (representational state transfer) compliant. In some embodiments, the network manager provides other forms of user interface element to the tenants, such as graphical user interface (GUI) or other types of user interfaces.

In some embodiments, the user interface element provide firewall manage operations that allows a tenant to (i) insert a section or rule to the firewall configuration, (ii) to remove a section or rule from the firewall configuration, or (iii) to edit a section or a rule that is specific to the tenant. In some embodiments, the user interface element also allows a tenant to get (i.e., read) the content of a particular section, or to get a list of the sections currently in the firewall configuration.

Figure 8:
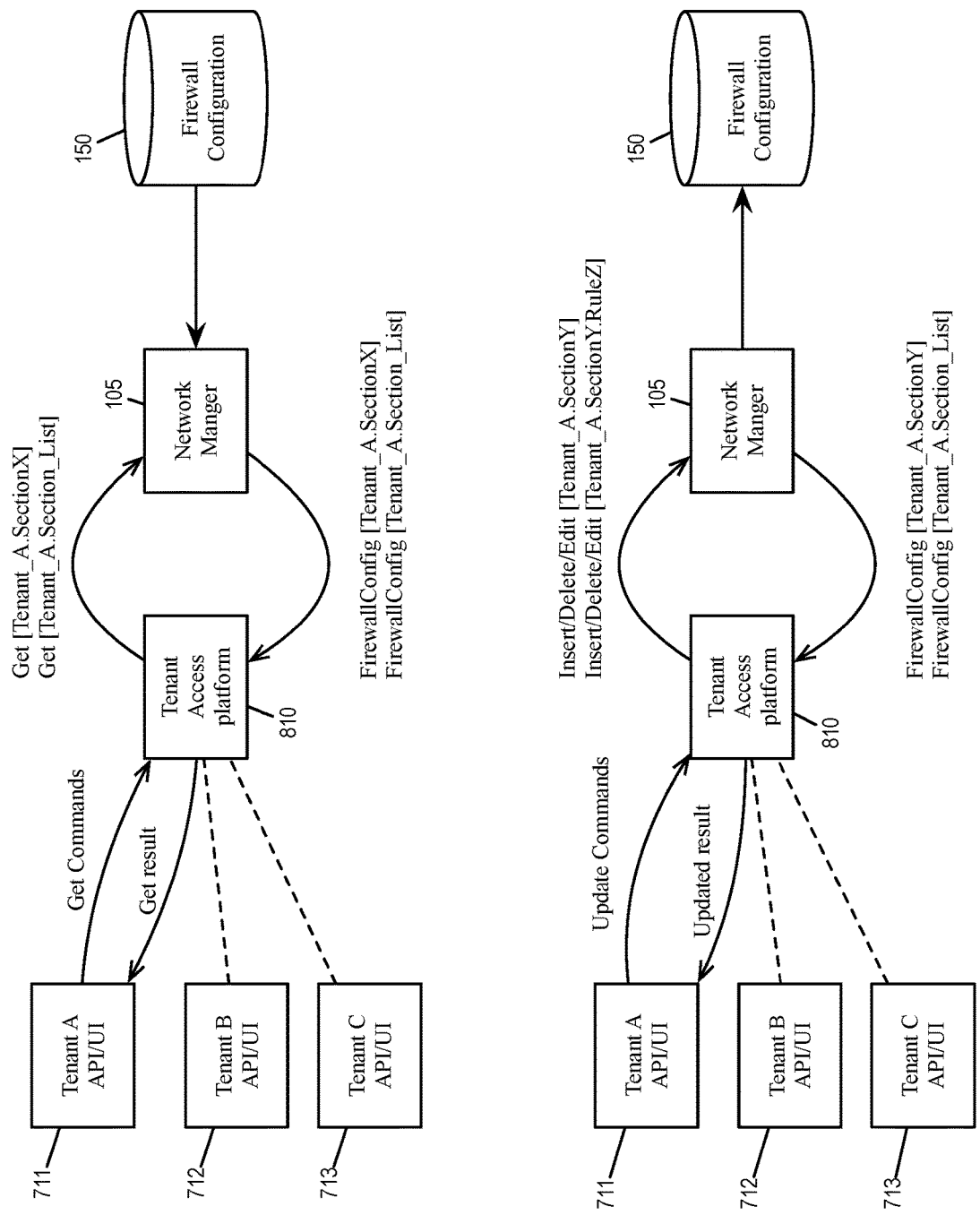
FIG. 8 illustrates firewall management operations that are provided to the tenants of a software defined data center.

FIG. 8 illustrates firewall management operations that are provided to the tenants of a software defined data center. As illustrated, the network manager 105 of the software defined data center 100 provides a tenant access platform 810 for receiving tenant data from tenants A, B, and C and for delivering data back to those tenants. Each tenant uses a user interface and/or application programming interface element (illustrated as tenant API/UIs 711-713) to specify data to be sent to the data center 100, including commands/data related to the firewall configuration. The network manager 105 receives those tenant data via the tenant access platform 810 and performs operations related to the firewall configuration 150 accordingly.

In some embodiments, the user interface element that allows a tenant to specify its own firewall rules and firewall configuration sections are provided by a tenant access platform. In some embodiments, such a tenant access platform allows users (i.e., tenants) to access, configure, and control their respective virtual networks in the software defined data center through the Internet or the Cloud, i.e., the tenant access platform is a cloud-computing platform in some embodiments.

FIG. 8 illustrates two types of operations: "get" operations, which retrieve data from the firewall configuration; and "update" or "put" operations, which modify the firewall configuration. Examples of "get" operations illustrated include "Get [TenantA. SectionX]", which is an operation that reads the content of a particular section of a tenant; and "Get [TenantA.SectionList]", which is an operation that produces a list of sections that belong to a particular tenant in the firewall configuration.

Examples of "put" operations illustrated include "Insert [TenantA.SectionY]", which is an operation that adds a section for a particular tenant into the firewall configuration; "Delete [TenantA.SectionY]", which is an operation that removes a section of a particular tenant from the firewall configuration; "Edit [TenantA. SectionY.RuleZ]", which is an operation that modifies a packet filtering rule in a particular section of tenant A. In some embodiments, upon the conclusion of an update operation to the firewall configuration, the network manager also produces the content of the updated firewall configuration section or the updated list of sections as confirmation to the tenant.

By dividing the firewall configuration into sections and letting each tenant update its corresponding set of sections, each tenant is able to control and make changes to its own firewall rules in its own firewall configuration sections without affecting other tenants and without having to lock the entire firewall configuration. As mentioned, in addition to allowing each tenant to make changes to the rules in its sections, some embodiments also allow each tenant to add or delete a section in the firewall configuration. However, unlike making changes to rules within a firewall configuration section, adding or deleting a firewall configuration section does affect the firewall operation of other tenants.

In some embodiments, a firewall configuration maintains a list of sections. This list of sections records the position of each section in the firewall configuration, i.e., the ordering by which the sections are examined for matching rule. In some embodiments, a tenant adds or deletes a section to the firewall configuration by updating the list of sections.

Figure 9:
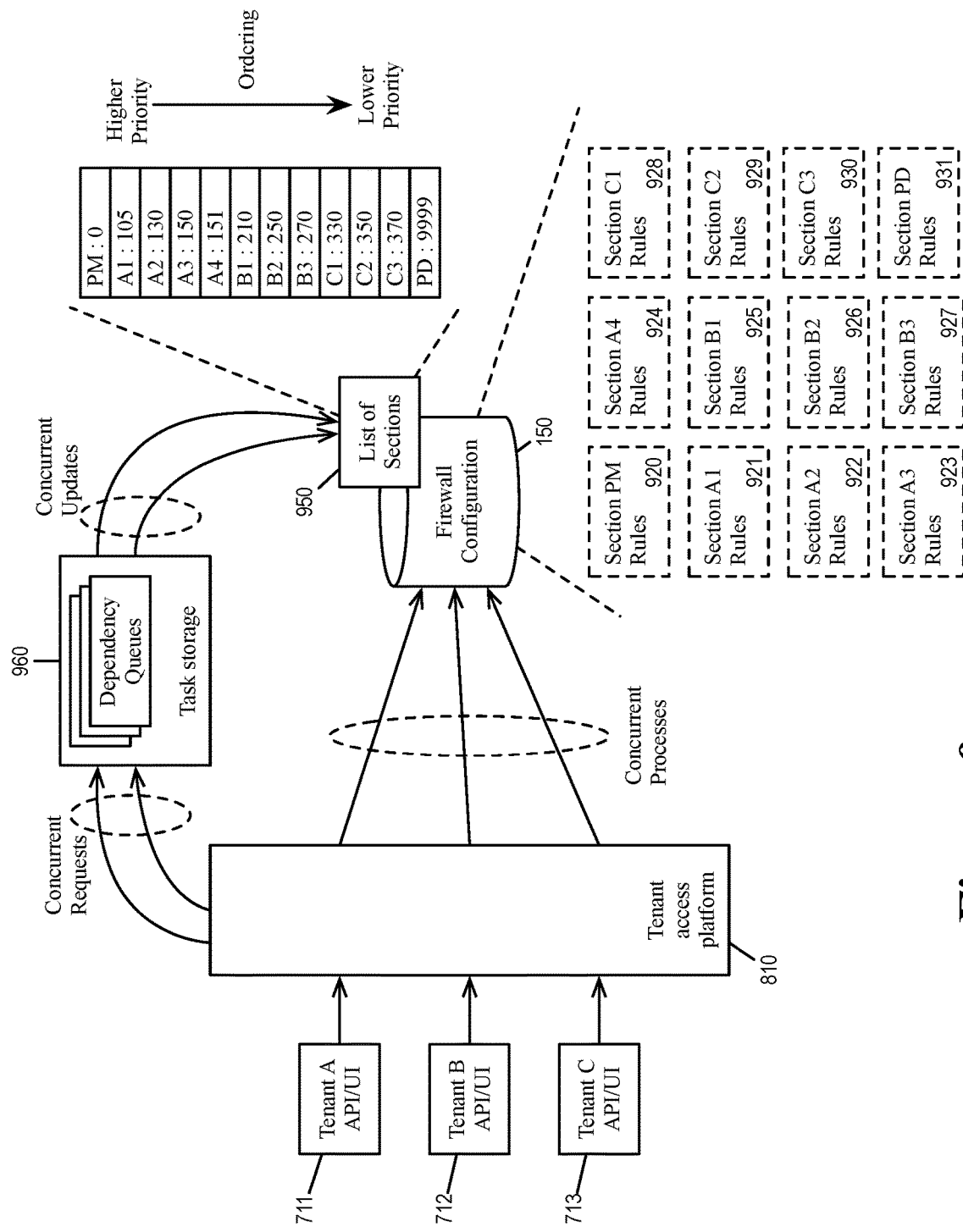
FIG. 9 illustrates a firewall configuration that maintains a list of sections for recording the position of each section in the firewall configuration.

FIG. 9 illustrates a firewall configuration that maintains a list of sections for recording the position of each section in the firewall configuration. In some embodiments, firewall configuration management operations that affect ordering between the sections (such as adding or deleting a section) are scheduled as activities that make changes to the list of sections. On the other hand, firewall configuration management operations that do not affect the ordering between the sections (such as updating rules in a section) are performed without regard to the list of sections and can be performed concurrently with other firewall management operations from other tenants.

As illustrated, the firewall configuration 150 has an associated list of sections 950. The firewall configuration 150 stores the rules of various sections 920-931 (sections A1-A4, B1-B3, C1-C3, PD, and PM), and the ordering between these various sections 921-931 are stored in the list of sections 950. The tenant access platform 810 receives requests to perform firewall configuration management operations from tenants A, B, and C through their corresponding APIs 711-713, and allows firewall management operations that do not involve reordering of sections to proceed directly and concurrently to access the firewall configuration 150. For each firewall management operations that do require reordering of sections, some embodiments schedule a priority assignment task in order to access the list of sections 950. The scheduled priority assignment task is stored along with other scheduled priority assignment tasks in a task storage 960.

The list of sections 950 lists the position of each section in the firewall configuration, i.e., the position of a section corresponds to the order by which the section is examined for matching rules relative to other sections. In some embodiments, each section has a corresponding position value in the list of sections. In some embodiments, the position value of a section is also its priority number that reflects the ordering by which the sections are to be examined for matching firewall rules. As such, making changes to the list of sections comprises assigning or modifying priority number(s) of one or more sections in order to maintain the correct ordering of the sections of the firewall configuration. In some embodiments, the task of assigning a priority number to a newly added section also includes modifying the priority numbers already assigned to the existing sections of the firewall configuration. Section II below further describes the assignment of priority numbers to sections. In some embodiments, the task of assigning a priority number to a newly added section is scheduled as an activity.

In some embodiments, the position value/priority numbers of the sections are sparsely allocated, i.e., sections that are consecutive in the ordering of examination do not have consecutive priority numbers, though higher numbers do reflect higher priority than lower numbers in the ordering. The sparsely allocated priority numbers increase the likelihood that a newly added section can be assigned a unique priority number without affecting the priority numbers already assigned to other sections. This allows the insertion of a new section to be faster with lower latency. This also allows multiple different priority assignment tasks/activities (from different tenants) to take place concurrently without interfering with each other, since each activity is free to assign a number from a gap without affecting the assignment of priority numbers by other activities.

In some embodiments, a range of possible priority numbers is considered sparsely allocated if no two sections are assigned consecutive priority numbers within that range. This guarantees that a newly added section whose intended position is within that range can find an available priority number without collision. In some embodiments, a range of possible priority numbers is considered sparse even if some of the assigned priority numbers are consecutive, as long as there are enough slacks (i.e., unassigned priority numbers) in the range such that the priority numbers in the range can be redistributed/rebalanced/reassigned/re-labeled into a new allocation in which a gap of unassigned priority numbers always exists between any two assigned priority numbers.

Figure 10:
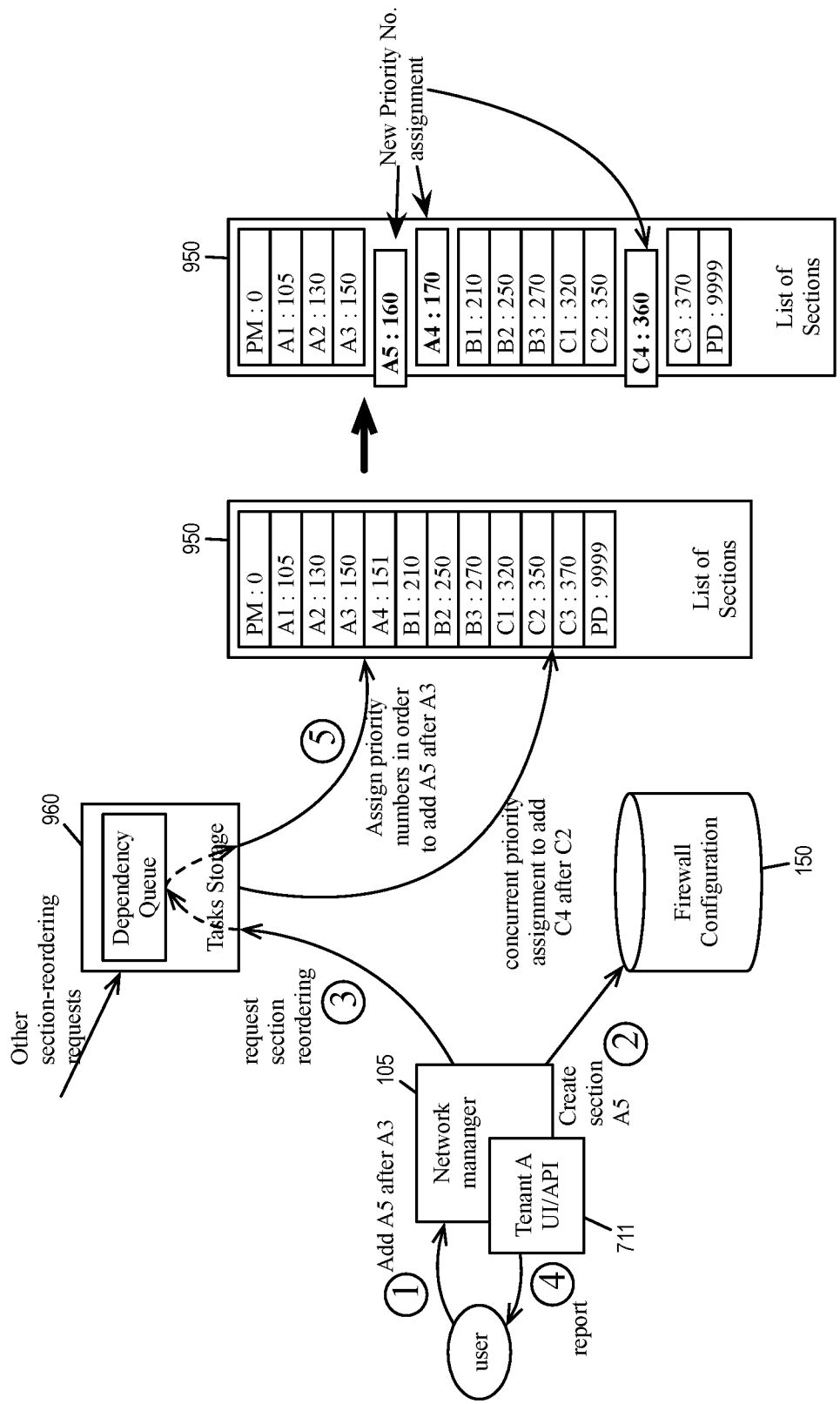
FIG. 10 illustrates a sequence of operations performed by some embodiments when a user/tenant initiates a firewall configuration management operation at its UI/API.

As illustrated in FIGS. 9 and 10, the list of sections 950 indicates that the sections 920-931 respectively have position values (or priority values) 0, 105, 130, 150, 151, 210, 250, 270, 320, 350, 370, and 9999. These values are sparsely allocated (i.e., there are gaps between the assigned priority numbers so they are not consecutive), but they nevertheless reflect the ordering/priority between the different sections such that a section with a higher (smaller) number will be examined before a section with a lower (larger) number.

In order ensure that different tenants can insert their own sections concurrently, some embodiments allot each tenant its own range of permissible priority numbers for sections. In the example of FIGS. 9 and 10, tenant A is allotted a range between 100-199, tenant B is allotted a range between 200-299, and tenant C is allotted a range between 300-399. As such, for example, as long as the range 200-299 remain sufficiently sparse, any of tenant B's firewall management operations will not interfere with any of tenant A's or tenant C's firewall management operations, and the firewall management operations of the three tenants can proceed concurrently. This is analogous to the fact that different tenants can always concurrently update the rules within the sections, since each of the different tenants can only access the rules of its own sections.

Some embodiments identify the dependencies of each section-reordering firewall management operation and place in queue only those section-reordering firewall management operations whose priority assignment is dependent upon a section which has yet to be assigned a priority number. If a scheduled activity for assigning priority to a section does not depend upon priority assignment of another section, or if the depended upon section already has known priority assignment, then the scheduled activity proceeds directly to execution without waiting for any other priority assignment tasks to complete.

In some embodiments, a scheduled task only has to wait for earlier scheduled tasks that it depends on. For example, say there is an earlier scheduled task "adding a section A3". A subsequently scheduled task "adding a section A5 at a position following A3" must sit in a queue to wait for the earlier scheduled task "adding a section A3" to complete before it can execute. However, it would not have to wait for the task "adding a section B3 at a position before B4" to complete, since the priority assignment of section A5 does not depend on priority assignment of section B3. This optimization further reduces the latency when a user/tenant is managing its firewall configuration sections through its corresponding UI/API.

As illustrated in FIG. 9, the task storage 960 includes a set of dependency queues. A priority assignment task (i.e., section re-ordering request) that depends on another priority assignment task has to sit in a dependency queue until all of the depended priority assignment tasks are finished (or until all of the depended sections have known priority numbers), while tasks that do not depend on the priority number of other sections can proceed immediately to execution and access the list of sections without waiting in a queue. In some embodiments, tasks that are in a chain of dependencies will be waiting in a same dependency queue and be executed in sequence based on the dependency.

Some embodiments provide multiple dependency queues for different tenants/users. This is because a tenant typically would initiate firewall management operations that depend on the priority numbers of its own sections but not the priority numbers of other tenants' sections. In some of these embodiments, each tenant would use its own dependency queue in the task storage 960. In some embodiments, a tenant may have multiple dependency queues in the tasks storage 960. Having multiple dependency queues allows multiple different tenants to concurrently request priority assignment/section-reordering without having to wait for each other's priority assignment to complete.

FIG. 10 illustrates a sequence of operations performed by some embodiments when a user/tenant initiates a firewall configuration management operation at its UI/API. The figure illustrates operations that take place among the user of tenant A, the network manager 105, the firewall configuration 150, the section priority assignment tasks 960, and the list of sections 950. The UI/API of tenant A allows the user to only make changes to the firewall configuration sections owned by tenant A.

During the first operation (labeled '1'), the network manager 105 operating the tenant A's UI/API 711 receives input/request from the tenant A user. This input specifies a firewall management operation, which can be adding a section, deleting a section, reading a section, updating a rule, adding a rule, removing a rule, etc. In the example, the specified operation is for adding a section "A5" at a priority position following the section "A3".

During the second operation (labeled '2'), the network manager 105 accesses the firewall configuration 150, e.g., to write, read, or modify the rules of a particular section. This operation does not affect the firewall operations of other tenants and can therefore immediately execute. In some embodiments, different tenants can concurrently access the storage of the firewall configuration 150. In some embodiments the operations '2' and '3' can occur simultaneously, i.e., the operation '3' does not have to wait for the operation '2' and vice versa.

During the third operation (labeled '3'), if requested firewall management operation requires reordering of sections, e.g., to add a new section, the network manager requests or schedules a task for assigning a priority number at the task storage 960. Conversely, if the requested firewall management operation does not require reordering of sections, the network manager would not schedule such a task. If such a section-reordering task depends on the priority assignment of another section, then the task will be queued in the task storage 960 until the depended section has its priority number assigned. If the requested task does not have to wait for the priority number of another section to be assigned, then it can proceed directly to execution and access the list of sections 950 without being queued.

During the fourth operation (labeled '4'), the network manager 105 reports back to the user of tenant A through the UI/API 711, saying it is ready to accept the next firewall management operation from tenant A. In some embodiments, the network manager 105 is ready to accept the next firewall management operation even though the priority assignment task scheduled by operation '3' has yet to be completed (or in fact still sits in a queue). In other words, the priority assignment task is operating in the background and is invisible to the user at the UI/API 711.

During the fifth operation (labeled '5'), the scheduled task for adding the section "A5" after the section "A3" is actually performed. Since the scheduled task "add A5 after A3" depends on the priority assignment of A3, it would wait in the task storage 960 unless or until the section A3 is assigned a priority number. Once it executes, the priority assignment task assigns a priority number to the section "A5" in order for it be right after the section "A3". However, since the priority number of the section "A3" is "150" and the priority number of the section "A4" is "151", the priority assignment task changes the priority number of the section "A4" from "151" to "170" in order to make room for the section "A5" to be after the section "A3". The task then assigns the priority number "160" to the section "A5", which allows the section "A5" to be positioned after "A3" but before "A4". Again, all this takes place in the background while the tenant A user is free to specify another firewall configuration management operation at the UI/API 711.

As mentioned, multiple concurrent processes/activities can make modifications to the list of sections 950. As illustrated, during operation '5', another scheduled task by tenant C is concurrently adding a section "C4" after the section "C2". The new section "C4" is assigned a priority number "360" from the gap between the number "350" of "C2" and "370" of C4". This task is free to take place concurrently with the operation to add section "A5" since they do not affect each other. The sparseness of the priority number allocation ensures there is another gap/slack between numbers assigned to different tenants such that the priority assignment by one tenant is unlikely to affect the priority assignment by another tenant.

Figure 11:
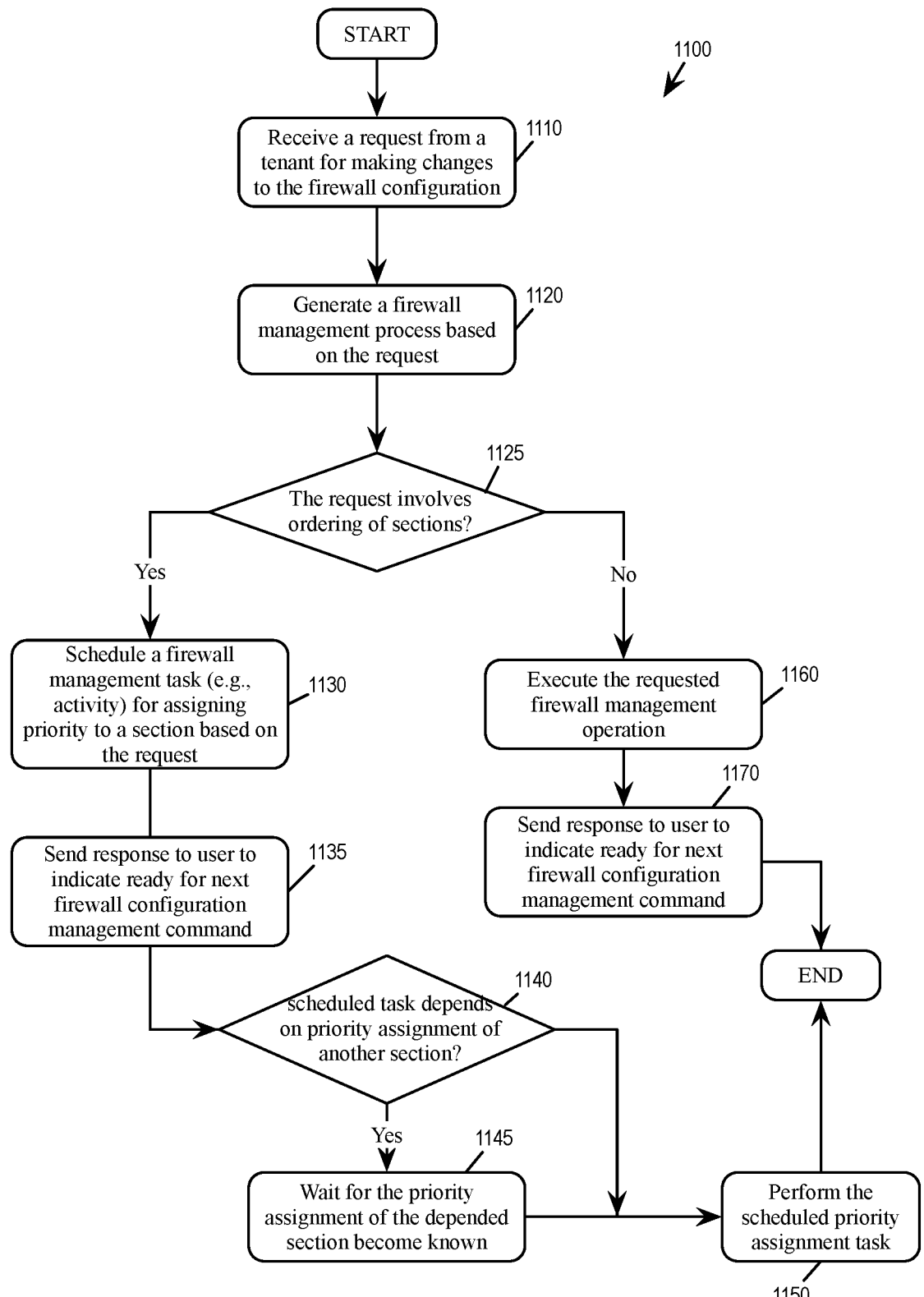
FIG. 11 conceptually illustrates a process implementing a request to update the firewall configuration of a software defined data center.

For some embodiments, FIG. 11 conceptually illustrates a process 1100 implementing a request to update the firewall configuration of a software defined data center. Some embodiments perform the process at the network manager (e.g., 105) of the data center, which controls the firewall configuration.

The process starts when it receives (at 1110) a request from a tenant for making changes to the firewall configuration of the data center. In some embodiments, a tenant uses the user interface element (UI, API, etc.) provided by the network manager to generate this request. In some embodiments, the network manager provides the user interface element to a tenant through a tenant access platform that supports multiple requests by multiple tenants at the same time.

The process then generates (at 1120) a firewall management process based on the request. It is important to emphasize that the process can handle multiple requests from multiple tenants at the same time in some embodiments. This is in order to allow each tenant to access and control its own firewall rules in the firewall configuration.

Next, the process determines (at 1125) whether the request involves ordering of sections, i.e., requires access to the list of sections. For example, a firewall management process that seeks to add or delete a section in the firewall configuration is a process that requires access to the list of sections. Some embodiments allow a "Get" request that retrieves the content of the list of sections. Such requests are also requests to access the list of sections. On the other hand, requests for changes (adding, editing, deleting) to the rules within a section result in firewall management processes that do not need to access the list of sections. If the firewall management request requires access of the list of sections, the process proceeds to 1130. If the firewall management request does not require access to the list of sections, the process proceeds to 1160.

At 1130, the process schedules a firewall management task for assigning priority to a section based on the request. The process then sends (at 1135) a response to the user to indicate that it is ready to accept the next firewall configuration management. The process then proceeds to 1140 to perform further operations as background tasks that are transparent to the user.

At 1140, the process determines whether the priority assignment of the requested section depends on the priority assignment of another section. For example the task "add a section A5 after the section A3" depends on the priority assignment of A3, while the task "delete section A2" does not depend on the priority assignment of any other section. If there is such a dependency, the process proceeds to 1145. Otherwise the process proceeds to 1150.

At 1145, the process waits for the priority assignment of the depended section to become known. If the priority assignment of the depended section is already known, e.g., if the depended section is a section already in the firewall configuration with an already assigned priority number, the process proceeds to 1150. On the other hand, if the priority assignment of the depended section is still unknown or not yet recorded in the list of sections, e.g., if the depended section whose priority assignment is waiting to be assigned by a previously scheduled task that has yet to be executed, then the process keeps on waiting until the previously scheduled task executes and assigns a priority number to the depended section. The process then proceeds to 1150.

At 1150, the process executes the scheduled priority assignment task and assigns the priority to the added section by performing the necessary edits to the list of sections. Again, multiple priority assignment tasks may make edits to the list of sections as long as their priority number assignment operations do not interfere with each other (such as the task to add A5 and the operation to add C4 as illustrated in FIG. 10). The process 1100 then ends.

At 1160, the process executes the firewall management operation. At this point of the process 1100, the process has determined that the requested firewall management operation does not involve modifying the ordering of sections, e.g., the operation is for updating the rules of a section. The process therefore executes the operation without waiting for any other firewall management operations. The process then sends (at 1170) a response to the user to indicate that it is ready to receive the next firewall configuration management command. The process 1100 then ends.

The list of sections 950 is a data structure that is shared by the different tenants and can be edited by different tenants. Some embodiments therefore provide mechanisms to ensure that these concurrent write operations do not affect each other by e.g., having different scheduled priority assignment tasks assigning the same priority number to different sections, or having different priority numbers assigned to a same section. Some embodiments rely on locking or queuing mechanisms to ensure that only one task or activity is allowed to make changes to the list of sections at one time. Some embodiments, on the other hand, rely on the sparseness of the priority number allocation to ensure that concurrent priority assignment operations by different tenants do not interfere with each other.

However, each tenant is free to add and remove sections at whatever position or sequence that suits its purpose, which may cause the assignment/allocation of priority numbers to no longer be sparse, i.e., adjacent sections are assigned consecutive priority numbers as to leave no gap for subsequently insertion of sections. In order to make room for the subsequently added section, the priority number(s) assigned to existing sections in the firewall configuration would have to be reassigned, or rebalanced. As illustrated in the example of FIG. 10, adjacent sections A3 and A4 are assigned consecutive priority numbers ("150" and "151") so that a subsequent insertion of section A5 between A3 and A4 requires the priority number of either section A3 or section A4 be changed in order to make room for the section A5. Since such reassignment is time consuming and may cause multiple concurrent priority assignment tasks to interfere with each other (especially when the priority numbers of many sections have to be reassigned in order to create the requisite gaps in priority number space), some embodiments provide mechanisms for maintaining the sparseness of the priority number assignment and hence maximizes the probability that multiple priority assignment tasks can take place concurrently. Section II below discusses various methods for maintaining the sparseness of priority number allocation for some embodiments of the invention.

II. Fast Ordering of Rules and Sections

As mentioned, in order to add a section to a firewall configuration, some embodiments schedule a priority assignment task that edits the list of sections in order to assign priority numbers. Such assignment of priority is for the purpose of maintaining the ordering between the sections. However, maintaining the order of sections in the firewall configuration is not trivial when a tenant is free to add and delete sections at whatever position desired by the tenant. The same problem applies to maintaining order between rules within a section, since the rules within a section are also ordered such that the rules are examined according to a specified order. Some embodiments accomplish the ordering of sections and rules by treating the maintenance of ordering as a list-labeling and/or order maintenance problems.

FIGS. 12-16 describe various techniques for assigning priorities to the sections of the firewall configuration as well as for assigning priorities to the rules of a firewall section. However, for purpose of avoiding duplicative description, FIGS. 12-16 illustrate the assignment of priorities to sections of a firewall configuration rather than the assignment of priority to rules of a firewall configuration section. However, one of ordinary skill would understand that the techniques for maintaining the ordering of sections apply equally well to maintaining the ordering of rules within a section. As mentioned, some embodiments assign each section a priority number (which is also referred to as a key) according to the ordered position of the section in the firewall configuration, and the sections are ordered according to their relative priorities based on the assigned priority numbers. Likewise, each rule of a section is assigned a priority number according to its ordered position in the section, and the rules of the section are ordered according to their relative priority based on the assigned priority numbers.

Figure 12:
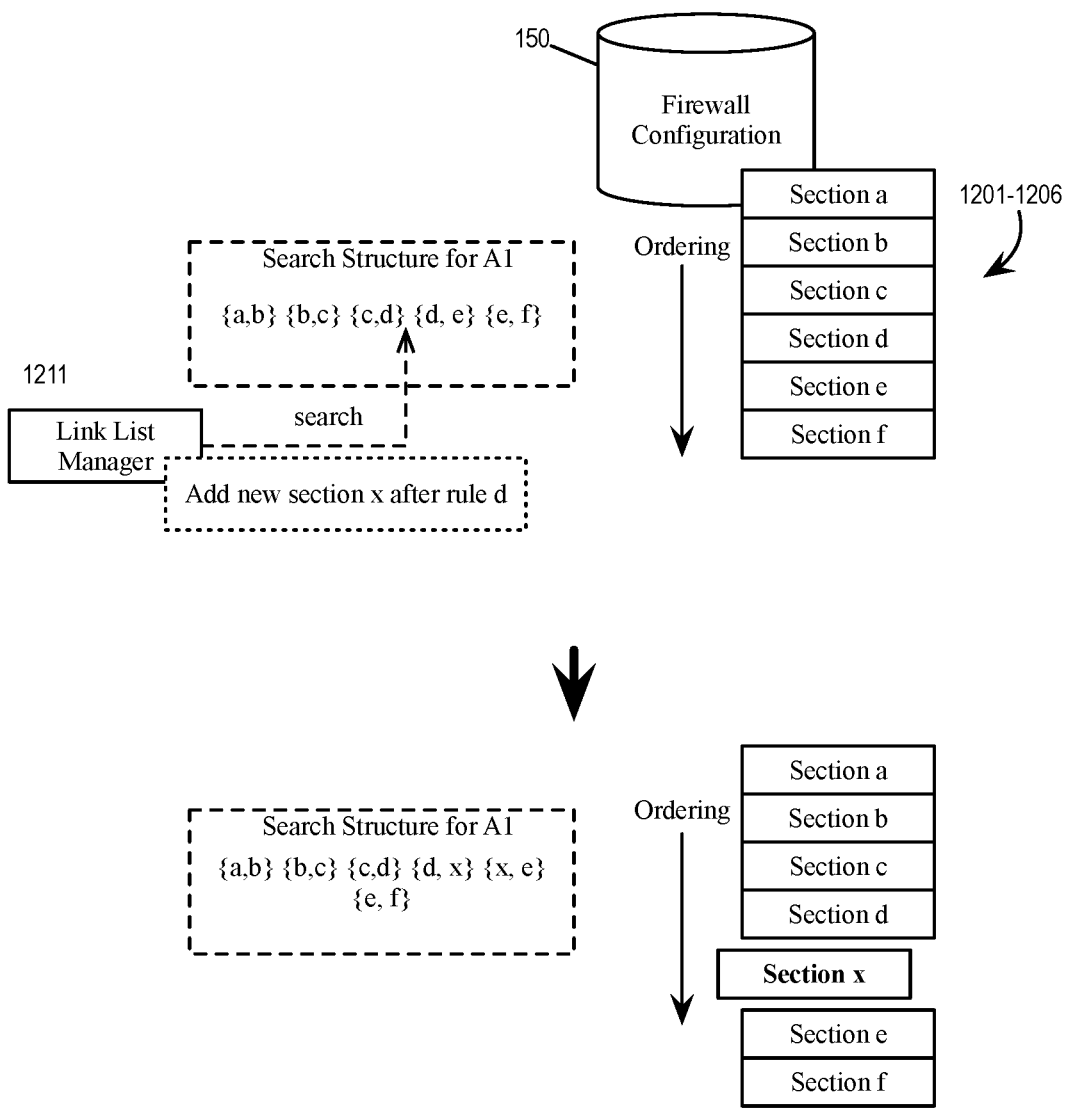
FIG. 12 conceptually illustrates a section of rules that maintains ordering by organizing the rules as a sequence of linked pairs.

Some embodiments maintain the ordering of sections in the firewall configuration by organizing the sections as a linked list. In some embodiments, this entails implementing a search data structure that stores the list of sections as a linked list, e.g., a sequence of linked pairs. FIG. 12 conceptually illustrates the firewall configuration 150 maintaining ordering of sections by organizing the sections as a sequence of linked pairs.

As illustrated, the firewall configuration 150 has several sections 1201-1206 ('a', 'c', 'd', 'e', 'f') that are prioritized in that order. The ordering of these sections is maintained by a search structure that organizes the sections as a linked list, specifically a sequence of linked pairs {a,b} {b,c} {c,d} {d,e} {e,f}.

The figure also illustrates an example section insertion operation that is adding a section 'x' after the section 'd'. The operation uses a link list manager 1211 to traverse the linked pairs from the first pair {a,b} until it reaches a pair with d. The link list manager 1211 then inserts the new section 'x' into the linked list by adding a new link {d,x} and by changing the link {d,e} to {x,e}. The sequence of linked pair then becomes {a,b} {b,c} {c,d} {d,x} {x,e} {e,f}. These link management operations allow the sections of firewall configuration 150 to be in the order as intended by the tenant or the administrator following the section insertion operation. To insert a section into such an ordered list is a computation that requires time in the order of N, N being the number of section in a firewall configuration of the data center.

In some embodiments, the ordering of sections in the firewall configuration is managed by using a binary search tree. The use of the binary search tree ensures that the addition or deletion of a section or a rule can be accomplished within a time period that is in the order of log(N), N being the number of sections. In some embodiments, the binary search tree is a complete binary search tree such that every possible priority number (both assigned and unassigned) has a unique corresponding node in the tree. In some embodiments, each node includes an indication of whether the priority number is assigned and which section it is assigned to.

Figure 13:
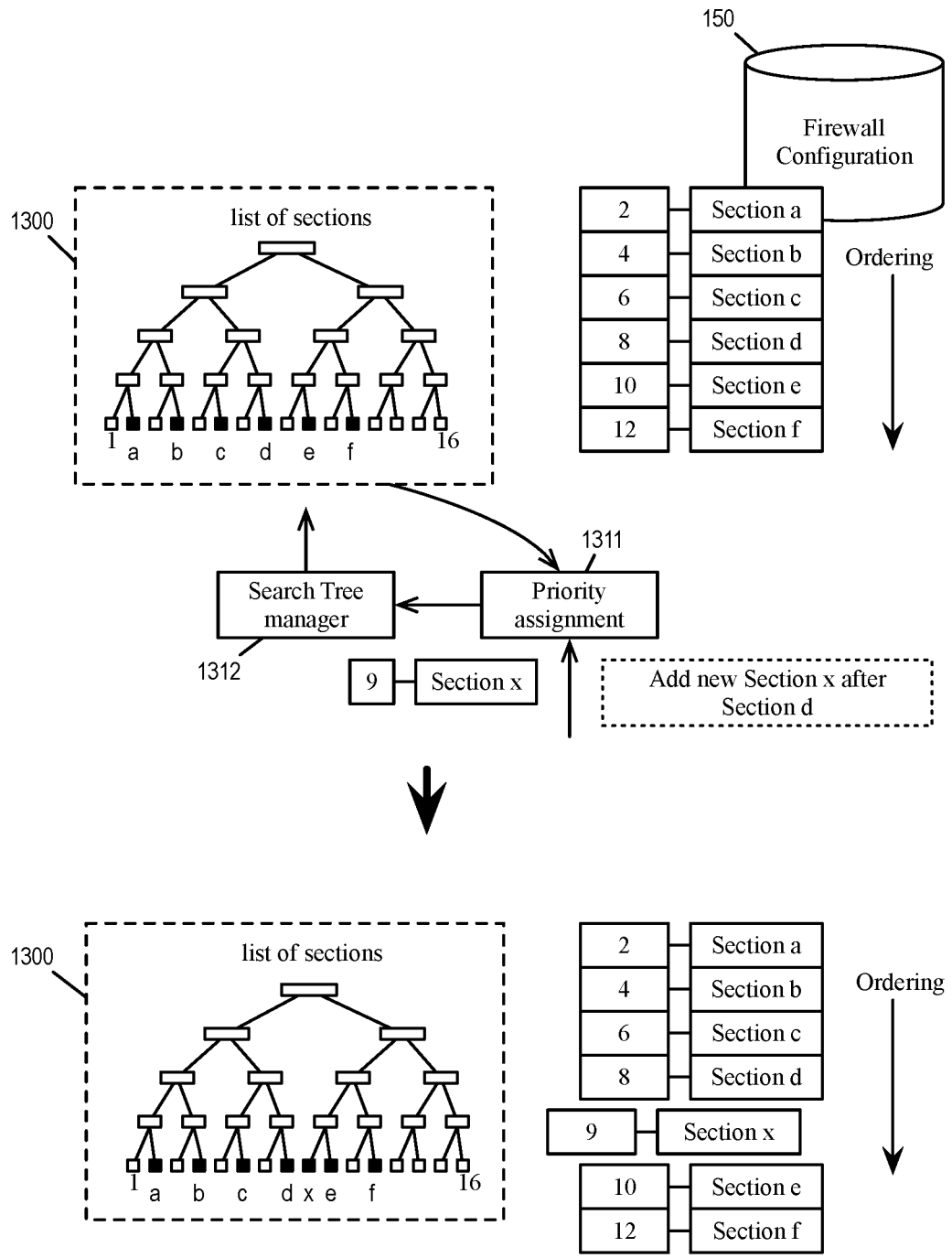
FIG. 13 illustrates a complete binary tree whose nodes correspond to priority numbers assigned to rules in a firewall configuration section.

FIG. 13 illustrates a complete binary tree 1300 whose nodes correspond to priority numbers assigned to sections in a firewall configuration. As illustrated, the sections of the section 1201 'a', 'c', 'd', e', 'f' are correspondingly assigned priority numbers 2, 4, 6, 8, 10, and 12. A search tree manager 1312 uses these priority numbers to create the complete binary search tree 1300, where each occupied node corresponds to an assigned priority number while each empty node corresponds to an unassigned priority number. Since this is a binary search tree, the traversal to any particular node in the tree is in the order of log(N), N being the number of sections in the section.

The figure also illustrates an example section insertion operation that is adding a section 'x' after the section 'd'. In order to insert the new section 'x' as a node in the binary search tree, a priority assignment operation 1311 traverses the binary search tree to identify an available (i.e., unassigned) priority number that would correctly reflect the ordered position of the new section x, namely after section 'd' but before section 'e'. Since the section 'd' is assigned priority number 8 and the section 'e' is assigned priority number 10 and the priority number 9 is available, the firewall management process assigns the priority number 9 to the new section 'x'. The search tree manager operation 1312 then associates the node for priority number 9 with the section 'x'. In some embodiments, the priority assignment operation 1311 and the search tree manager 1312 are both operations performed by a firewall management process.

In the example of FIG. 13, the priority assignment operation 1311 is able to assign a priority number 9 that reflects the order position of the new section 'x' in the section because there is a gap in numbering (i.e., empty node or nodes) between the section immediately before (i.e., section 'd' with priority number 8) and the section immediately after (i.e., section e' with priority number 10). If there was no such gap, the firewall management process would have to perform an operation that reassigns priority number to at least some of the sections in order to make room for the new section at its intended priority position. This can be computationally quite expensive. To avoid this, the priority assignment operation 1311 in some embodiments performs several additional optimizations regarding the assignment of priority numbers when inserting a section into the firewall configuration. In some embodiments, some of these optimization techniques ensures that the priority numbers assigned to the different sections be sparsely allocated, which as mentioned by reference to FIG. 9 above, allows priority numbers to be assigned quickly and minimizes the need for reassigning the priority number of other sections.

Figure 14:
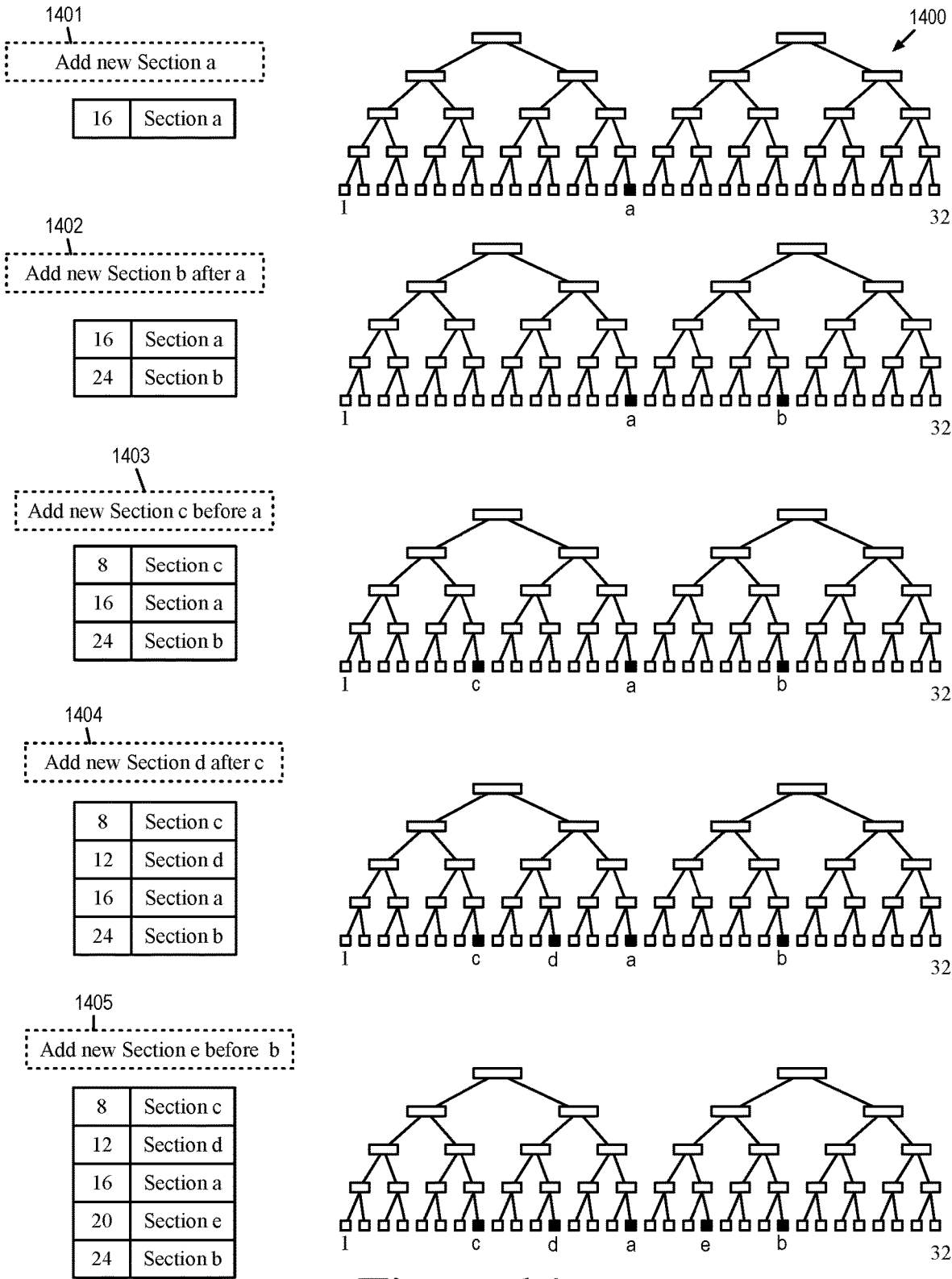
FIG. 14 illustrates a priority assignment scheme that seeks to leave as much room as possible between adjacent priority numbers.

Some embodiments, when assigning priority numbers to new incoming sections, use a greedy scheme, which always leaves as much room as possible, e.g., by assigning a priority number that is right in the middle of the available space between the priority number immediately before and the priority number immediately after. FIG. 14 illustrates a priority assignment scheme that seeks to leave as much room as possible between adjacent priority numbers.

FIG. 14 illustrates a series of section insertions 1401-1405 for inserting sections 'a' through 'e', respectively. Each inserted section is assigned a priority number that leaves the most room to the section immediately before and to the section immediately after. (In this example the range of priority number is from 1 to 32.) For example, the tenant (at the section insertion 1406) specifies that the section 'e' shall be inserted at a position before 'b' (and thus after 'a') in the firewall configuration section. Since the section 'b' is assigned priority number 24 and the section 'a' is assigned priority number 16, the priority assignment operation assigns the priority number 20 to the section 'e'. Consequently, the sections 'a', 'c', 'd', 'e' are assigned priority numbers 16, 24, 8, 12, and 20, respectively. The figure also shows the complete binary tree 1400 that is constructed based on the assigned priority numbers as the sections are being inserted.

The example of FIG. 14 shows a sequence of insertions that is fairly randomly balanced. The priority assignment operation is therefore able to allocate a priority number for each of the newly inserted sections. However, it is also likely that the tenant inserts the sections in the same order as the sections are to be positioned in the firewall configuration section. This type of sequence is highly unbalanced because each newly inserted section is always to the one side of the previously inserted sections. If the priority assignment operation were to always assign a priority number that is right in the middle of the available space, a highly unbalanced section insertion sequence would leave little or no room for subsequent insertions. Some embodiments record the sequence of section insertions and assign priority numbers based on the recorded sequence, i.e., by detecting the pattern of the section insertions. The assignment priority number for each section is chosen to minimize the possibility of running out of priority numbers to assign due to unbalanced sequence, i.e., to minimize collision of priority numbers between newly inserted section and sections already in the firewall configuration.

Figure 15:
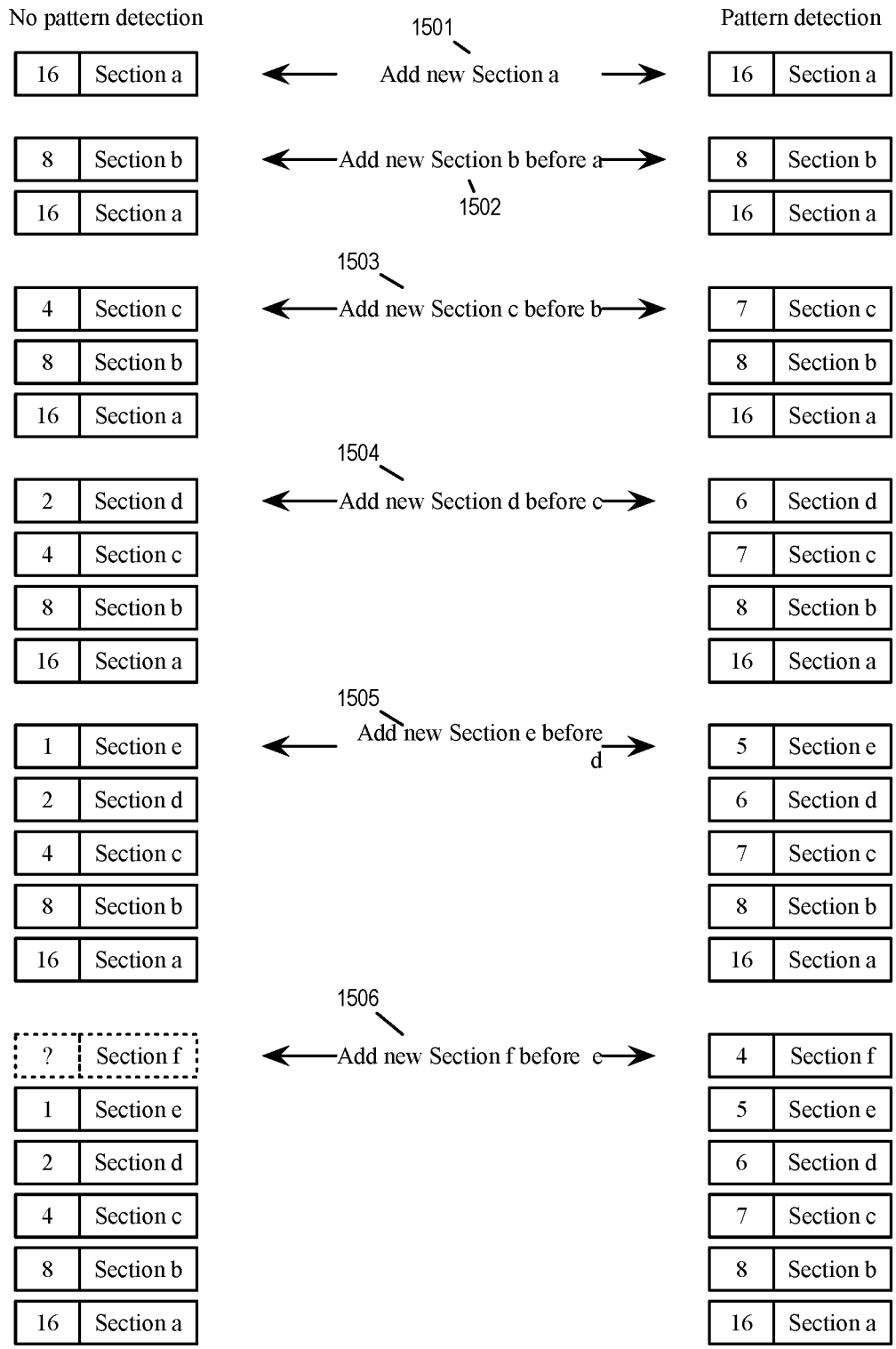
FIG. 15 shows assignment of priority numbers when the sequence of rule insertion is unbalanced.

FIG. 15 shows assignment of priority numbers when the sequence of section insertion is unbalanced. The figure shows an example of such unbalanced sequence of section insertions 1501-1506. As illustrated, sections 'a' through 'f' are inserted in sequence, and each section is to be before the previously inserted section. When the priority assignment is simply to select the middle number in the available space, the assignment of priorities would run out of available priority numbers to assign. In this example, after the insertion of the section e', there is no room for inserting the section 'f' (assuming there can be no priority number less than 1).

For the same unbalanced sequence of section insertions, FIG. 15 also shows an example priority assignment scheme that assigns priority number based on detection of insertion patterns. In this example, the priority assignment operation detected that the sequence of section insertion is for inserting a continuous set of sections, i.e., every section inserted is before the last inserted section. The priority assignment operation therefore stops seeking to leave as much room as possible between adjacent priority numbers. Instead, the priority assignment simply provides consecutive numbers as priority numbers (the sections 'c', 'd', 'e', and 'f' are assigned consecutive as priority numbers 7, 6, 5, 4, respectively), leaving room for additional sections beyond section 'f'.

In some embodiments, a firewall management process perform periodic rebalancing of the assigned priority numbers, i.e., to re-label at least some of the sections (or rules)

with different priority numbers in order to create more room for subsequent section insertions. Such rebalancing also helps to ensure that the assignment of priority numbers to the different sections remain sparsely allocated. Some embodiments perform rebalancing when unable to assign a priority number to the newest section being inserted. Some embodiments perform rebalancing of the assigned priority number by re-distributing the keys uniformly (i.e., by reassigning the priority numbers to the sections in a uniformly spaced fashion while maintaining the original ordering). Some embodiments perform rebalancing by assigning more space (i.e., allocating more unassigned priority numbers) around the key assigned to the section whose insertion caused the rebalancing.

Some embodiments perform periodic rebalancing of the assigned priority numbers, i.e., to re-label at least some of the sections (or rules) with different priority numbers in order to create more room for subsequent section insertions. Such rebalancing also helps to ensure that the assignment of priority numbers to the different sections remain sparsely allocated. A firewall management process in some embodiments performs rebalancing when it is not able to assign a priority number to the newest section being inserted.

Some embodiments perform rebalancing of the assigned priority number by re-distributing the keys uniformly (i.e., by reassigning the priority numbers to the sections in a uniformly spaced fashion while maintaining the original ordering). Some embodiments perform rebalancing by assigning more space (i.e., allocating more unassigned priority numbers) around the key assigned to the section whose insertion caused the rebalancing.

Figure 16:
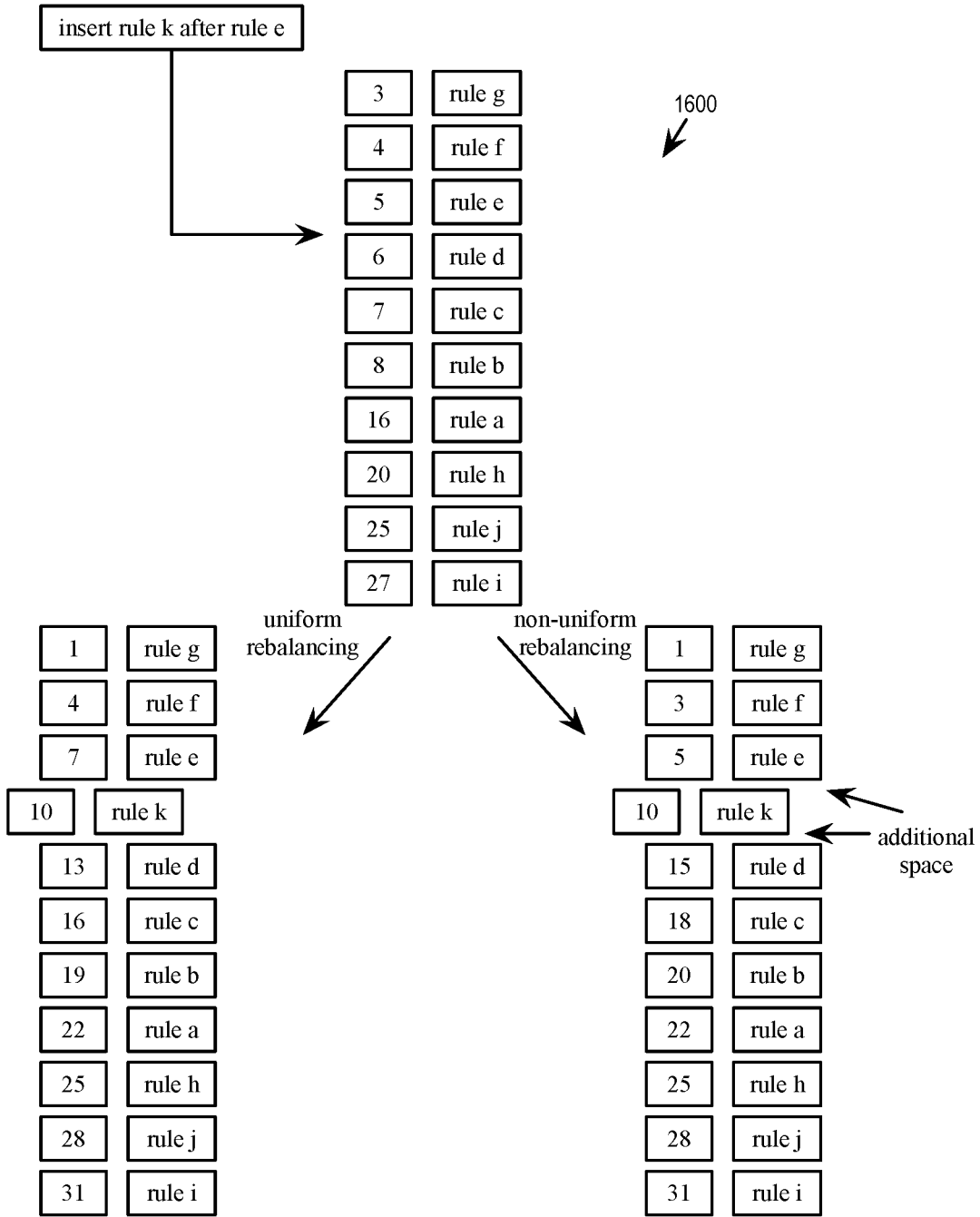
FIG. 16 illustrates the rebalancing of the priority number assignment.

FIG. 16 illustrates the rebalancing of the priority number assignment. The figure illustrates a firewall configuration section 1600 that already has sections 'a' through 'j'. The sections are each assigned a priority number when they were inserted into the firewall configuration section. As illustrated, the tenant has requested to insert a section 'k' to be after section 'e', but there is no space for the insertion after section 'e', since section 'e' is assigned priority 5, and section is already assigned priority 6, so there is no room for insertion of section 'k' after section 'e'.

Consequently, the firewall management process performs a rebalancing of the priority numbers/keys of the section in order to create space for inserting the new section at its specified position. The rebalancing assigns each section a new priority number, albeit still maintaining in the same order as before. The rebalancing operation created additional spacing around sections 'e' and (and elsewhere), and the new section 'k' can now be assigned a priority number between sections 'e' and 'd'.

The figure illustrates two types of rebalancing, uniform rebalancing and non-uniform rebalancing. In uniform rebalancing, the reassigned keys are even spaced. Uniform rebalancing is useful when the next section can be inserted anywhere with equal probability. On the other hand, non-uniform rebalancing assumes the next section being inserted is more likely to be in the vicinity of the newly inserted section (the section whose insertion necessitated the rebalancing), and additional sections are likely to be inserted around the same region of the priority number space. Consequently, non-uniform rebalancing assigns more space around the newly inserted section (i.e., section 'k') and leave less space elsewhere. In this example, the section 'k' is assigned priority number 10, and the two nearest sections are each 5 away (section 'e' is reassigned priority 5 and section 'd' is reassigned priority 15); else where the spacing between adjacent sections is no more than 3. Some embodiments assign up to ¼ of the entire range of possible priority numbers as spacing around the key assigned to the section whose insertion necessitated the rebalancing. (The range of possible priority numbers in this example is 1 through 32, so ¼ of the entire range is 8).

Figure 17:
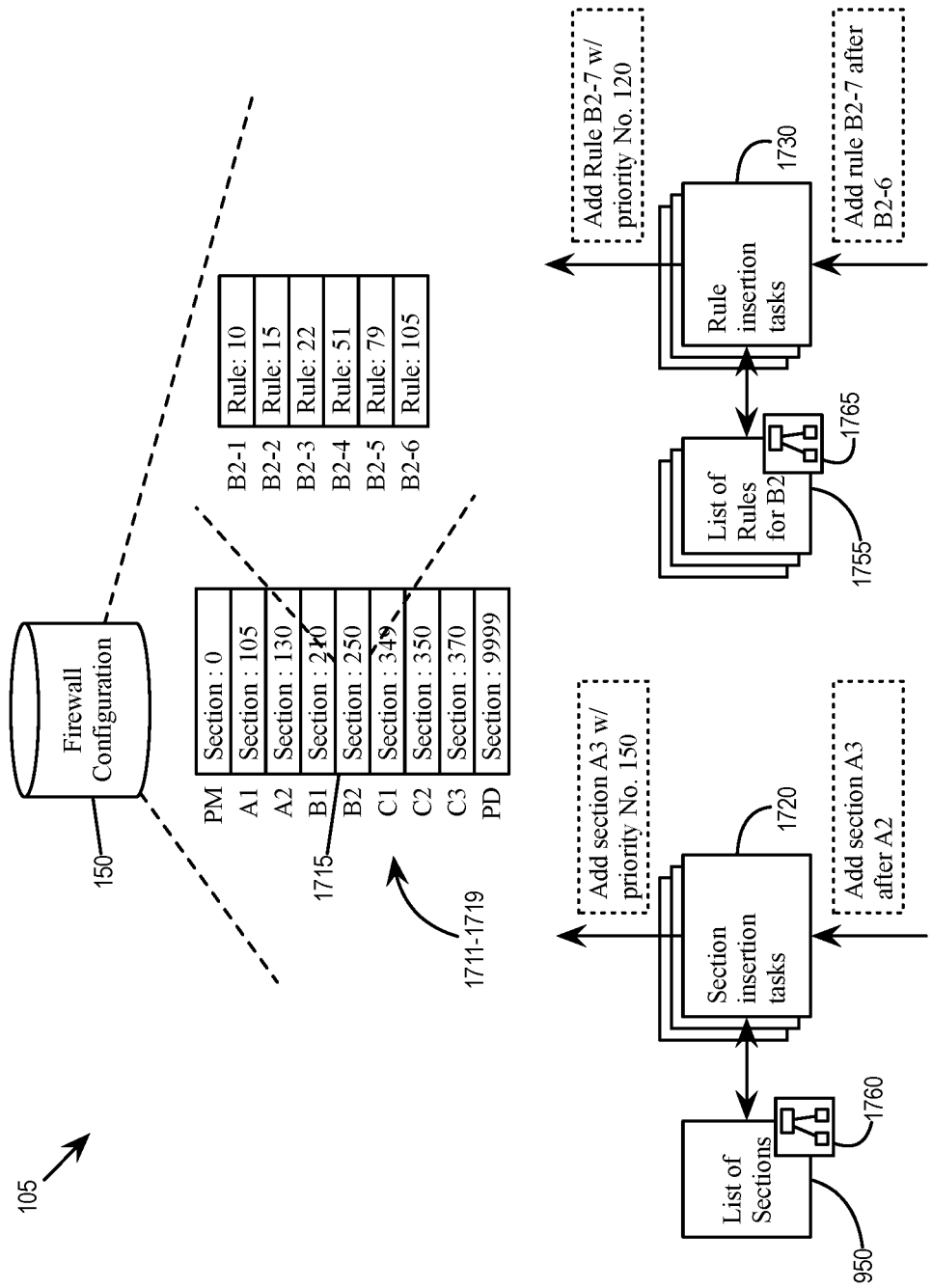
FIG. 17 illustrates a network manager that performs priority assignments for newly added rules as well as for newly added sections.

As mentioned, the techniques for assigning priority numbers to sections of a firewall configuration described by FIGS. 12-16 above apply equally for assigning priority numbers to rules of any given section. FIG. 17 illustrates a network manager that performs priority assignments for newly added rules as well as for newly added section.

As illustrated, the firewall configuration 150 includes sections 1711-1719, and the network manager 105 maintains the list of sections 950 for maintaining the ordering of the sections in the firewall configuration 150. The network manager 105 also maintains a list of rules for each section in the firewall configuration, such as the list of rules 1755 for the section 1715 ("B2"). Different firewall management tasks from different tenants are making changes to the firewall configuration, including tasks 1720 for adding sections and tasks 1730 for adding rules to particular sections.

Each insertion of a new section uses the list of sections 950 to assign a priority number to the newly added section. Each insertion of a new rule to a section uses the list of rules of that section to assign a priority number to the new rule (e.g., using the list of rules 1755 for the section B2 to assign priority to a newly added rule B2-7 into the section B2).

The network manager 105 performs rebalancing of priority numbers allocated to the sections of the firewall configuration by using a binary search tree 1760 associated with list of sections 950. The network manager also performs rebalancing of priority numbers allocated to the rules of the each section by using a binary search tree associated with the list of rules of that section (e.g., the binary search tree 1765 of the list of sections 1755).

Figure 18:
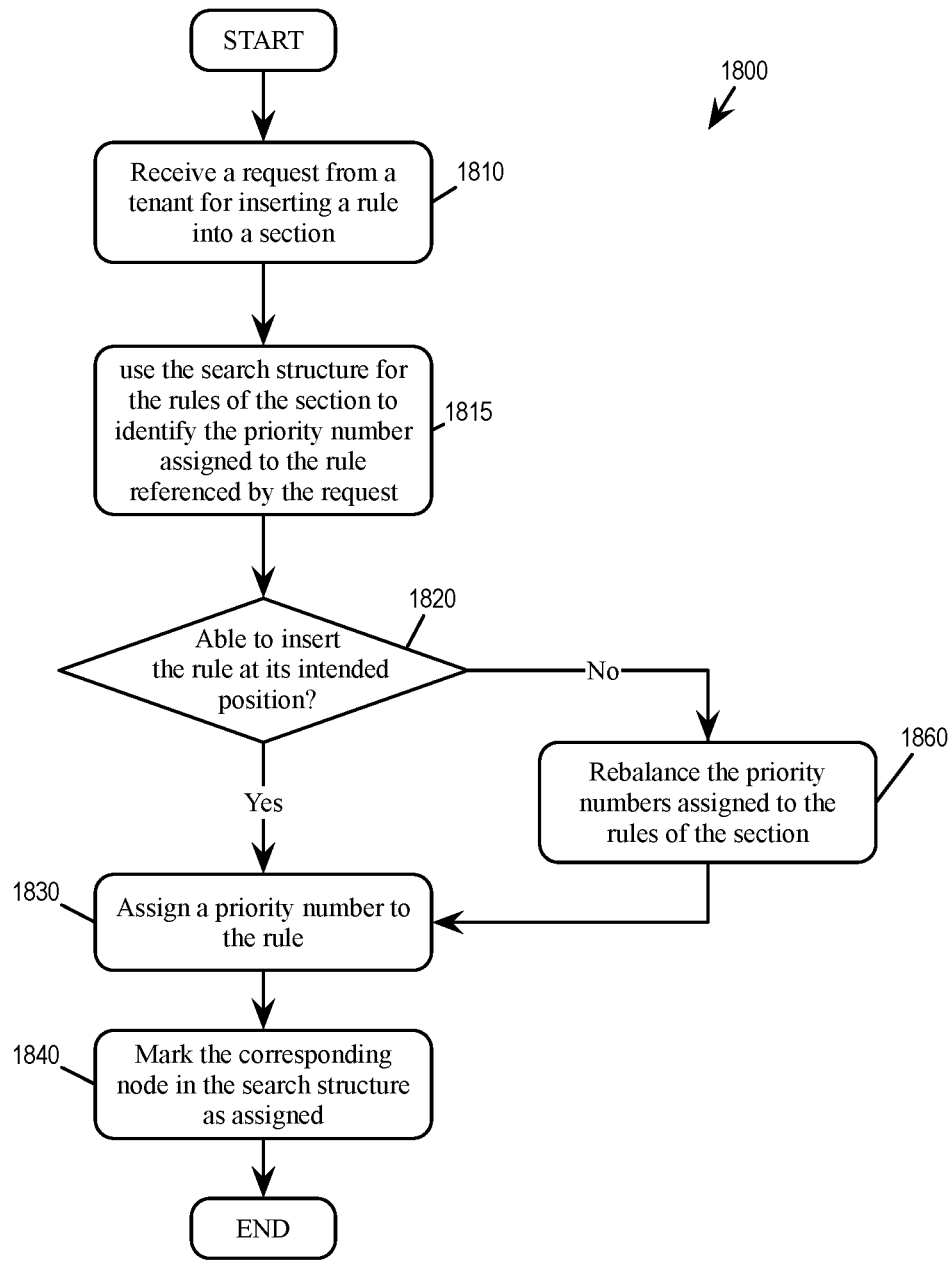
FIG. 18 conceptually illustrates a process for inserting a rule in into a section while maintaining the ordering of the rules within the section.

For some embodiments, FIG. 18 conceptually illustrates a process 1800 for inserting a rule in into a section while maintaining the ordering of the rules within the section. In some embodiments, a network manager performs the process 1800 as part of a firewall management process. In some embodiments, the process 1800 is performed as an activity operating in the background until it completes the priority number assignment task.

The process 1800 starts when it receives (1810) a request from a tenant to insert a rule in a section. Such a request in some embodiments specifies the rule's intended position relative to other rules in the section, e.g., by specifying that the rule is to be after a particular rule, unless the rule is the first rule inserted into the section.

The process then identifies (at 1815) the priority number of the referenced rule. In some embodiments, each rule in the section has a unique ID (e.g., universal unique identifier, or UUID) that allows the rule to be quickly identified and mapped to its corresponding priority number. This priority number will be used to identify the priority numbers that have already been assigned around the intended position.

The process then determines (at 1820) whether it is able to insert the rule at its intended position around the identified priority number of the referenced rule. In some embodiments, the process uses the priority number binary search tree associated with the list of rules of the section to identify an available (i.e., unassigned) priority number that can be assigned to accurately reflect the intended position of the new rule. If there is space for inserting the rule, i.e., there is an unassigned priority number that can correctly reflect the position of the rule being inserted, the process proceeds to

1830. If there is no space for inserting the rule at its intended position (i.e., collision), the process proceeds to 1860.

At 1860, the process performs rebalancing of the priority numbers assigned to the rules of the section (since the process is not able to assign a priority number to the rule being inserted). Some embodiments balance the priority numbers by reassigning the new priority numbers to all rules with uniform spacing. Some embodiments rebalance the priority numbers by reassigning new priority numbers that leave more spacing around the newly inserted rule (i.e., the rule that necessitated the rebalancing) than elsewhere in the range of priority numbers. The process 1800 then proceeds to 1830 to assign a priority number to the newly inserted rule.

At 1830, the process assigns a priority number to the rule by selecting a number that is between the adjacent rules. Some embodiments assign the number in the middle of the gap between the two adjacent rules as the priority number for the rule. Some embodiments select a number based a detected pattern. The selection of a priority number is discussed above by reference to FIG. 15. The process then marks (at 1840) a node in the binary search tree that corresponds to the newly assigned priority number as assigned to the newly added rule. The process 1800 then ends.

Figure 19:
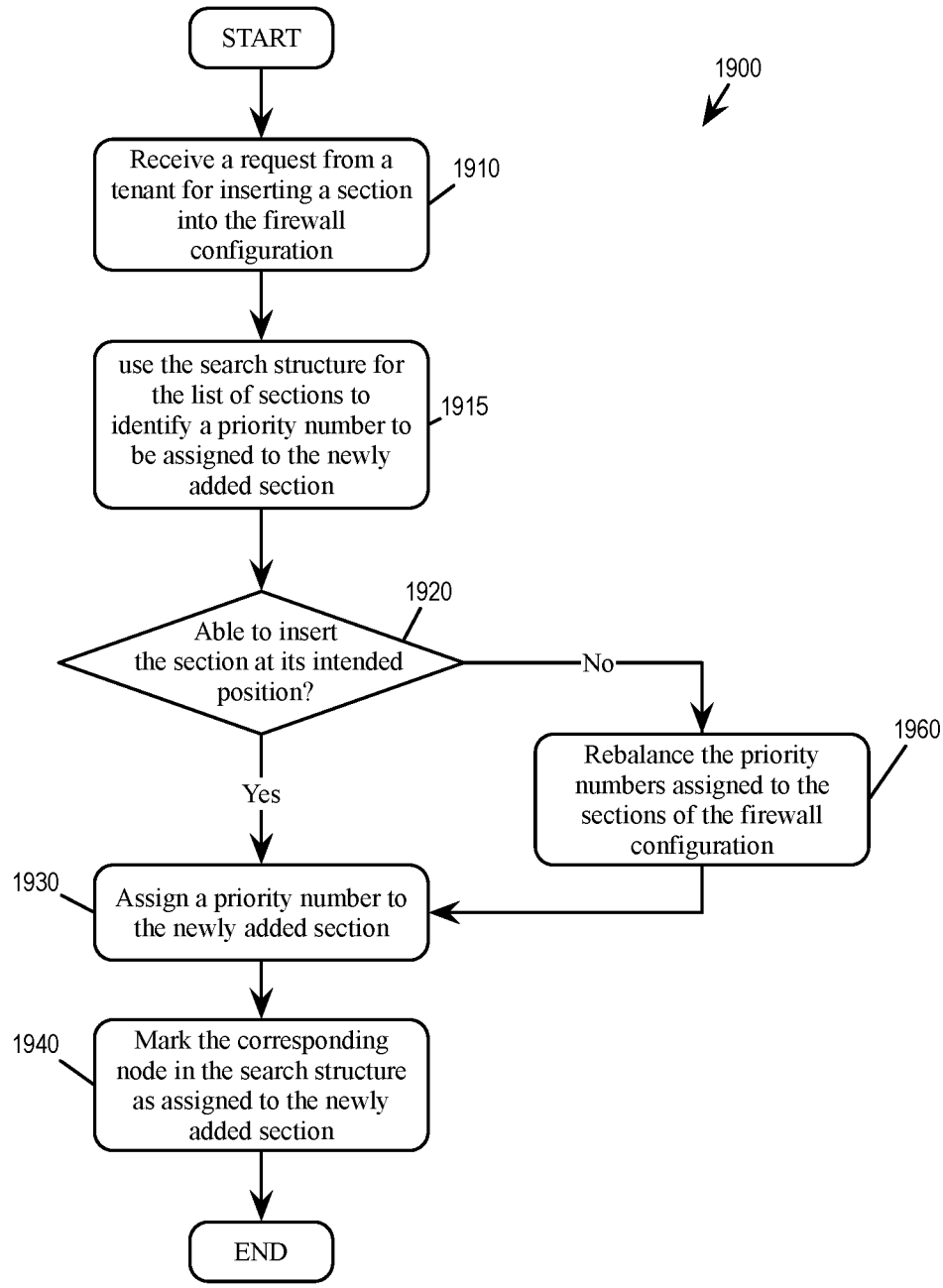
FIG. 19 conceptually illustrates a process for inserting a section into a firewall configuration while maintaining the ordering of the sections within the firewall configuration.

For some embodiments, FIG. 19 conceptually illustrates a process 1900 for inserting a section into a firewall configuration while maintaining the ordering of the sections within the firewall configuration. In some embodiments, a network manager performs the process 1900 as part of a firewall management process. In some embodiments, the process 1900 is performed as an activity operating in the background until it completes the priority number assignment task.

The process 1900 starts when it receives (1910) a request from a tenant to insert a section in the firewall configuration. Such a request in some embodiments specifies the section's intended position relative to other sections in the firewall configuration, e.g., by specifying that the section is to be after a particular section, unless the section is the first section inserted into the section.

The process then identifies (at 1915) the priority number of the referenced section. In some embodiments, each section in the firewall configuration has a unique ID (e.g., universal unique identifier, or UUID) that allows the section to be quickly identified and mapped to its corresponding priority number. This priority number will be used to identify the priority numbers that have already been assigned around the intended position.

The process then determines (at 1920) whether it is able to insert the section at its intended position around the identified priority number of the referenced section. In some embodiments, the process uses the priority number binary search tree associated with the list of sections, such as 1300, to identify an available (i.e., unassigned) priority number that can be assigned to accurately reflect the intended position of the new section. If there is space for inserting the section, i.e., there is an unassigned priority number that can correctly reflect the position of the section being inserted, the process proceeds to 1930. If there is no space for inserting the section at its intended position (i.e., collision), the process proceeds to 1960.

At 1960, the process performs rebalancing of the priority numbers assigned to the sections of the firewall configuration (since the process is not able to assign a priority number to the section being inserted). Some embodiments balance the priority numbers by reassigning the new priority numbers to all sections with uniform spacing. Some embodiments rebalance the priority numbers by reassigning new priority numbers that leave more spacing around the newly inserted section (i.e., the section that necessitated the rebalancing) than elsewhere in the range of priority numbers. Some embodiments use the binary search structure associated with the list of sections to identify a range to confine the rebalancing operation. The operation to identify a range for rebalancing priority numbers for sections will be described in further detail by reference to FIG. 20 below. The process 1900 then proceeds to 1930 to assign a priority number to the newly inserted section.

At 1930, the process assigns a priority number to the section by selecting a number that is between the adjacent sections. Some embodiments assign the number in the middle of the gap between the two adjacent sections as the priority number for the section. Some embodiments select a number based on a detected pattern of insertion. The selection of a priority number is discussed above by reference to FIG. 15. The process then marks (at 1940) a node in the binary search tree that corresponds to the newly assigned priority number as assigned to the newly inserted section. The process 1900 then ends.

As mentioned, some embodiments rely on sparseness of the priority allocation to maximize the possibility that different section insertion requests by different tenants may take place concurrently. In order to maintain or improve the sparseness of priority allocations, some embodiments perform rebalancing operations that re-label at least some of the sections (or rules) with different priority numbers. However, a rebalancing operation itself may interfere with some of the section insertion/priority assignment tasks, forcing some of the priority assignment tasks to wait for rebalancing operation to complete before proceeding. In order to minimize such waiting and to further maximize concurrency, some embodiments use the binary search tree to segment the priority number space into ranges and to confine rebalancing operations into a smallest range necessary in order to maximize the probability that a priority assignment task may proceed without having to wait for the rebalancing operation.

Figure 20:
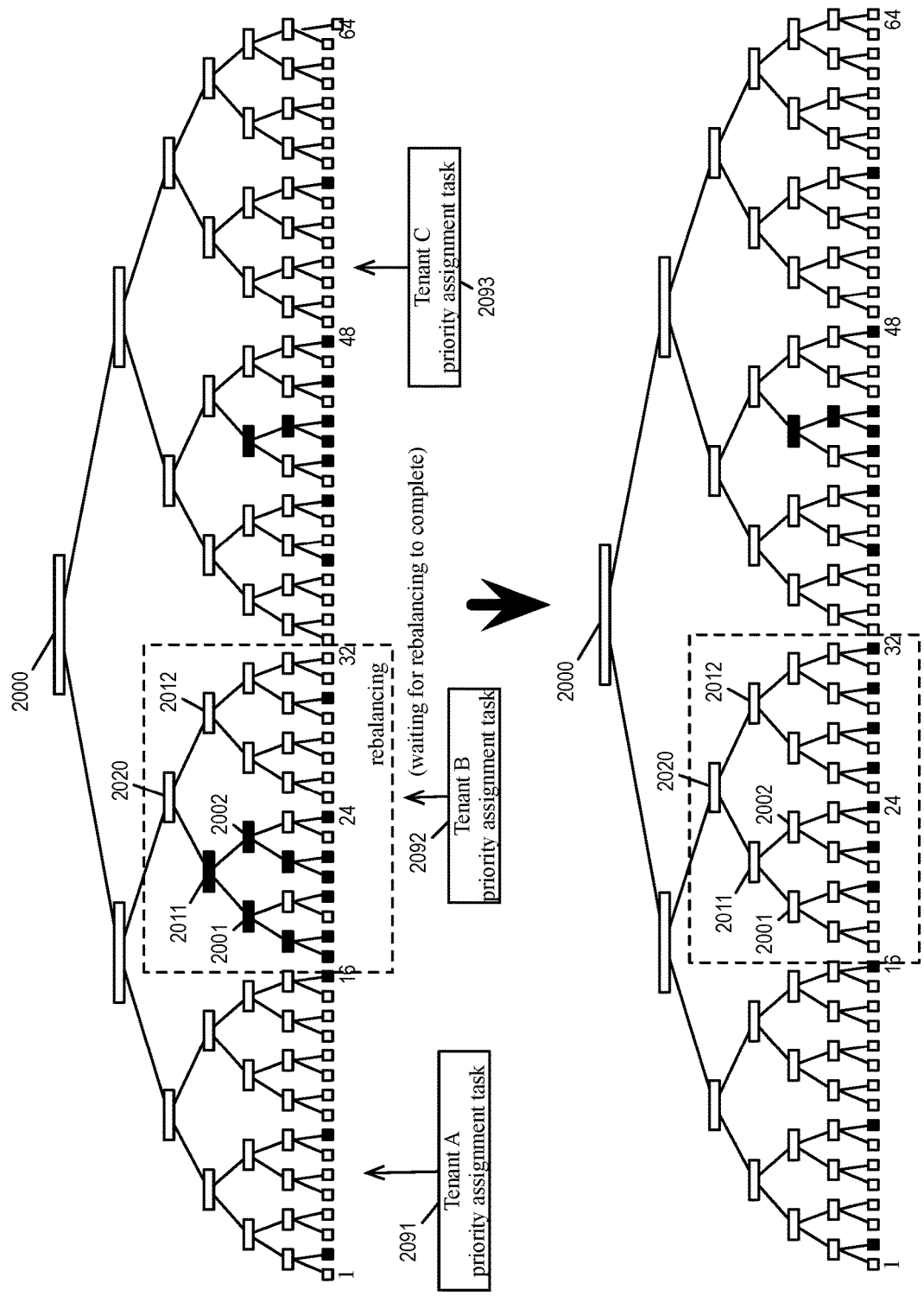
FIG. 20 illustrates using a binary search tree to confine rebalancing operations in order to maximize concurrency.

FIG. 20 illustrates using a binary search tree to confine rebalancing operations in order to maximize concurrency. The figure illustrates a binary search tree 2000 whose nodes correspond to possible values of priority numbers that can be assigned to sections (1 through 64 in this example). Leaf nodes illustrated as filled correspond to priority numbers that have been assigned, while leaf nodes that are empty correspond to priority numbers that have not been assigned. Each of the non-leaf nodes represents a range of priority numbers that are encompassed by its child nodes.

A non-leaf node can be an overflowing node that represents a range of priority numbers that is overflowing. For example, the non-leaf node 2011 is considered an overflowing node, because it encompasses priority numbers (17 through 24) that are mostly already assigned. Subsequent priority assignment into this range/segment is likely to collide with existing priority number assignment. Likewise, non-leaf nodes 2001 and 2002 are both considered overflowing nodes, because they each encompass a range of priority numbers (17 through 20 and 21 through 24, respectively) are overflowing.

A non-leaf node can be a sparse node that represents a range of priority numbers that is sparsely populated. For example, the non-leaf node 2012 is a sparse node, because it encompasses priority numbers (25 through 32) that are mostly unassigned. Subsequent priority assignment into this range/segment would not result in collision. The node 2020 is the parent node of both the overflowing node 2011 and the sparse node 2012. It is also considered a sparse node. Though the distribution of assigned priority numbers is highly unbalanced in this range (17 through 24 is overflowing and 25 through 32 is sparse), the node 2020 includes enough unassigned priority numbers to become entirely sparse if it were rebalanced.

When performing rebalancing, some embodiments start from an overflowing node in the binary search tree and traverse up toward the root node until encountering a sparse node. This lowest sparse ancestor node represents the smallest range by which the rebalancing operation can be confined to and the rebalanced range of priority assignment will be completely sparsely allocated. In the example of FIG. 20, the network manager would start from an overflow node (e.g., the node 2001) and go up the tree until it reaches a sparse node (the node 2020).

In addition to classifying a node as sparse or overflow, some embodiments also characterize each node according to its "degree of sparseness". For example, a node that corresponds to a range of possible priority numbers that is almost completely unassigned is considered "sparser" than a node that corresponds to a range with slightly more than half of the possible priority numbers unassigned. In order to minimize the number of future rebalancing operations, some embodiments when identifying a range of rebalancing operations would traverse up the tree until it reaches a node that is "sufficiently sparse" (e.g., having more than a certain threshold percentage of unassigned priority numbers).

In some embodiments, the range (17-32) identified by this lowest sparse ancestor node (2020) is used as the range of the rebalancing operation, i.e., only sections whose priority numbers fall within this range would have their priority numbers rebalanced/re-labeled, while the priority numbers of other sections would remain unaffected. This allows priority assignment for sections outside of the rebalanced range to proceed without waiting for rebalancing operation (e.g., tenant A task 2091 and tenant C task 2093), though priority assignment tasks for sections with priority numbers within the rebalanced range have to wait for rebalancing operation to complete (e.g., tenant B task 2092).

As mentioned, each section has a list of rules that is organized by using a binary search tree specific to the section. In some embodiments, the leaf nodes of the binary search tree of the section corresponds the space of possible priority numbers that can be assigned to the rules of the section. Like its counterpart in the list of sections, the binary search tree of the list of rules of a section is also used to identify the smallest possible range for rebalancing. This is for the purpose of maximizing the likelihood that a tenant operation to insert a rule in the section can proceed without waiting for the rebalancing operation to complete.

III. Publication of Firewall Configuration

Sections I and II above describe methods and systems that allow different tenants of the software defined data center to concurrently configure their own firewall settings in a centralized firewall configuration database or data store. Each tenant is free to access or update its own set of sections of the firewall configuration. The firewall configuration maintained centrally at the network manager reflects the desired state of the firewall protection as specified by the tenants. The actual state of the firewall on the other hand is reflected by the actual rules being enforced at the datapath elements of the various computing and network resources of the data center (e.g., host machines). In some embodiments, the network manager distributes or publishes firewall configuration data from the central firewall configuration to the various firewall rule enforcing datapath elements in order to synchronize the actual state with the desired state, i.e., to ensure that the actual state of the firewall is up to date with respect to the desired state of the firewall.

As mentioned, the real-time operations of the computing and the network resources of the software defined data center are controlled by a set of controllers (e.g., 107). In some embodiments, the controllers are divided into clusters. In some embodiments, such clusters of controllers operate a central control plane (CCP) and several local control planes (LCPs). In some embodiments, each local control plane (LCP) is controlling a subset of the computing and network resources in the software defined data center. In some embodiments, a LCP is a process running on a host machine and each host machine has its own LCP that communicates with the CCP.

Figure 21:
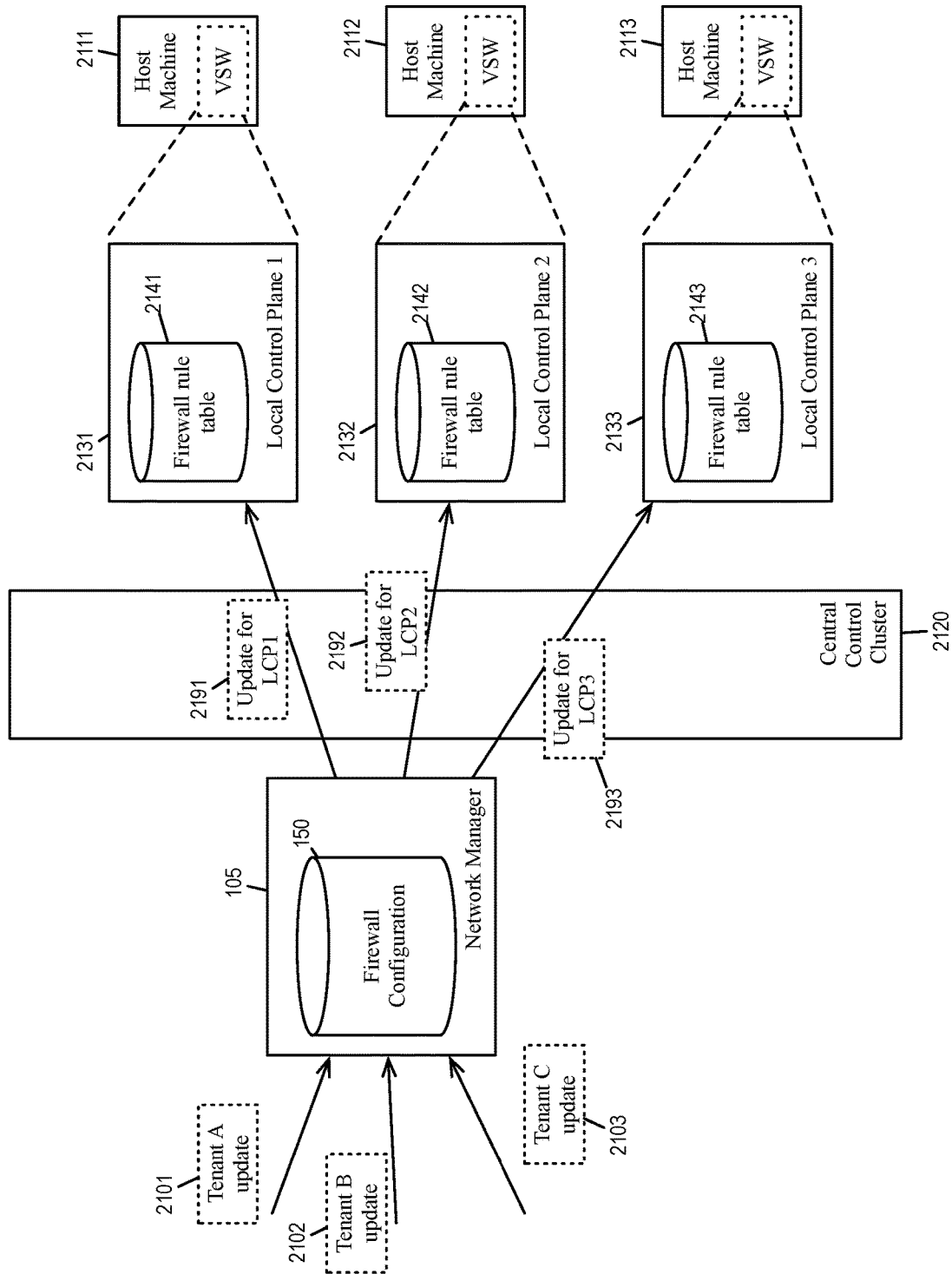
FIG. 21 conceptually illustrates the publication of firewall configuration to the enforcing devices.

For some embodiments, FIG. 21 conceptually illustrates the publication of firewall configuration to the enforcing devices. Specifically, the figure illustrates the publication of firewall configuration data 150 from the network manager 105 to the enforcing datapath elements in host machines 2111-2113, which provide some of the computing and networking resources of the data center. The firewall operations of the host machines 2111-2113 are controlled by the controllers of the data center, which are implemented as a central control plane (CCP) and as local control planes (LCPs). The CCP is implemented by a set of machines in a central control cluster 2120, while LCPs 2131-2133 are operating locally in the host machines 2111-2113. Specifically, the host machine 2111 operates the LCP 2131, the host machine 2112 operates the LCP 2132, and the host machine 2113 operates the LCP 2133.

Figure 27:
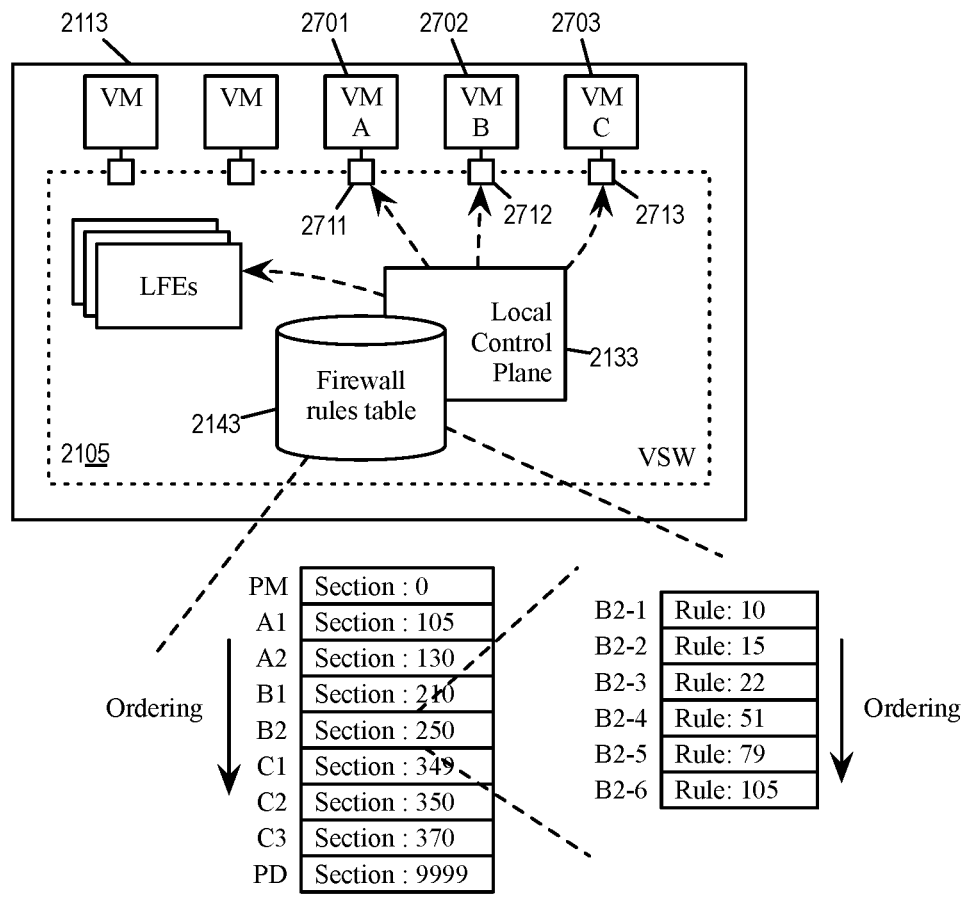
FIG. 27 conceptually illustrates the enforcement of firewall rules by a LCP at a host machine.

The LCPs 2131-2133 control the real-time operations of the host machines 2111-2113. The host machines 2111-2113 are running virtualization software (VSW) (also called hypervisors or managed forwarding elements, or MFEs). The VSW of a host machine implements the LCP of the host machine as well as at least some of the datapath elements (VNICs, LFEs, etc.) controlled by the LCP of the host machine. FIG. 27, described below, illustrates the operations of a LCP in a host machine in greater detail.

The firewall configuration 150 maintained at a data store of the network manager 105 represents/holds the entirety of the desired state of the firewall protection of the data center, while the actual state of firewall protection is implemented at the various enforcing datapaths of the data center. The enforcing datapaths in each host machine operate according to a local firewall rules table that is maintained by the LCP of the host machine. As illustrated, the LCP 2131 has a firewall rules table 2141 for controlling the enforcing datapaths of the host machine 2111, the LCP 2132 has a firewall rules table 2142 for controlling the enforcing datapaths of the host machine 2112, and the LCP 2133 has a firewall rules table 2143 for controlling the enforcing datapaths of the host machine 2113.

In some embodiments, each LCP receives and stores only a subset of the overall central firewall configuration. Specifically, each LCP receives only the portion of the firewall configuration that it needs to control its datapath elements (i.e., the datapath elements implemented by the host machine of the LCP) in order to enforce the specified firewall protection. For some embodiments in which the firewall configuration is divided into sections, each LCP receives only the sections of the firewall configuration that its datapath needs.

Figure 22:
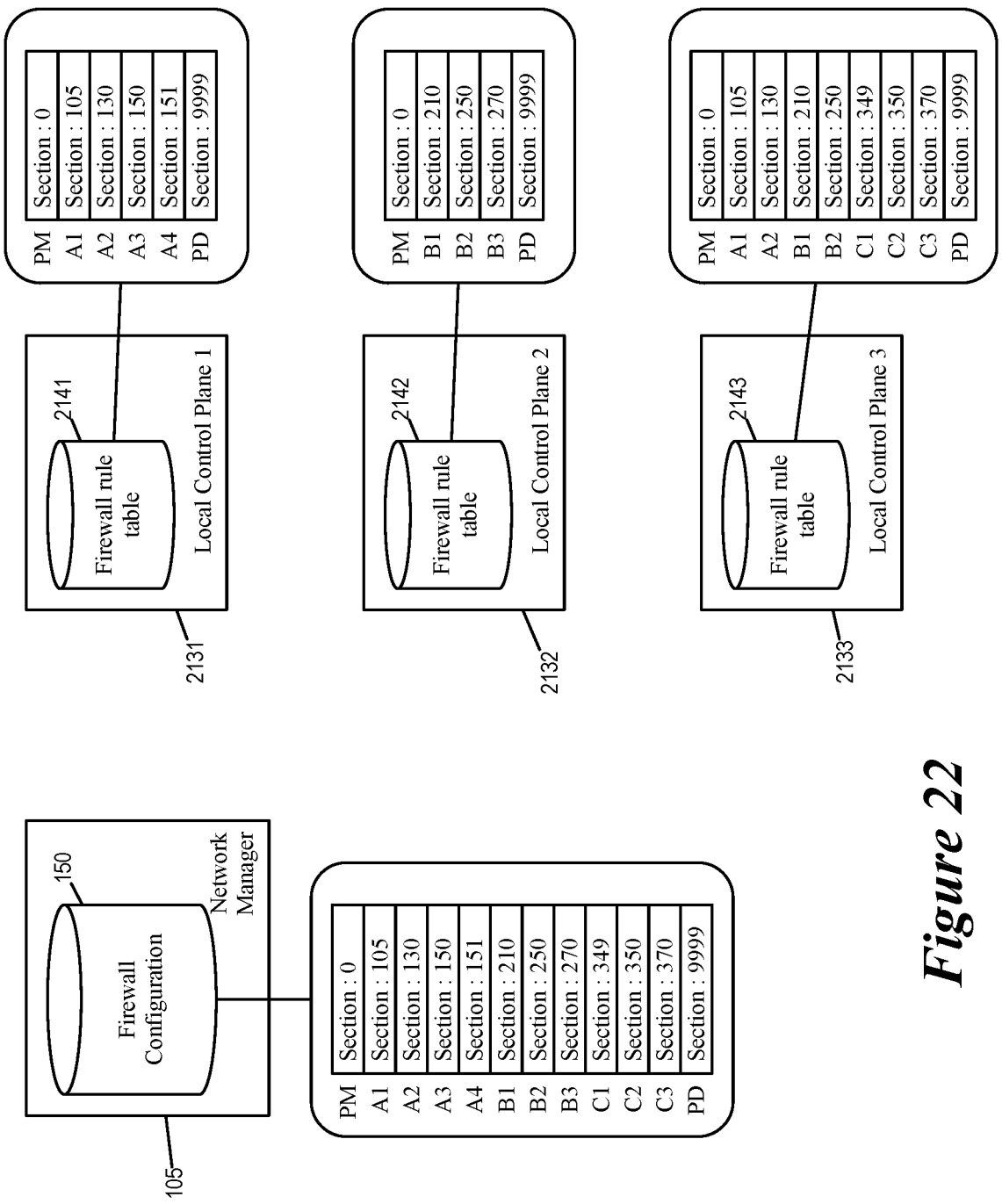
FIG. 22 illustrates the local control planes that each store a subset of the sections of the firewall configuration.

FIG. 22 illustrates the LCPs 2131-2133 that each stores a subset of the sections of the firewall configuration. Each of the LCPs uses its stored sections of the firewall configuration to enforce firewall protection at the datapath elements it controls. Each LCP has a firewall rule table for storing its corresponding sections of the firewall configuration.

As illustrated, the firewall configuration centrally maintained at the network manager 105 includes firewall configuration sections labeled "PM", "A1", "A2", "A3", "A4", "B1", "B2", "B3", "C1", "C2", "C3", and "PD". This is a complete set of sections of the firewall configuration of the data center. Sections "PM" and "PD" are provider sections that are applicable to all tenants (provider mandatory and provider default). Sections "A1" through "A4" store rules specified by the tenant "A". Sections "B1" through "B3" store rules specified by the tenant "B". Sections "C1" through "C3" store rules specified by the tenant "C".

The LCPs 2131, 2132, and 2133 each has a firewall rules table that stores and uses a subset of the sections. Specifically, the LCP 2131 has a firewall rules table 2141 that stores and uses sections "PM", "A1", "A2", "A3", "A4", and "PD"; the LCP 2132 has a firewall rules table 2142 that stores and uses sections "PM", "B1", "B2", "B3", and "PD"; the LCP 2133 has a firewall rules table 2143 that stores and uses sections "PM", "A1", "A2", "B1", "B2", "C1", "C2", "C3", and "PD". In other words, each LCP stores and controls only the sections that it needs, which can be for implementing firewall protection for a particular tenant (such as 2131 or 2132), or for implementing a particular subset of the sections for one or more tenants (such as 2133).

Returning to FIG. 21, as mentioned, the rules being stored centrally at the firewall configuration of the network manager is the desired state of the firewall being directly updated by tenants, while the rules being stored locally at the firewall rules tables of the LCPs reflect the actual state of the firewall configuration currently being used to enforce firewall protection. As the tenants update the desired state of the firewall configuration, the network manager in some embodiments generates and transmits update data to the LCPs in order to update the actual state of the firewall configuration. In some embodiments, for each update to the firewall configuration made by a tenant or user through an API/UI of the network manager, the network manager generates a set of update fragments for one or more LCPs and sends the update fragments to the LCPs, where each LCP integrates the update fragment it receives to its firewall rules table.

As illustrated in the figure, the network manager 105 receives inputs 2101-2103 from tenants A, B, and C through the APFUI provided to the tenants. At least some of these tenant input includes data for updating the firewall configuration 150. The network manager, in turn, generates update fragments 2191-2193 based on these updates to the firewall configuration and transmits them to LCPs 2131-2133.

In some embodiments, for each update to the firewall configuration, the network manager identifies what is relevant to each LCP and generates the corresponding update fragment for it. Each of the generated relevant update fragments is then transmitted to its corresponding LCP to be integrated. According to the example illustrated in FIG. 22, if the tenant A were to update a rule in the section "A2", the network manager would create one update fragment for the LCP 2131 and another update fragment for the LCP 2133 as both LCPs 2131 and 2133 use the section "A2" to perform firewall filtering. On the other hand, if tenant A were to update a rule in the section "A3", the network manager would only create an update fragment for the LCP 2131, since only the local controller plane 2131 uses the section "A3" to perform firewall filtering.

In some embodiments, the generation of an update fragment is triggered when a tenant makes changes to the firewall configuration, and the update fragment thus triggered conveys the changes that were made to the targeted LCP. In some embodiments, an update fragment includes one or more rules that have been modified due to the tenant's update. In some embodiments, each update fragment consists of one or more sections that have been modified due to the tenant's update. The LCP receiving the update fragment in turn assembles its firewall rules table by integrating the sections or the rules included in the update fragment.

In order to facilitate the assembly of the firewall rules table at a LCP, some embodiments includes priority numbers (i.e., also referred to as priority keys) assigned to the rules or sections in the update fragment. As described above in Section II, the network manager assigns (and re-assigns if necessary) each section of the firewall configuration with a priority number in order to maintain ordering between the different sections, and some embodiments also assign each rule of a section with a priority number in order to maintain ordering between different rules of the section. For each rule and/or section included in the update fragment, the network manager attaches its assigned priority number. The LCP in turn uses the attached priority numbers to reassemble the rules and sections according to their relative ordering at the central firewall configuration.

Figure 23:
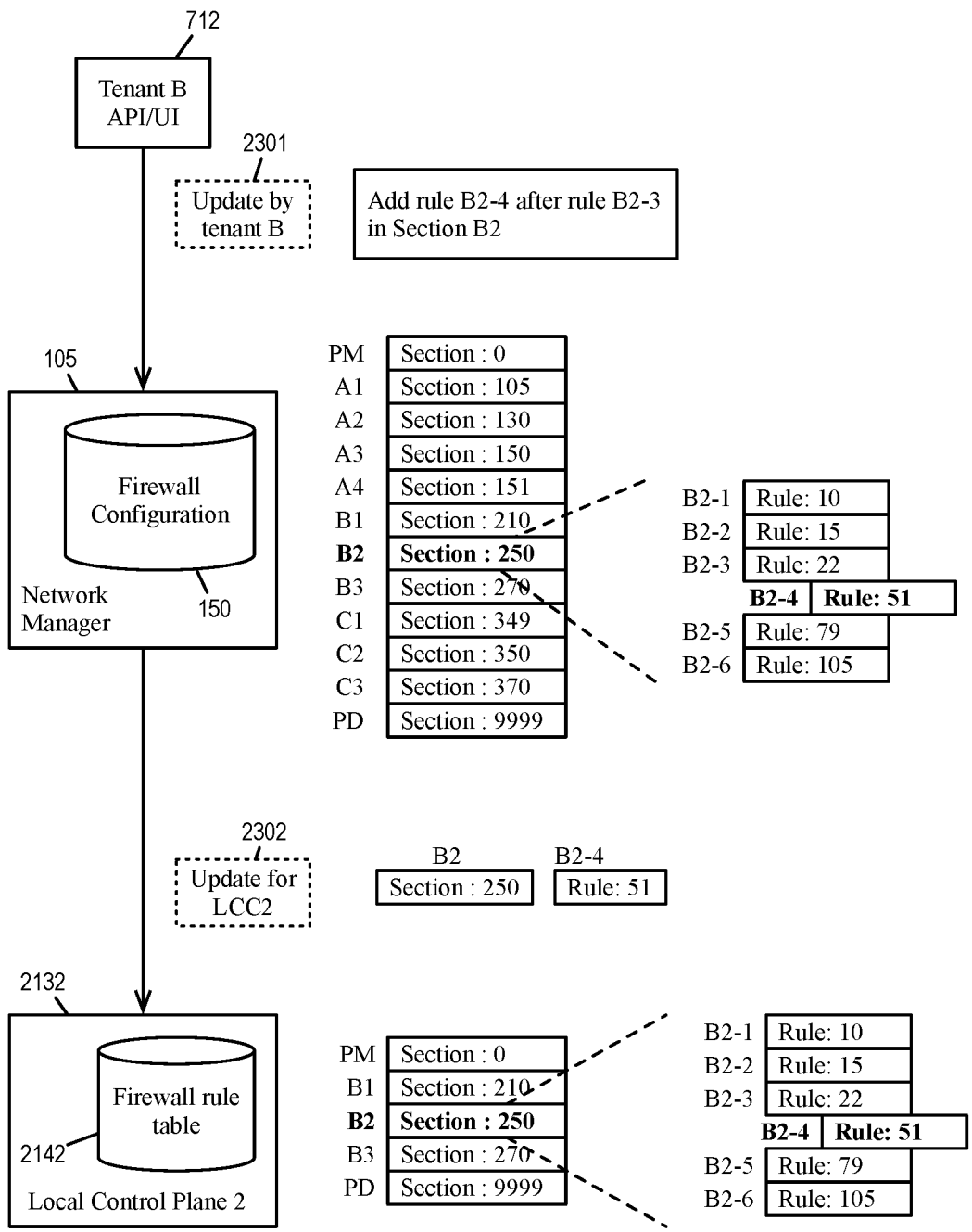
FIG. 23 illustrates the generation of an update fragment and the reassembling of a firewall rules table based on the generated update fragment.

FIG. 23 illustrates the generation of an update fragment and the reassembling of a firewall rules table based on the generated update fragment. The network manager incorporates the priority numbers of the rules or sections being updated in the generated update fragment, and the LCP receiving the update fragment uses the included priority number to integrate the sections or rules in the update segment and to reassemble the firewall rules table according to the priority numbers.

As illustrated, tenant B through its corresponding API/UI 712 inputs a firewall configuration management operation 2301 for adding a rule with UUID "B2-4" after the rule with UUID "B2-3" into the section with identifier "B2". The network manager in turn uses the identifiers to insert the rule into the firewall configuration 150. The network manager assigns a priority number "51" to the newly added rule "B2-4" in order to insert it after the rule "B2-3". This operation for assigning a priority number to a newly added rule is described in Section II above, which in some embodiments includes rebalancing priority numbers, observing input patterns, etc.

The network manager determines that the update is relevant to the LCP 2132, which uses section B2 for implementing firewall protection. The network manager 105 thus generates an update fragment 2302 for the LCP 2132. This update fragment includes the newly added rule "B2-4" and its priority number (51). In some embodiments, the update fragment also includes the identifier of the section ("B2") that the new rule belongs to and the priority number of the section (250). The network manager then passes the update fragment 2302 to the LCP 2132 (e.g., through the management plane messages).

Once the LCP 2132 receives the update fragment 2302, it assembles its firewall rules table 2142 based on the information in the update fragment 2302. Specifically, the newly added rule will be placed in the correct ordering position for firewall rule matching. This matching is according to the ordering established by the priority number of the newly added rule and the priority numbers of the pre-existing rules. In this example, the priority number of the newly added rule "B2-4" (51) places the rule between the rule "B2-3" (22) and the rule "B2-5" (79). It is worth noting that the network manager has already assigned the priority numbers, and the LCP 2132 only needs to use the received priority numbers to determine the ordering when searching for matching firewall rules.

As mentioned above in Section II, in order to keep the allocation of priority numbers sparse and to minimize the latency required for inserting each new rule or section, a network manager in some embodiments performs priority number rebalancing operations periodically, such as when a tenant specifies to add a section between two existing sections with consecutive priority numbers. In some embodiments, the network manager determines the update fragment based on the rebalancing operation and sends updated priority numbers in update fragments to the LCPs.

Figure 24:
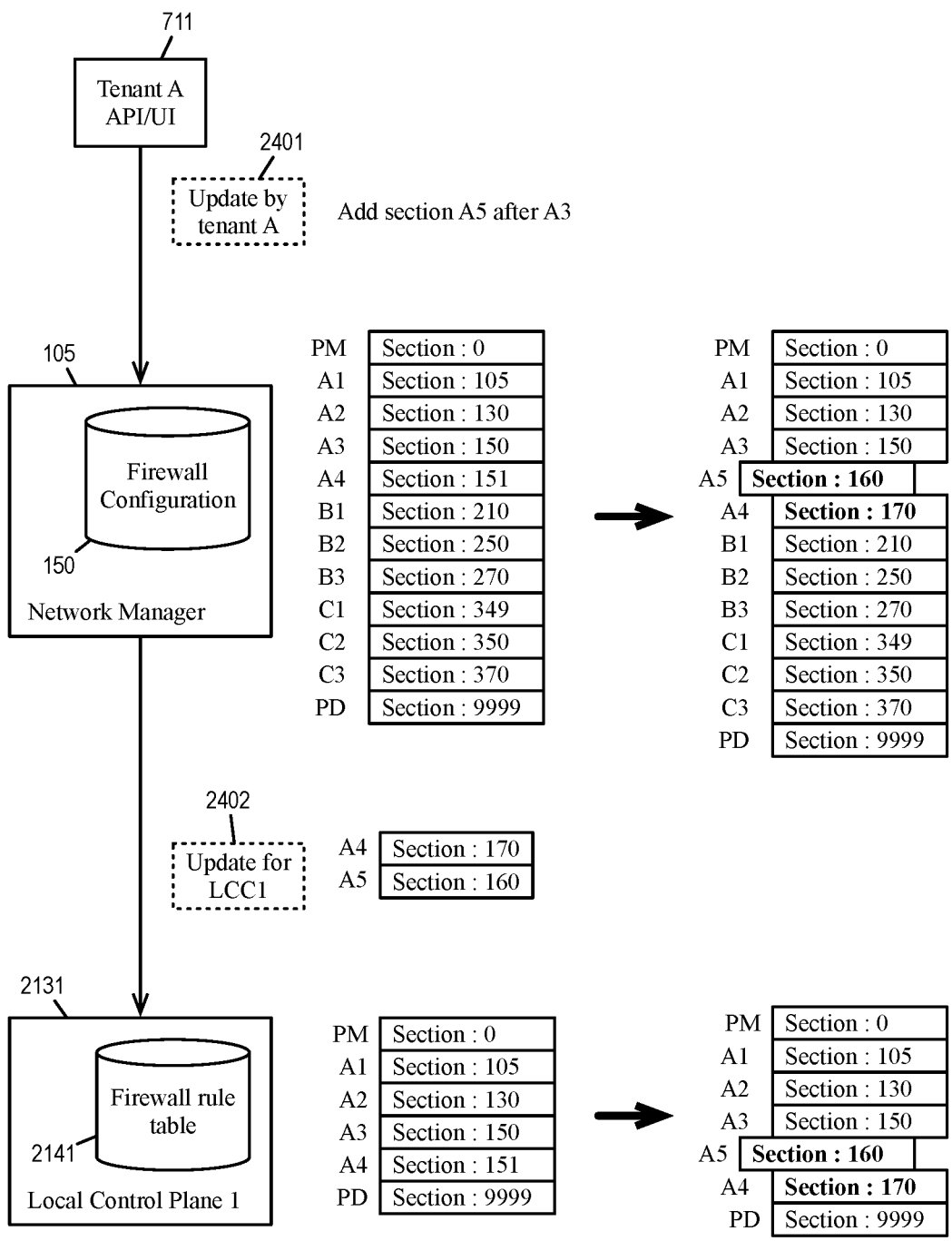
FIG. 24 illustrates update fragments that are for updating priority numbers due to rebalancing.

FIG. 24 illustrates update fragments that are for updating priority numbers due to rebalancing. As illustrated, tenant A through its corresponding API/UI 711 inputs a firewall configuration management operation 2401 for adding a section with identifier "A5" after the section with identifier "A3". However, the section A3 and the section A4 are sections that were assigned consecutive priority numbers (150 and 151). The network manager 105 therefore cannot allocate a priority number to A5 without changing some of the priority numbers already assigned to other sections of the firewall configuration. Consequently, the network manager 105 therefore upon reception of the firewall configuration management operation 2401 performs a priority number rebalancing operation, which changes the priority number of the section "A4" to 170, thus creating room for inserting the section "A5" after the section "A3". The network manager 105 is then able to assign a priority number 160 to the newly added section A5. The rebalancing of priority numbers is described above in Section II.

The network manager then identifies this tenant A triggered update as being relevant to the LCP 2131 and accordingly generates an update fragment 2402 for the LCP 2131. This update fragment 2402 indicates that the section with the identifier "A4" is to have priority number "170" while a new section "A5" is to have a priority number "160".

As illustrated, the firewall rules table 2141 of the LCP 2141 already has sections PM, A1, A2, A3, A4, PD, which are ordered according to their corresponding priority numbers 0, 105, 130, 150, 151, and 9999. Upon receiving the update fragment 2402, the LCP 2131 updates the firewall rules table 2141 to incorporate a new section A5 with priority number 160 and change the priority number of the existing section A4 to from 151 to 170. After incorporating the update fragment, the reassembled firewall rules table has sections PM, A1, A2, A3, A5, A4, and PD, which are ordered according to their corresponding priority numbers 0, 105, 130, 150, 160, 170, and 9999. Again, the LCP does not have to assign priority numbers, and the allocation of priority numbers is kept sparse by the network manager 105 performing rebalancing operations.

Figure 25:
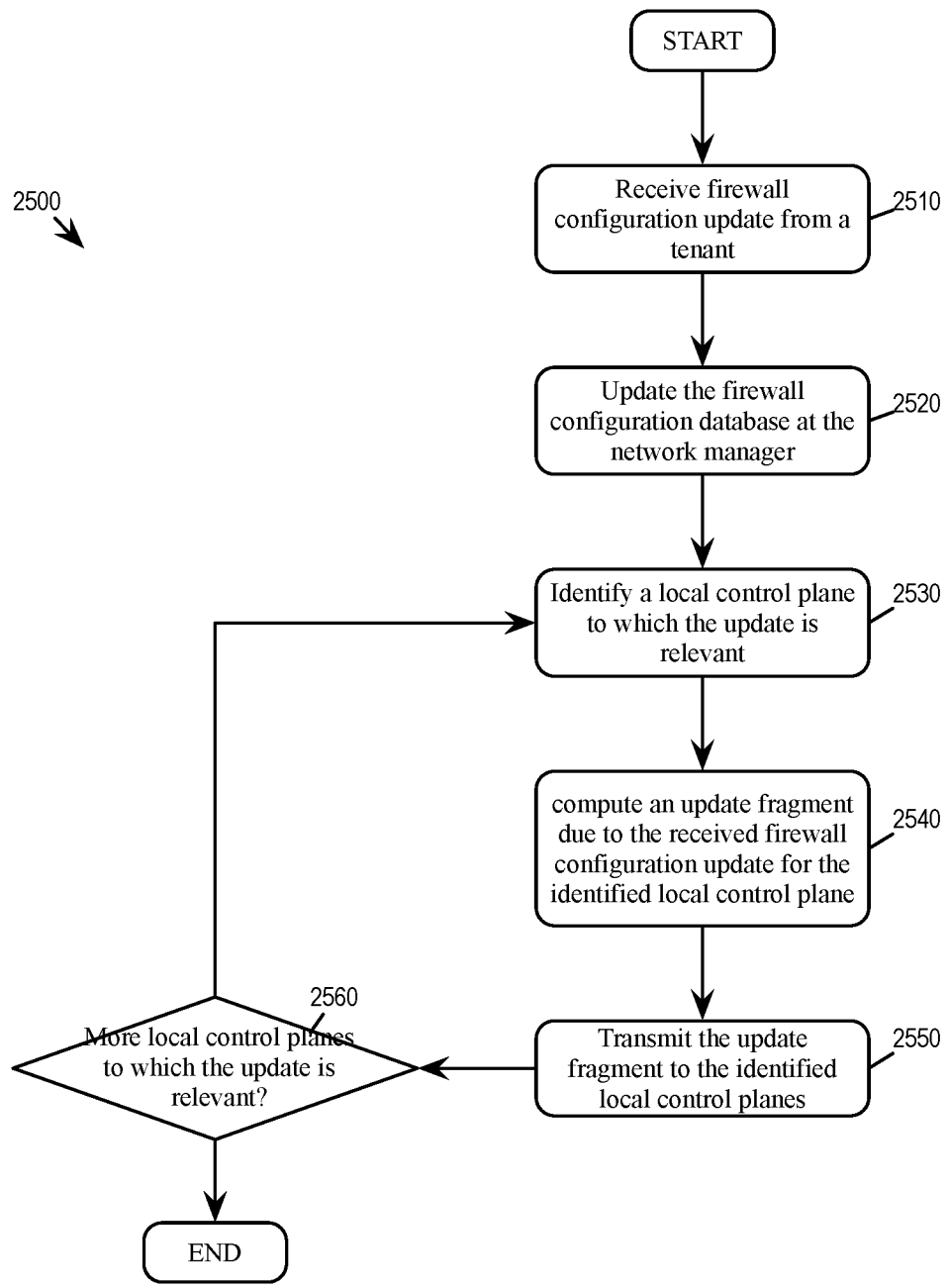
FIG. 25 conceptually illustrates a process for receiving firewall configuration updates from tenants and for generating update fragments to be assembled into local firewall rules tables.

FIG. 25 conceptually illustrates a process 2500 for receiving firewall configuration updates from tenants and for generating update fragments to be assembled into local firewall rules tables. A network manager such as 105 that maintains a centralized desired state of the firewall configuration performs the process 2500 in some embodiments.

The process starts when the network manager receives (at 2510) firewall configuration update from a tenant. Such an update can be for adding, deleting, or modifying a rule in a section of the firewall configuration. Such an update can also be for adding or deleting a section in the firewall configuration. The process then updates (at 2520) the firewall configuration data store at the network manager according to the tenant's specification. In some embodiments, this operation includes assignment of priority numbers to rules or sections.

Next, the process identifies (at 2530) a LCP to which the update is relevant. In some embodiments, as the network manager is responsible for generating configuration data for configuring the computing and network resources of the data center, it knows which LCP is responsible for controlling which datapath element, and which LCP requires which sections of the firewall configuration. The process then computes (at 2540) an update fragment for the identified LCP based on the received firewall configuration update. Generating update fragments for a LCP is described by reference to FIGS. 23 and 24 above. The process then transmits the computed update fragment to the identified LCP.

Next, the process determines (at 2560) whether there is another LCP to which the tenant's update to the firewall configuration is relevant. If so, the process returns to 2530. Otherwise, the process 2500 ends.

Figure 26:
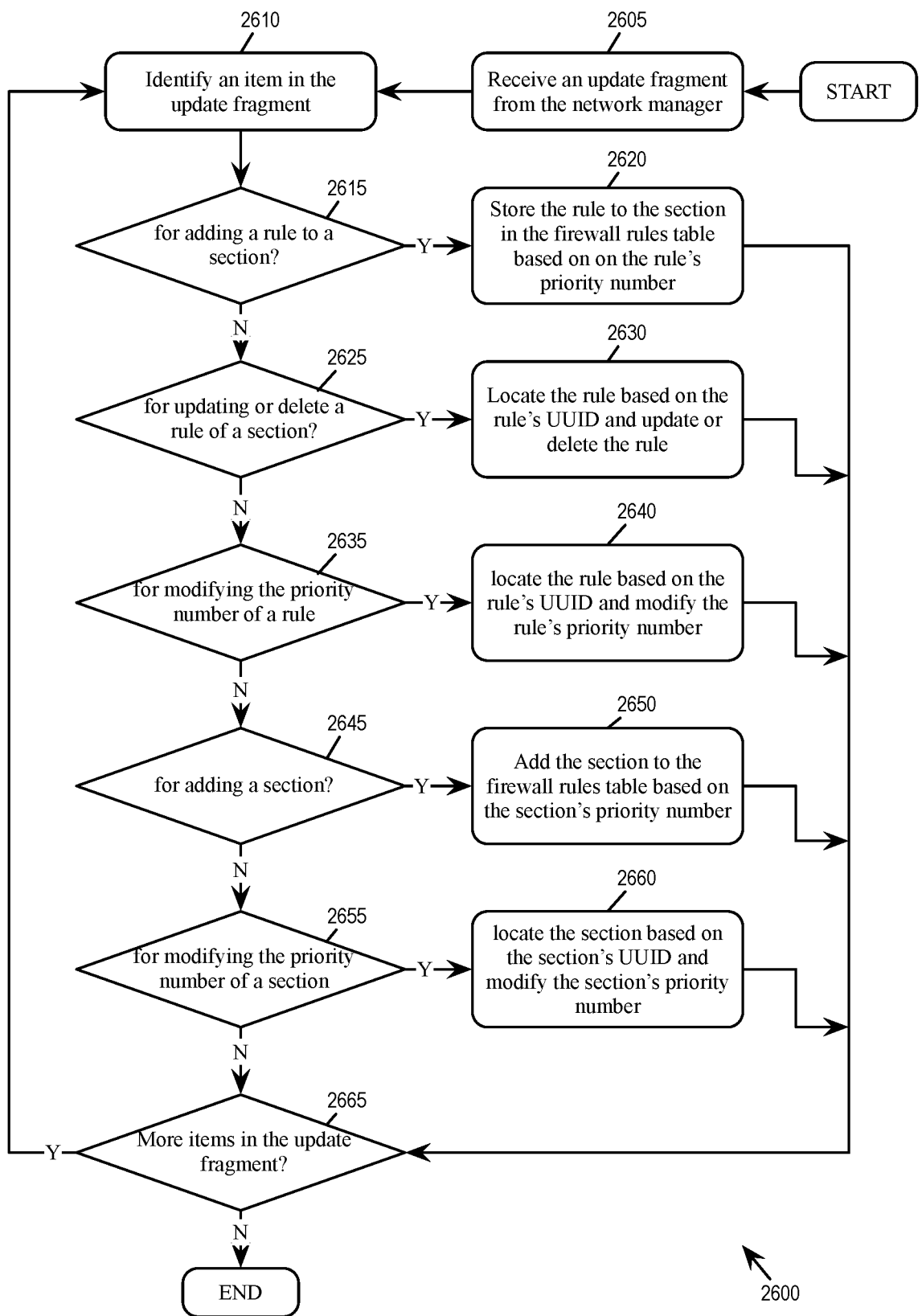
FIG. 26 conceptually illustrates a process for assembling a firewall rules table at a local control plane based on update fragments received from the network controller.

FIG. 26 conceptually illustrates a process 2600 for assembling a firewall rules table at a LCP of a host machine based on update fragments received from the network controller. The host machine operating an LCP performs the process 2600 for some embodiments of the invention.

The process starts when it receives (at 2605) an update fragment from the network manager. The process then identifies (at 2610) an action item for a firewall configuration entity in the update fragment. Such a firewall configuration entity can be a rule or a section in the firewall configuration, and such an action item can be for (i) modifying a rule in a section of the firewall configuration, (ii) adding or deleting a section of the firewall configuration, and/or (iii) for modifying the priority numbers of an existing rule or an existing section.

Next the process determines (at 2615) whether the identified action item in the update fragment is for adding a rule to a section. If not, the process proceeds to 2625. If so, the process stores (at 2620) the rule to the section in the firewall rules table along with the rule's priority number before proceeding to 2665. It is worth noting that the network manager has chosen the priority number to ensure that the rule will be inserted at the right position within the ordering of the rules based on its priority assignment operations.

At 2625, the process determines whether the identified action item is for updating or deleting a rule of a section. If not, the process proceeds to 2635. If so, the process locates (at 2630) the rule in the local firewall rules table based on the rule's unique identifier (e.g. UUID). The process then updates or deletes the rule before proceeding to 2665.

At 2635, the process determines whether the identified action item is for modifying the priority number of a rule. If not, the process proceeds to 2645. If so, the process locates (at 2640) the rule in the local firewall rules table based on the rule's unique identifier. The process then modifies the rules priority number before proceeding to 2665.

At 2645, the process determines whether the identified action item is for adding a section to the firewall rules table of the LCP. If not, the process proceeds to 2655. If so, the process adds the section to the firewall rules table along with the section's priority number before proceeding to 2665. It is worth noting that the network manager has chosen the priority number to ensure that the section will be inserted at the right position within the ordering of the sections in the firewall rules table based on its priority assignment operations.

At 2655, the process determines whether the identified action item is for modifying the priority number of a section. If not, the process proceeds to 2665. If so, the process locates (at 2660) the section based on the section's identifier and modifies the section's priority number. The process then proceeds to 2665.

At 2665, the process determines whether there is another action item in the update fragment. If so, the process returns to 2610. Otherwise, the process 2600 ends.

The LCP is on one hand responsible for assembling the local firewall rules table based on received update fragments, and on the other hand responsible for controlling datapath elements in its host machine in order to enforce the firewall protection as specified by the firewall rules table. FIG. 27 conceptually illustrates the enforcement of firewall rules by a LCP at a host machine.

As illustrated, the LCP 2133 is implemented by a VSW 2105 (virtualization software/hypervisor) of the host machine 2113. The VSW 2105 of the host machine is also hosting several VMs, such as the VM 2701, 2702 and 2703. The VM 2701 belongs to the tenant A, the VM 2702 belongs to the tenant B, and the VM 2703 belongs to the tenant C. The VSW is also implementing several logical forwarding elements, such as logical routers and logical switches. Each VM interfaces the VSW through a VNIC (virtual network interface controller), specifically, the VM 2701 interfaces the VSW through the VNIC 2711, the VM 2702 interfaces the VSW through the VNIC 2712, and the VM 2703 interfaces the VSW through the VNIC 2713.

The LCP 2133 has assembled a firewall rules table 2143 based on update fragments from the network manager 105. As illustrated, the firewall rules table of the LCP 2143 includes firewall configuration sections for three different tenants (sections A1-A2 for tenant A, sections B1-B2 for tenant B, and section C1-C3 for tenant C). Consequently, the LCP 2133 is able to control the datapath elements of host machines 2113 and enforces firewall filtering for tenants A, B, and C. Some of the rules are for performing filtering at the VNIC. Some of the rules are for performing filtering at logical forwarding elements. For example, rules in sections A1-A2 are specified by the tenant A and enforced at the VNIC 2711 in order to protect the VM 2701, while rules in sections B1-B2 are specified by the tenant B and enforced at the VNIC 2712 in order to protect the VM 2702.

In some embodiments, firewall rules and sections are examined according to an ordering that is based on the priority number assigned to the rules and the sections of the firewall rules table. In some embodiments, each point of firewall protection enforcement (e.g., a VNIC) upon encountering a packet examines the local firewall rules table (i.e., the firewall rules table of its local control cluster) for a matching rule for classifying the packet. Such matching is in some embodiments based on the parameters of the packet (e.g., source and destination MAC addresses, source and destination IP addresses, source and destination port identifiers, transport protocols, etc.).

U.S. Pat. No. 9,276,904 further describes how firewall rules stored at local controller is applied to host machines as firewall enforcing devices, and how some of these rules are enforced at host machine level and some of these rules are enforced at VNIC level. U.S. Pat. No. 9,276,904 is hereby incorporated by reference.

IV. Computing Device & Virtualization Software

Figure 28:
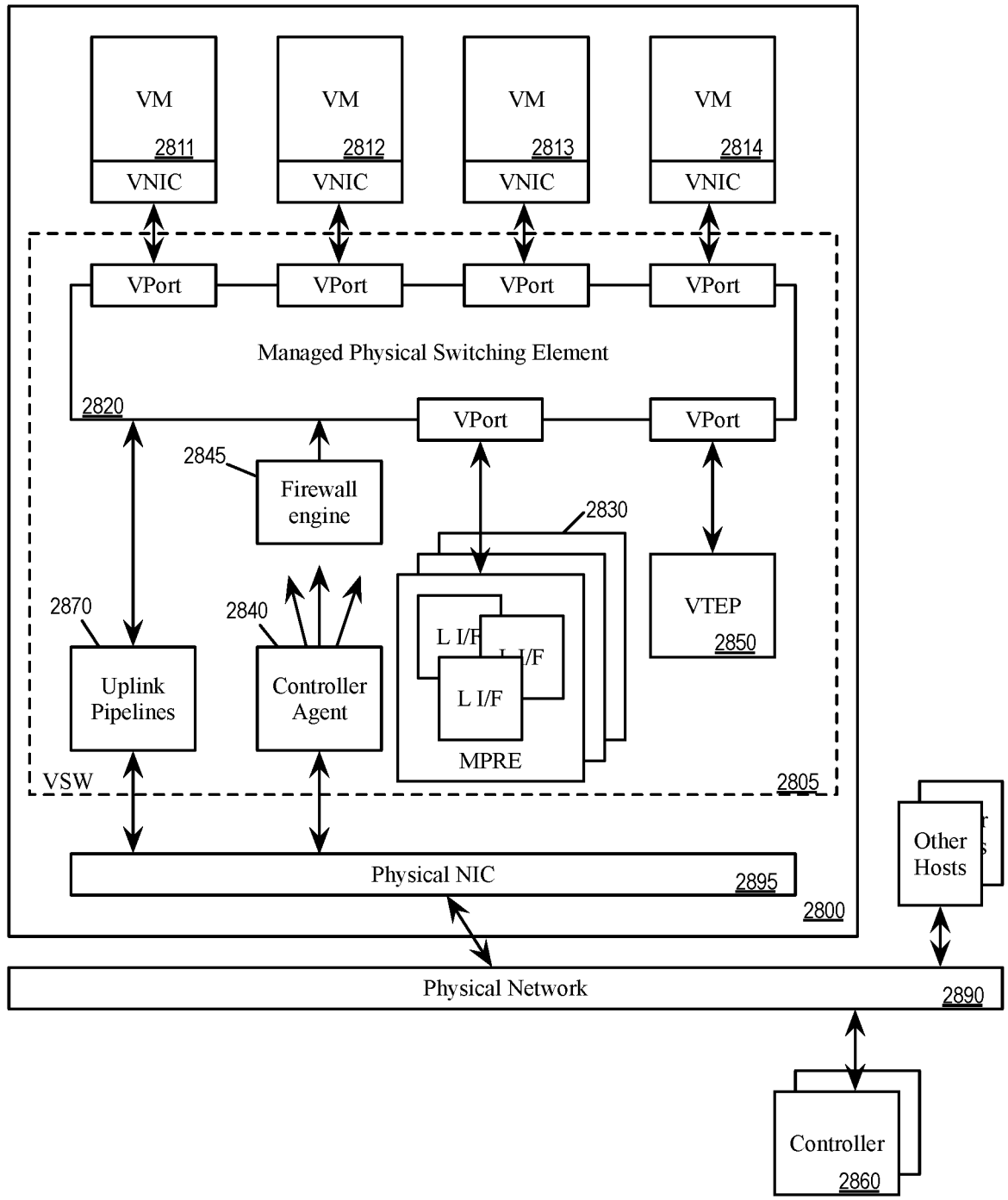
FIG. 28 illustrates a computing device that serves as a host machine that runs virtualization software for some embodiments of the invention.

Virtualization software allows a computing device to host a set of virtual machines (VMs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE performs its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). FIG. 28 illustrates a computing device 2800 that serves as a host machine that runs virtualization software for some embodiments of the invention.

As illustrated, the computing device 2800 has access to a physical network 2890 through a physical NIC (PNIC) 2895. The host machine 2800 also runs the virtualization software 2805 and hosts VMs 2811-2814. The virtualization software 2805 serves as the interface between the hosted VMs and the physical NIC 2895 (as well as other physical resources, such as processors and memory). Each of the VMs includes a virtual NIC (VNIC) for accessing the network through the virtualization software 2805. Each VNIC in a VM is responsible for exchanging packets between the VM and the virtualization software 2805. In some embodiments, the VNICs are software abstractions of physical NICs implemented by virtual NIC emulators.

The virtualization software 2805 manages the operations of the VMs 2811-2814, and includes several components for managing the access of the VMs to the physical network (by implementing the logical networks to which the VMs connect, in some embodiments). As illustrated, the virtualization software includes several components, including a MPSE 2820, a set of MPREs 2830, a controller agent 2840, a firewall engine 2845, a VTEP 2850, and a set of uplink pipelines 2870.

The VTEP (VXLAN tunnel endpoint) 2850 allows the host machine 2800 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 2800 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 2870.

The controller agent 2840 receives control plane messages from a controller or a cluster of controllers (e.g., CCP). In some embodiments, these control plane message includes configuration data for configuring the various components of the virtualization software (such as the MPSE 2820 and the MPREs 2830). In some embodiments, the control agent is implementing a local control plane (LCP), and the control plane messages include update fragments for a firewall rules table that is maintained at the firewall engine 2845. In the example illustrated in FIG. 28, the controller agent 2840 receives control plane messages from the controller cluster 2860 from the physical network 2890 and in turn provides the received configuration data to the MPREs 2830 through a control channel without going through the MPSE 2820. However, in some embodiments, the controller agent 2840 receives control plane messages from a direct data conduit (not illustrated) independent of the physical network 2890. In some other embodiments, the controller agent receives control plane messages from the MPSE 2820 and forwards configuration data to the router 2830 through the MPSE 2820.

The firewall engine 2845 in some embodiments stores firewall configuration data that are specified by tenants and administrators and published by the network manager to the host machine. In some embodiments, this firewall configuration data arrives as update fragments and are assembled into a firewall rules table. The firewall engine 2845 uses the received firewall configuration data stored to perform packet-filtering operations. In some embodiments, the received firewall configuration data includes priorities of the firewall rules as well as the firewall configuration sections so the firewall engine 2845 knows the order by which the rules are to be examined for matching rules.

The MPSE 2820 delivers network data to and from the physical NIC 2895, which interfaces the physical network 2890. The MPSE also includes a number of virtual ports (vPorts) that communicatively interconnects the physical NIC with the VMs 2811-2814, the MPREs 2830 and the controller agent 2840. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 2890 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 2830 perform L3 routing on data packets received from a virtual port on the MPSE 2820. In some embodiments, this routing operation entails resolving a L3 IP address to a next-hop L2 MAC address and a next-hop VNI (i.e., the VNI of the next-hop's L2 segment). Each routed data packet is then sent back to the MPSE 2820 to be forwarded to its destination according to the resolved L2 MAC address. This destination can be another VM connected to a virtual port on the MPSE 2820, or a reachable L2 network element on the physical network 2890 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching elements in order to distinguish from "logical" routing/switching elements, even though MPREs and MPSEs are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or local MPSE running in each host machine.

In some embodiments, the MPRE 2830 includes one or more logical interfaces (LIFs) that each serves as an interface to a particular segment (L2 segment or VXLAN) of the network. In some embodiments, each LIF is addressable by its own IP address and serves as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 2870 relays data between the MPSE 2820 and the physical NIC 2895. The uplink module 2870 includes an egress chain and an ingress chain that each performs a number of operations. Some of these operations are pre-processing and/or post-processing operations for the MPRE 2830. The operations of LIFs, uplink module, MPSE, and MPRE are described in U.S. patent application Ser. No. 14/137,862 filed on Dec. 20, 2013, titled "Logical Router", published as U.S. Patent Application Publication 2015/0106804.

As illustrated by FIG. 28, the virtualization software 2805 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 2820, and hence a same L2 MAC address (vMAC or pMAC). In some other embodiments, each different MPRE belonging to a different tenant has its own port to the MPSE.

The MPSE 2820 and the MPRE 2830 make it possible for data packets to be forwarded amongst VMs 2811-2814 without being sent through the external physical network 2890 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 2800 (and its virtualization software 2805) is able to direct packets of different logical networks to their correct destinations and effectively segregates traffic of different logical networks from each other.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 29:
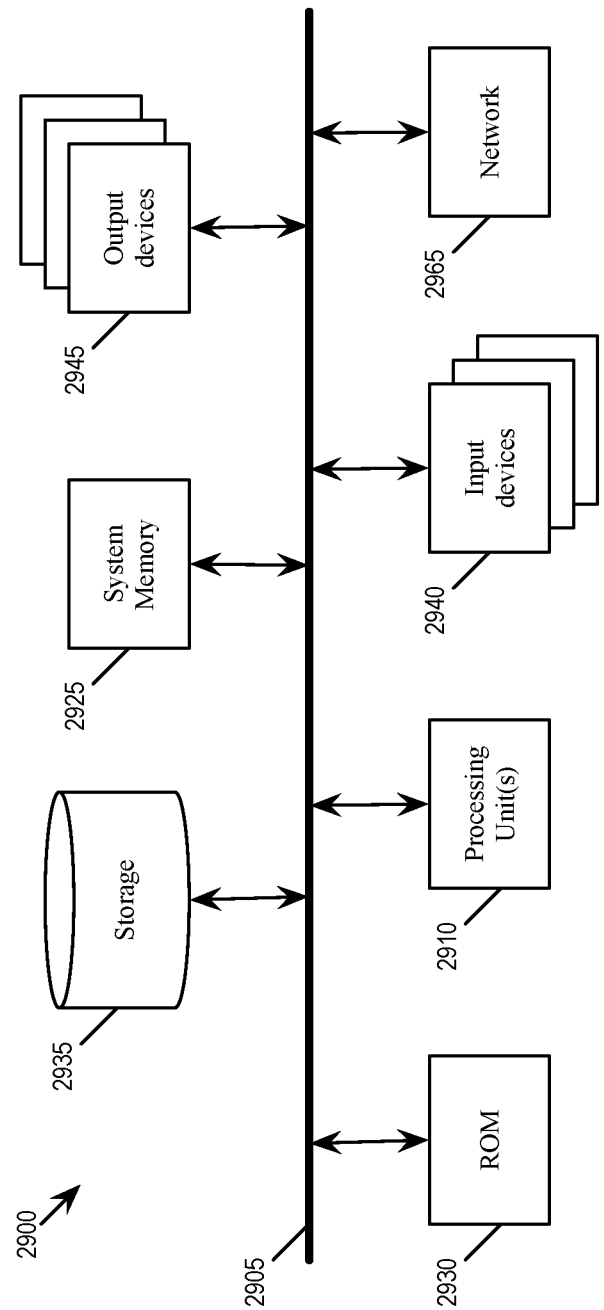
FIG. 29 conceptually illustrates an electronic system with which some embodiments of the invention are implemented.

FIG. 29 conceptually illustrates an electronic system 2900 with which some embodiments of the invention are implemented. The electronic system 2900 can be used to execute any of the control, virtualization, or operating system applications described above. The electronic system 2900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2900 includes a bus 2905, processing unit(s) 2910, a system memory 2925, a read-only memory 2930, a permanent storage device 2935, input devices 2940, and output devices 2945.

The bus 2905 collectively represents all system, peripheral, and chipset buses that communicatively connect the numerous internal devices of the electronic system 2900. For instance, the bus 2905 communicatively connects the processing unit(s) 2910 with the read-only memory 2930, the system memory 2925, and the permanent storage device 2935.

From these various memory units, the processing unit(s) 2910 retrieves instructions to execute and data to process in order to execute the processes of the invention. The processing unit(s) may be a single processor or a multi-core processor in different embodiments.

The read-only-memory (ROM) 2930 stores static data and instructions that are needed by the processing unit(s) 2910 and other modules of the electronic system. The permanent storage device 2935, on the other hand, is a read-and-write memory device. This device is a non-volatile memory unit that stores instructions and data even when the electronic system 2900 is off. Some embodiments of the invention use a mass-storage device (such as a magnetic or optical disk and its corresponding disk drive) as the permanent storage device 2935.

Other embodiments use a removable storage device (such as a floppy disk, flash drive, etc.) as the permanent storage device. Like the permanent storage device 2935, the system memory 2925 is a read-and-write memory device. However, unlike storage device 2935, the system memory is a volatile read-and-write memory, such a random access memory. The system memory stores some of the instructions and data that the processor needs at runtime. In some embodiments, the invention's processes are stored in the system memory 2925, the permanent storage device 2935, and/or the read-only memory 2930. From these various memory units, the processing unit(s) 2910 retrieves instructions to execute and data to process in order to execute the processes of some embodiments.

The bus 2905 also connects to the input and output devices 2940 and 2945. The input devices enable the user to communicate information and select commands to the electronic system. The input devices 2940 include alphanumeric keyboards and pointing devices (also called "cursor control devices"). The output devices 2945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 29, bus 2905 also couples electronic system 2900 to a network 2965 through a network adapter (not shown). In this manner, the computer can be a part of a network of computers (such as a local area network ("LAN"), a wide area network ("WAN"), or an Intranet, or a network of networks, such as the Internet. Any or all components of electronic system 2900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXiTM hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 11, 18, 19, 25, and 26) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a network manager that when executed by a host computer provides firewall services at a data center, the network manager comprising sets of instructions for:
   receiving an update to a firewall configuration database from one of a plurality of tenants, wherein the firewall configuration database is for implementing firewall protection for the plurality of tenants at a set of firewall enforcing devices and comprises a plurality of sections, each of a set of sections comprising a plurality of firewall rules, wherein the firewall rules are defined by the plurality of tenants; and
   based on the received update to the firewall configuration database, (i) identifying a particular firewall enforcing device to which the update is relevant, (ii) for the identified particular firewall enforcing device, generating an update fragment comprising a new section in the firewall configuration database and a priority number for positioning the new section relative to other sections, and (iii) transmitting the update fragment to the particular firewall enforcing device,
   wherein the particular firewall enforcing device (i) receives the update fragment and updates a firewall rule table based on the received update fragment by using the priority number to position the new section relative to other sections in the firewall rule table and (ii) examines the updated firewall rule table for firewall rules that match received packets and perform actions specified by the firewall rules on the received packets,
   wherein the update fragment comprises a second priority number for updating a second section and the particular firewall enforcing device updates a second section with the second priority number and updates the firewall rule table by using the section priority numbers to position the sections relative to other sections in the firewall rule table,
   wherein the priority numbers assigned to different sections are sparsely allocated.

2. The non-transitory machine readable medium of claim 1, wherein the particular firewall enforcing device executes a set of datapath elements enforcing a firewall rule table, wherein the set of datapath elements comprises a set of logical forwarding elements and a set of virtual machines defined by a tenant.

3. The non-transitory machine readable medium of claim 2, wherein the set of datapath elements for enforcing a particular firewall rule table comprises a VNIC that enforces a set of firewall rules of the particular firewall rule table.

4. The non-transitory machine readable medium of claim 1, wherein each tenant has a set of corresponding sections in the plurality of sections of the firewall configuration database.

5. The non-transitory machine readable medium of claim 1, wherein the firewall rule table updated by the particular firewall enforcing device is for implementing firewall policies defined by a particular tenant.

6. The non-transitory machine readable medium of claim 4, wherein the firewall rule table of the particular firewall enforcing device comprises a first set of sections comprising rules defined by a subset of the tenants in the plurality of tenants and a second set of sections comprising rules applicable to all tenants of the data center.

7. The non-transitory machine readable medium of claim 6, wherein the firewall rule table of the particular firewall enforcing device does not store a section comprising rules defined by another tenant.

8. The non-transitory machine readable medium of claim 1, wherein the update fragment comprises a set of rules, each rule associated with its own rule priority number, wherein the rules are positioned relative to other rules in a section based on the rule priority number of the rule.

9. The non-transitory machine readable medium of claim 1, wherein the particular firewall enforcing device is a first firewall enforcing device and the update fragment is a first update fragment, the sets of instructions further comprising a set of instructions for identifying a second firewall enforcing device to which the received update is relevant and generating a second update fragment for the second firewall enforcing device based on the received update to the firewall configuration database.

10. The non-transitory machine readable medium of claim 1, wherein the priority number is also used for positioning the section relative to other sections in the firewall configuration database.

11. A non-transitory machine readable medium storing a program that when executed by at least one processing unit of a host computer provides firewall services at a data center, the program comprising sets of instructions for:
receiving an update fragment from a network manager, wherein the update fragment comprises a new section in a firewall configuration database of the data center and a priority number for positioning the new section relative to other sections, wherein the new section comprises a plurality of firewall rules;
updating a local firewall rule table by using the priority number of the new section to insert the new section relative to other sections in the local firewall rule table; and
matching different packets to different firewall rules in the updated local firewall rule table and performing actions specified by the matching firewall rules on the packets,
wherein the priority numbers assigned to different sections are sparsely allocated.

12. The non-transitory machine readable medium of claim 11, wherein the firewall configuration database is divided into sections that each include a set of rules, wherein the section is a section of the firewall configuration database.

13. The non-transitory machine readable medium of claim 11, wherein the sets of instructions further comprising a set of instructions for operating a set of datapath elements for enforcing firewall protection, wherein the set of datapath elements comprises a virtual network interface controller (VNIC) associated with a virtual machine, wherein the firewall rule table is used to filter packets destined for the virtual machine through the VNIC.

14. A method of providing firewall services at a data center comprising a set of host machines, the method comprising:
at a host machine;
receiving an update fragment from a network manager, wherein the update fragment comprises an update to a priority number for positioning a particular section of a firewall configuration database relative to other sections, wherein each of at least a set of sections, including the particular section, comprises a plurality of firewall rules;
updating a local firewall rule table by updating the position of the section relative to other sections in the local firewall rule table, said updating moving the section from an old position in the local firewall rule table to a new position in the local firewall rule table; and
matching different packets to different firewall rules in the updated local firewall rule table and performing actions specified by the matching firewall rules on the packets;
wherein the priority numbers assigned to different sections are sparsely allocated.

15. The method of claim 14, wherein the firewall configuration database is divided into sections that each include a set of rules, wherein the section is a section of the firewall configuration database.

16. The method of claim 14, wherein a priority number of the section determines the position of the section relative to other sections and an order by which the section is examined for the purpose of identifying a matching firewall rule for filtering a packet.

17. The method of claim 14, further comprising operating a set of datapath elements for enforcing firewall protection, wherein the set of datapath elements comprises a virtual network interface controller (VNIC) associated with a virtual machine, wherein the local firewall rule table is used to filter packets destined for the virtual machine through the VNIC.

* * * * *